(12) United States Patent
Aktas et al.

(10) Patent No.: US 12,335,947 B2
(45) Date of Patent: Jun. 17, 2025

(54) RESOURCE ALLOCATION TECHNIQUES FOR SIDELINK TRANSMISSIONS, AND DYNAMIC SELECTION BETWEEN RESOURCE ALLOCATION TECHNIQUES BASED ON SIDELINK COMMUNICATION RELIABILITY

(71) Applicant: QUALCOMM Incorporated, San Diego, CA (US)

(72) Inventors: Tugcan Aktas, La Jolla, CA (US); Kianoush Hosseini, San Diego, CA (US); Yeliz Tokgoz, San Diego, CA (US); Wei Yang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/491,038

(22) Filed: Sep. 30, 2021

(65) Prior Publication Data

US 2022/0132486 A1    Apr. 28, 2022

Related U.S. Application Data

(60) Provisional application No. 63/105,195, filed on Oct. 23, 2020.

(51) Int. Cl.
*H04W 72/20* (2023.01)
*H04W 72/53* (2023.01)
(Continued)

(52) U.S. Cl.
CPC ........... *H04W 72/20* (2023.01); *H04W 72/53* (2023.01); *H04W 72/541* (2023.01); *H04W 72/56* (2023.01)

(58) Field of Classification Search
CPC ..... H04W 72/02; H04W 72/20; H04W 72/53; H04W 72/541; H04W 72/56
See application file for complete search history.

(56) References Cited

U.S. PATENT DOCUMENTS

2016/0295624 A1* 10/2016 Novlan .................. H04L 67/12
2017/0332207 A1* 11/2017 Sheng ................... H04W 4/027
(Continued)

FOREIGN PATENT DOCUMENTS

WO   WO-2017026973 A1 *  2/2017  ............ H04W 72/02
WO   WO-2018027528 A1 *  2/2018  ............. H04W 4/40
(Continued)

OTHER PUBLICATIONS

International Search Report and Written Opinion—PCT/US2021/053192—ISA/EPO—Feb. 1, 2022.
(Continued)

*Primary Examiner* — Kashif Siddiqui
(74) *Attorney, Agent, or Firm* — Shumaker & Sieffert, P.A./QUALCOMM Incorporated

(57) ABSTRACT

Examples of the disclosure relate to generating a packet for transmission over a sidelink resource pool and transmitting the packet to a second UE on a set of sidelink resources of the sidelink resource pool. The set may be selected based on a resource selection procedure of a plurality of resource selection procedures. The resource selection procedure may be selected based at least in part on one or more utilization parameters corresponding to one or more resources of the sidelink resource pool. Other examples, and features are also claimed and described.

66 Claims, 20 Drawing Sheets

(51) Int. Cl.
*H04W 72/541* (2023.01)
*H04W 72/56* (2023.01)

(56) References Cited

U.S. PATENT DOCUMENTS

| | | |
|---|---|---|
| 2018/0234980 A1* | 8/2018 | Li .................. H04W 72/541 |
| 2019/0364590 A1 | 11/2019 | Sartori et al. |
| 2020/0037343 A1* | 1/2020 | He .................. H04W 4/40 |
| 2020/0045719 A1* | 2/2020 | Wang ............... H04W 72/566 |
| 2020/0267523 A1 | 8/2020 | Tang et al. |
| 2020/0314804 A1 | 10/2020 | Shin et al. |
| 2021/0127364 A1* | 4/2021 | Panteleev ........... H04L 1/1819 |
| 2021/0160821 A1* | 5/2021 | Lin .................. H04W 72/56 |
| 2021/0352628 A1 | 11/2021 | Lee et al. |
| 2022/0086803 A1 | 3/2022 | Li et al. |
| 2022/0132469 A1 | 4/2022 | Aktas et al. |
| 2022/0322229 A1 | 10/2022 | Ye et al. |
| 2022/0322359 A1 | 10/2022 | Ye et al. |
| 2023/0141004 A1 | 5/2023 | Hong et al. |
| 2023/0164825 A1 | 5/2023 | Deng et al. |
| 2023/0292355 A1 | 9/2023 | Peng et al. |

FOREIGN PATENT DOCUMENTS

| | | | |
|---|---|---|---|
| WO | WO-2020024208 A1 * | 2/2020 | ............ H04W 28/26 |
| WO | WO-2020059045 A1 * | 3/2020 | ............ H04W 72/02 |
| WO | 2020092939 A1 | 5/2020 | |
| WO | 2020173536 A1 | 9/2020 | |

OTHER PUBLICATIONS

ETSI TS 138 214: "5G, NR, Physical Layer Procedures for Data (3GPP TS 38.214 Version 16.15.0 Release 16)", V16.15.0, Feb. 2024, pp. 1-178, Section 8.1.4.

ETSI TS 138 214: "5G, NR, Physical Layer Procedures for Data (3GPP TS 38.214 version 17.8.0 Release 17)", ETSI TS 138 214 V17.8.0, Feb. 2024, 237 Pages, Sections 8.1.4A and 8.1.4C.

3GPP: "3rd Generation Partnership Project, Technical Specification Group Radio Access Network, NR, Physical Layer Procedures for Data (Release 16)", 3GPP TS 38.214 V16.3.0, Technical Specification, Sep. 2020, 165 Pages. Section 8.1.4.

\* cited by examiner

RESOURCE ALLOCATION TECHNIQUES FOR SIDELINK TRANSMISSIONS, AND DYNAMIC SELECTION BETWEEN RESOURCE ALLOCATION TECHNIQUES BASED ON SIDELINK COMMUNICATION RELIABILITY

PRIORITY CLAIM

This application claims priority to and the benefit of provisional patent application No. 63/105,195 filed in the United States Patent and Trademark Office on Oct. 23, 2020. The entire content of the prior application is incorporated herein by reference as if fully set forth below in its entirety and for all applicable purposes.

INTRODUCTION

The present disclosure relates generally to wireless communication, and more specifically, to sidelink communication.

As the demand for mobile broadband access continues to increase, user equipment (UEs) may be able to communicate with other UEs without relaying their data via a base station or network. Research and development to facilitate and enhance device-to-device (D2D) communication continue to advance wireless communication technologies not only to meet the growing demand for mobile broadband communication between UEs, but to advance and enhance the user experience with mobile communications.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one example, a method of wireless communication at a user equipment is disclosed. In a more particular example, the method includes: generating a packet for transmission over a sidelink resource pool; and transmitting the packet to a second UE on a set of sidelink resources of the sidelink resource pool, the set being selected based on a resource selection procedure of a plurality of resource selection procedures, the resource selection procedure being selected based at least in part on one or more utilization parameters corresponding to one or more resources of the sidelink resource pool.

In another example, a first user equipment (UE) configured for wireless communication is disclosed. In a more particular example, the first UE includes: a processor and a memory coupled to the processor. The processor and the memory are configured to generate a packet for transmission over a sidelink resource pool, and to transmit the packet to a second UE on a set of sidelink resources of the sidelink resource pool, the set being selected based on a resource selection procedure of a plurality of resource selection procedures, the resource selection procedure being selected based at least in part on one or more utilization parameters corresponding to one or more resources of the sidelink resource pool.

In another example, a first user equipment (UE) configured for wireless communication is disclosed. In a more particular example, the first UE includes means for generating a packet for transmission over a sidelink resource pool; and means for transmitting the packet to a second UE on a set of sidelink resources of the sidelink resource pool, the set being selected based on a resource selection procedure of a plurality of resource selection procedures, the resource selection procedure being selected based at least in part on one or more utilization parameters corresponding to one or more resources of the sidelink resource pool.

In another example, a non-transitory computer-readable medium storing computer-executable code in a first user equipment (UE) is disclosed. In a more particular example, the non-transitory computer-readable medium includes code for causing a computer to: generate a packet for transmission over a sidelink resource pool; and transmit the packet to a second UE on a set of sidelink resources of the sidelink resource pool, the set being selected based on a resource selection procedure of a plurality of resource selection procedures, the resource selection procedure being selected based at least in part on one or more utilization parameters corresponding to one or more resources of the sidelink resource pool.

In one example, a method of wireless communication at a user equipment is disclosed. In a more particular example, the method includes: determining, by a first user equipment (UE), one or more parameters related to reliability of sidelink transmission to a second UE; selecting, based on the one or more parameters, a resource selection technique from a plurality of resource selection techniques; receiving a packet to be transmitted using a sidelink (SL) slot; in response to receiving the packet to be transmitted using a sidelink (SL) slot, selecting resources from a plurality of resources within a resource selection window based on the selected resource selection technique; and transmitting the packet using the selected resources.

In another example, a user equipment (UE) configured for wireless communication is disclosed. In a more particular example, the UE includes: a processor, and a memory coupled to the processor. Here, the processor and the memory are configured to determine one or more parameters related to reliability of sidelink transmission to a second UE; select, based on the one or more parameters, a resource selection technique from a plurality of resource selection techniques; receive a packet to be transmitted using a sidelink (SL) slot; in response to receiving the packet to be transmitted using a sidelink (SL) slot, select resources from a plurality of resources within a resource selection window based on the selected resource selection technique; and transmit the packet using the selected resources.

In another example, a UE configured for wireless communication is disclosed. In a more particular example, the UE includes: means for determining one or more parameters related to reliability of sidelink transmission to a second UE; means for selecting, based on the one or more parameters, a resource selection technique from a plurality of resource selection techniques; means for receiving a packet to be transmitted using a sidelink (SL) slot; means for selecting a resources from a plurality of resources within a resource selection window based on the selected resource selection technique responsive to receiving the packet to be transmitted using a sidelink (SL) slot; and means for transmitting the packet using the selected resources.

In another example, a non-transitory computer readable medium is disclosed. In a more particular example, the computer readable medium stores computer-executable code having instructions for causing a UE to: determine one or more parameters related to reliability of sidelink transmission to a second UE; select, based on the one or more parameters, a resource selection technique from a plurality of resource selection techniques; receive a packet to be transmitted using a sidelink (SL) slot; in response to receiving the packet to be transmitted using a sidelink (SL) slot, select resources from a plurality of resources within a resource selection window based on the selected resource selection technique; and transmit the packet using the selected resources block.

In another example, a method of wireless communication at a user equipment is disclosed. In a more particular example, the method includes: requesting, by the equipment (UE), a report from a second UE indicative of resources available in a resource selection window; receiving, during a sensing window, a plurality of sidelink control information (SCI) messages from one or more devices located proximate to the first UE, wherein each of the plurality of SCI messages indicates which future resources the device that transmitted that SCI is reserving; generating a first report indicative of which of a plurality of resources in the resource selection window are available based on the plurality of SCI messages received during the sensing window; receiving, from the second UE, a second report indicative of which of the plurality of resources in the resource selection window are available; and selecting resources in the resource selection window indicated as available in both the first report and the second report.

In another example, a user equipment configured for wireless communication is disclosed. In a more particular example, the UE includes a processor, and a memory coupled to the processor. Here, the processor and the memory are configured to request a report from a second UE indicative of resources available in a resource selection window; receive, during a sensing window, a plurality of SCI messages from one or more devices located proximate to the first UE, wherein each of the plurality of SCI messages indicates which future resources the device that transmitted that SCI is reserving; generate a first report indicative of which of a plurality of resources in the resource selection window are available based on the plurality of SCI messages received during the sensing window; receive, from the second UE, a second report indicative of which of the plurality of resources in the resource selection window are available; and select resources in the resource selection window indicated as available in both the first report and the second report.

In another example, a UE configured for wireless communication is disclosed. In a more particular example, the UE includes: means for requesting a report from a second UE indicative of resources available in a resource selection window; means for receiving, during a sensing window, a plurality of sidelink control information (SCI) messages from one or more devices located proximate to the first UE, wherein each of the plurality of SCI messages indicates which future resources the device that transmitted that SCI is reserving; means for generating a first report indicative of which of a plurality of resources in the resource selection window are available based on the plurality of SCI messages received during the sensing window; means for receiving, from the second UE, a second report indicative of which of the plurality of resources in the resource selection window are available; and means for selecting a resources in the resource selection window indicated as available in both the first report and the second report.

In another example, a non-transitory computer readable medium is disclosed. In a more particular example, the computer readable medium stores computer-executable code having instructions for causing a UE to: request a report from a second UE indicative of resources available in a resource selection window; receive, during a sensing window, a plurality of SCI messages from one or more devices located proximate to the first UE, wherein each of the plurality of SCI messages indicates which future resources the device that transmitted that SCI is reserving; generate a first report indicative of which of a plurality of resources in the resource selection window are available based on the plurality of SCI messages received during the sensing window; receive, from the second UE, a second report indicative of which of the plurality of resources in the resource selection window are available; and select resources in the resource selection window indicated as available in both the first report and the second report.

These and other aspects of the invention will become more fully understood upon a review of the detailed description, which follows. Other aspects or features will become apparent to those of ordinary skill in the art, upon reviewing the following description of specific, exemplary features in conjunction with the accompanying figures. While the following description may discuss various advantages and features relative to certain figures, all features can include one or more of the advantageous features discussed herein. In other words, while this description may discuss one or more features as having certain advantageous features, one or more of such features may also be used in accordance with the various features discussed herein. In similar fashion, while this description may discuss exemplary features as device, system, or method features it should be understood that such exemplary features can be implemented in various devices, systems, and methods.

DETAILED DESCRIPTION

Figure 1:
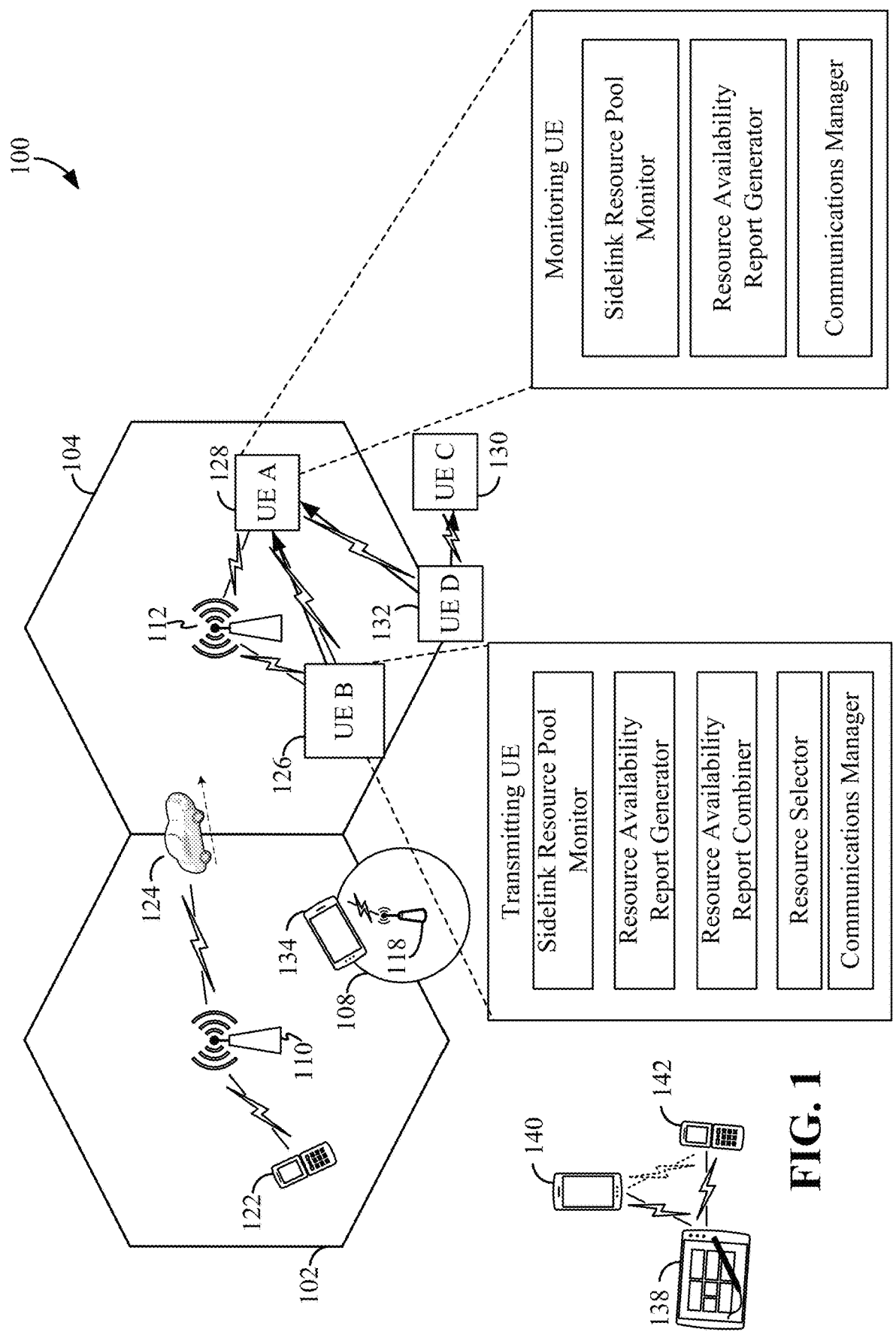
FIG. 1 is a conceptual illustration of an example of a radio access network of a wireless communication system in accordance with some aspects of the disclosed subject matter.

As used herein, sidelink communications or sidelink signals refer generally to any of various forms of device-to-device (D2D) communications in a wireless communication network. In various aspects, this disclosure provides mechanisms that can facilitate autonomous selection of resources for sidelink communications. Resources may include frequency, code, time, layer, or any other related parameter, characteristic, or degree of freedom of a wireless communication signal. For example, when a mobile device has information for transmission over a sidelink, this transmitting device can monitor or sense a sidelink resource pool to identify available sidelink resources to use.

However, in some examples (e.g., to reduce power consumption by forgoing this resource sensing), the transmitting device may request a report from another, possibly less power-sensitive device that is monitoring the sidelink resource pool (e.g., a smartphone, a tablet, a vehicle, etc.). Here, the monitoring device can generate a resource availability report indicating which resources are reserved, and which are available. The monitoring device can then send the report to the transmitting device, and the transmitting device can select sidelink resources from the sidelink resource pool based on the report.

While this procedure can provide for some power savings at the transmitting device, the resource availability report from the monitoring device may vary from the resource availability that would be seen by the transmitting device. That is, due to the different spatial locations of the transmitting device and the monitoring device, the channel characteristics seen by, and the interference experienced by, the respective devices may differ. Thus, the resource availability reported by the monitoring device may exhibit some variation from the resource availability that would be determined by the transmitting device itself. On the other hand, depending on the capabilities of the transmitting device and the monitoring device, the monitoring device might provide the transmitting device with resource availability information that results in improved communication performance compared to transmitting device-generated resource availability information.

According to some aspects of this disclosure, a transmitting device may combine resource availability information that the transmitting device generates itself, with resource availability information generated by a monitoring device. In this way, a transmitting device can obtain improved sidelink communication reliability compared to use solely of either the resource availability information generated by the transmitting device or the monitoring device. For example, by virtue of the use of such combined resource availability information, a transmitting device can achieve improved packet decoding reliability for sidelink communication. Here, a packet may refer to any suitable collection or block of data used for transmitting information. Such a packet may include control information (e.g., sidelink control information (SCI) or any other suitable control information) data information (e.g., sidelink user data or any other suitable data), reference signals, and/or other suitable information. In further aspects or examples, the use of combined resource availability information as described herein may result in higher data rates, increased network capacity, and/or improved spectral efficiency.

According to some aspects, the disclosure that follows provides a variety of procedures that a wireless communication device can employ to combine its own sensed or detected sidelink resource availability information with a report received from a different device (e.g., a monitoring device) indicating its sensed or detected resource availability. Further aspects of this disclosure provide additional procedures for a wireless communication device to employ to select between such combining procedures. That is, as described further below, in different scenarios of network loading, spatial distance between the transmitting and monitoring devices, resource availability reporting latency, etc., different combining procedures may exhibit improved performance over others. Based on various sidelink reliability or utilization parameters (e.g., a channel busy ratio (CBR), a packet delay budget (PDB), a cast type, etc.), a transmitting device may select the highest-performing combining procedure among the various available combining procedures.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, those skilled in the art will readily recognize that these concepts may be practiced without these specific details. In some instances, this description provides well known structures and components in block diagram form in order to avoid obscuring such concepts.

While this description describes aspects and features by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, features and/or uses may come about via integrated chip features and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described features. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

The disclosure that follows presents various concepts that may be implemented across a broad variety of telecommunication systems, network architectures, and communication standards. FIG. 1 is a conceptual illustration of an example of a radio access network 100 of a wireless communication system in accordance with some aspects of the disclosed subject matter, and is described as an illustrative example without limitation. In some aspects, RAN 100 can implement any suitable wireless communication technology or combination of technologies to provide radio access to one or more user equipment (UE), such as UEs 122, 124, 126, 128, 134, 138, 140, and/or 142. For example, RAN 100 can operate according to $3^{rd}$ Generation Partnership Project (3GPP) New Radio (NR) specifications, which is sometimes referred to as 5G NR or simply 5G. As another example, RAN 100 can operate under a hybrid of 5G NR and Evolved Universal Terrestrial Radio Access Network (eUTRAN) standards, which is sometimes referred to as LTE. The 3GPP refers to this hybrid RAN as a next-generation RAN, or NG-RAN. Of course, many other examples can be utilized in connection with the subject matter disclosed herein without departing from the scope of the present disclosure.

As illustrated in the example of FIG. 1, RAN 100 can include various base stations, such as base stations 110, 112, and/or 118. Broadly, a base station is a network element in a radio access network responsible for radio transmission and reception in one or more cells to or from a UE (e.g., UEs 122, 124, 126, 128, 134, 138, 140, and/or 142). In different technologies, standards, and/or contexts, various terminology has been used to refer to network elements that act as a base station. For example, a base station can also be referred to by those skilled in the art to refer to a network element that connects one or more UE apparatuses to one or more portions of a core network (e.g., core network 202 described below in connection with FIG. 2), such as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

In some aspects, the geographic area covered by RAN 100 can be divided into cellular regions (cells) that can be uniquely identified by a UE based on an identification broadcasted from one access point or base station. FIG. 1 illustrates macrocells 102 and 104, and a small cell 108, each of which can include one or more sectors (not shown). For example, a sector can be defined as a sub-area of a cell, and all sectors within one cell can be served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 1, two base stations 110 and 112 are illustrated in cells 102 and 104. Although not shown, a base station can control a remote radio head (RRH) in a cell, such that the base station and antenna are not geographically collocated. That is, a base station can have an integrated antenna or can be connected to an antenna or RRH by feeder cables. In the illustrated example, cells 102 and 104 can be referred to as macrocells, as base stations 110 and 112 support cells having a relatively large size. Further, a base station 118 is shown in small cell 108 (which can be referred to, for example, as a microcell, picocell, femtocell, home base station, home Node B, home eNode B, etc.) which can overlap with one or more macrocells. In the example illustrated in FIG. 1, cell 108 can be referred to as a small cell, as base station 118 supports a cell having a relatively small size. In some aspects, cell sizing can be done according to system design as well as component constraints.

It is to be understood that RAN 100 can include any number of wireless base stations and cells. Further, a relay node can be deployed to extend the size or coverage area of a given cell. Additionally, base stations 110, 112, and/or 118 can provide wireless access points to a core network for any number of mobile apparatuses. In some examples, base stations 110, 112, and/or 118 can be particular implementations of a base station described below in connection with, and illustrated in, FIG. 2.

Within RAN 100, the cells can include UEs that may be in communication with one or more sectors of each cell. Further, each base station 110, 112, and/or 118 can be configured to provide an access point to a core network (e.g., as described below in connection with FIG. 2) for all the UEs in the respective cells. For example, UEs 122 and 124 can be in communication with base station 110; UEs 126, 128, 130, and 132 can be in communication with base station 112; and UE 134 can be in communication with base station 118. In some examples, UEs 122, 124, 126, 128, 134, 138, 140, and/or 142 can be particular implementations of a UE described below in connection with, and illustrated in, FIG. 2.

In various examples, some or all UEs may communicate via sidelink signals without necessarily relying on scheduling or control information from a base station. For example, two or more UEs (e.g., UEs 126, 128, 130, and 132) can communicate with each other using peer to peer (P2P) or sidelink signals without relaying that communication through a base station (e.g., base station 112). In another example, UE 138 is illustrated communicating with UEs 140 and 142. In such an example, UE 138 can function as a scheduling entity or a primary sidelink device, and UEs 140 and 142 can function as scheduled entities or a non-primary (e.g., secondary) sidelink device. In yet another example, a UE can function as a scheduling entity in a device-to-device (D2D), peer-to-peer (P2P), vehicle-to-vehicle (V2V) network, and/or in a mesh network. In a mesh network example, UEs 140 and 142 can optionally communicate directly with one another in addition to communicating with a scheduling entity (e.g., UE 138). Thus, in a wireless communication system with scheduled access to time-frequency resources and having a cellular configuration, a P2P configuration, and/or a mesh configuration, a scheduling entity (e.g., UE 138) and one or more scheduled entities (e.g., UEs 140 and 142) may communicate utilizing the scheduled resources.

In some examples, UE 126 can include a sidelink resource pool monitor to monitor sidelink resources, and a resource availability report generator to generate a resource report indicative of which resources are available for use by UE 126 to transmit a packet to UE 128 based on the power in the signals received during the monitoring. For example, UE 126 can monitor a sidelink resource pool during a given sensing window for messages (e.g., sidelink control information (SCI)) from other UEs (e.g., UE 132) that reserve resources in a selection window. A sensing window can include a sliding window (e.g., in time) of sidelink resources (e.g., one or more sub-carriers, one or more resource elements, etc.) covering a preconfigured time and a preconfigured range of frequency resources that have been monitored, and a resource selection window can include a sliding window of upcoming sidelink resources covering a preconfigured time and a preconfigured range of frequency resources. Note that the sensing window and resource selection window can be different sizes (e.g., in time and/or frequency).

In some examples, UE 126 can request a second resource report from UE 128 (e.g., a receiving OR RX UE), and can receive the second resource report from UE 128. In such an example, UE 128 can monitor sidelink resources and generate a second resource report indicative of which resources are available for use by UE 126 based on the power in the signals received during the monitoring. For example, UE 128 can include a sidelink resource pool monitor to monitor a sensing window for messages (e.g., sidelink control information (SCI)) from other UEs (e.g., UE 132) that reserve resources in the selection window.

In some examples, UE 128 can include a resource availability report generator to generate a second report and a communications manager to transmit the second report to UE 126, for use by UE 126 in determining which resources in the selection window are available for UE 126.

Figure 2:
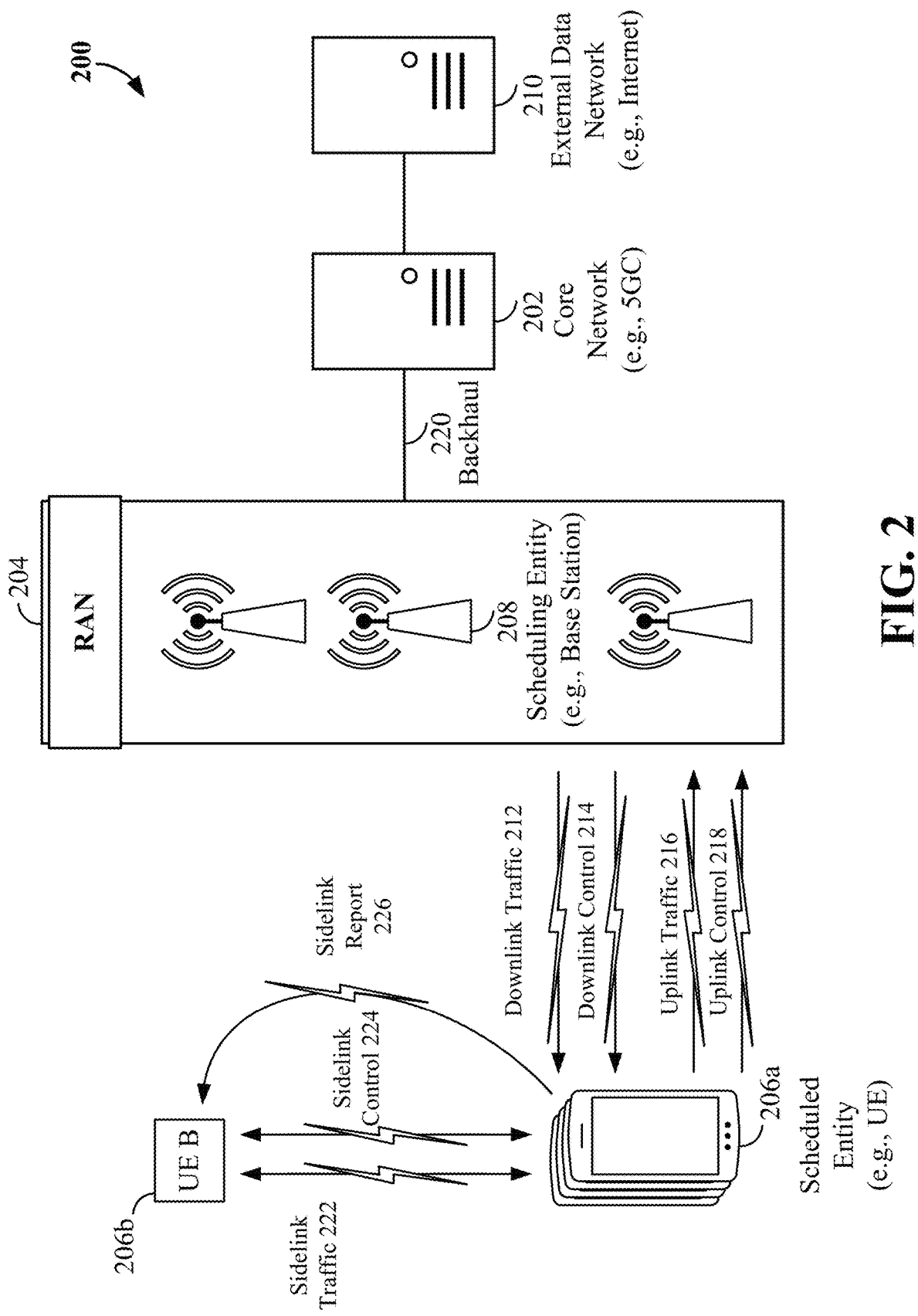
FIG. 2 is a schematic illustration of a wireless communication system in accordance with some aspects of the disclosed subject matter.

In some examples, UE 126 can include a resource availability resource combiner to combine the report generated by UE 126 and the second report from UE 128. For example, UE 126 can identify which resources are available (e.g., are unlikely to cause too much interference with a signal transmitted to UE 128) based on which resources are indicated as available in the report and the second report, In some examples, UE 126 can include a resource selector to select resources that can be used to transmit a packet to UE 128 with an acceptable level of Interference. FIG. 2 is a schematic illustration of a wireless communication system 200 in accordance with some aspects of the disclosed subject matter, and is described as an illustrative example without limitation. In some aspects, wireless communication system 200 can include three interacting domains: a core network 202, a radio access network (RAN) 204, and various user equipment (UE), such as user equipment 206a and user equipment 206b. In some aspects, by virtue of wireless communication system 200, UE 206 can be enabled to carry out data communication with an external data network 210, such as (but not limited to) the Internet. In some examples, the UE 126 may include a communications manager to transmit a packet to the UE 128.

In some aspects, RAN 204 can implement any suitable wireless communication technology or combination of technologies to provide radio access to UE 206. For example, RAN 104 can operate according to $3^{rd}$ Generation Partnership Project (3GPP) New Radio (NR) specifications, which is sometimes referred to as 5G NR or simply 5G. As another example, RAN 104 can operate under a hybrid of 5G NR and Evolved Universal Terrestrial Radio Access Network (eU-TRAN) standards, which is sometimes referred to as LTE. The 3GPP refers to this hybrid RAN as a next-generation RAN, or NG-RAN. Of course, many other examples can be utilized in connection with the subject matter disclosed herein without departing from the scope of the present disclosure.

As illustrated in the example of FIG. 2, RAN 204 includes various base stations 208. Broadly, a base station can be used to implement a network element in a radio access network responsible for radio transmission and reception in one or more cells to or from a UE, such as UE 206a and/or UE 206b. In different technologies, standards, and/or contexts, various terminology has been used to refer to a network elements that act as a base station. For example, a base station can also be referred to by those skilled in the art using various terminology to refer to a network element that connects one or more UE apparatuses to one or more portions of core network 202, such as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

In some aspects, as illustrated in FIG. 2, RAN 204 can support wireless communication for multiple mobile apparatuses. A mobile apparatus can be referred to as user equipment (UE) in 3GPP standards, but can also be referred to by those skilled in the art using various terminology to refer to a network element that provides a user with access to one or more network services, such as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. In general, a UE can be an apparatus (e.g., a mobile apparatus) that provides a user with access to network services.

Within the present document, a "mobile" apparatus need not necessarily have a capability to move, and may be stationary. The term mobile apparatus or mobile device broadly refers to a diverse array of devices and technologies. UEs can include a number of hardware structural components sized, shaped, and arranged to facilitate communication; such components can include antennas, antenna arrays, RF chains, amplifiers, one or more processors, etc., electrically coupled to each other. For example, some non-limiting examples of a mobile apparatus include a mobile, a cellular (cell) phone, a smartphone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus can additionally be an automotive or other transportation vehicle, a remote sensor or actuator, a robot or robotics device, a satellite radio, a global positioning system (GPS) device, an object tracking device, a drone, a multicopter, a quad-copter, a remote control device, a consumer and/or wearable device, such as eyewear, a wearable camera, a virtual reality device, a smart watch, a health and/or fitness tracker, a digital audio player (e.g., MP3 player), a camera, a game console, etc. A mobile apparatus can additionally be a digital home device or smart home device such as a home audio device, a home video device, and/or a home multimedia device, an appliance, a vending machine, intelligent lighting, a home security system, a smart meter, etc. A mobile apparatus can additionally be a smart energy device, a security device, a solar panel and/or solar array, a municipal infrastructure device controlling electric power (e.g., a smart grid), a municipal infrastructure device controlling lighting, a municipal infrastructure device controlling water, etc.; an industrial automation and enterprise device; a logistics controller; agricultural equipment; military defense equipment, vehicles, aircraft, ships, weaponry, etc. Still further, a mobile apparatus can provide for connected medicine or telemedicine support, e.g., health care at a distance. Telehealth devices can include telehealth monitoring devices and telehealth administration devices, whose communication may be given preferential treatment or prioritized access over other types of information (e.g., in terms of prioritized access for transport of critical service data, and/or relevant QoS for transport of critical service data).

In some aspects, wireless communication between RAN 204 and a UE (e.g., UE 206a, UE 206b) can be described as utilizing an air interface. Transmissions over the air interface from a base station (e.g., base station 208) to one or more UEs (e.g., UE 206a, UE 206b) can be referred to as downlink (DL) transmission. In accordance with some aspects, the term downlink can refer to a point-to-multipoint transmission originating at a scheduling entity (e.g., base station 208). Another way to describe this scheme can be to use the term broadcast channel multiplexing. Transmissions from a UE (e.g., UE 206a, UE 206b) to a base station (e.g., base station 208) can be referred to as uplink (UL) transmissions. In some aspects, the term uplink can refer to a point-to-point transmission originating at a scheduled entity (e.g., UE 206a, UE 206b).

In some examples, access to the air interface can be scheduled, wherein a scheduling entity (e.g., base station 208) allocates resources for communication among some or all devices and equipment within its service area or cell.

In some aspects, base stations 208 are not the only entities that may function as scheduling entities. For example, a UE can function as a scheduling entity, scheduling resources for one or more scheduled entities (e.g., one or more other UEs).

As illustrated in FIG. 2, a base station (e.g., base station 208) can broadcast downlink traffic 212 to one or more scheduled entities (e.g., UE 206a, UE 206b). Broadly, a scheduling entity (e.g., base station 208) can be a node or device responsible for scheduling traffic in a wireless communication network, including the downlink traffic 212 and, in some examples, uplink traffic 216 from one or more scheduled entities (e.g., UE 206a, UE 206b) to the scheduling entity (e.g., base station 208). Additionally, a scheduled entity (e.g., UE 206a, UE 206b) can be a node or device that receives downlink control information 214, including but not limited to scheduling information (e.g., a grant), synchronization or timing information, or other control information from another entity in the wireless communication network such as the scheduling entity (e.g., base station 208). Note that UE 206b may or may not interface with a scheduling entity (e.g., base station 208).

In general, base stations 208 can include a backhaul interface for communication with a backhaul portion 220 of the wireless communication system. The backhaul 220 can provide a link between a base station 208 and the core network 202. Further, in some examples, a backhaul network can provide interconnection between the respective base stations 208. Various types of backhaul interfaces may be employed, such as a direct physical connection, a virtual network, or the like using any suitable transport network.

In some aspects, core network 202 can be a part of the wireless communication system 200, and can be independent of the radio access technology used in the RAN 204. For example, core network 202 can be configured according to 5G standards (e.g., 5GC). In other examples, core network 202 can be configured according to a 4G evolved packet core (EPC), or any other suitable standard or configuration.

In some examples, scheduled entities such as a first UE 206a and a second UE 206b can utilize sidelink signals for direct device to device (D2D) communication. Sidelink signals can include sidelink traffic 222, sidelink control 224, and/or sidelink reports 226. In some aspects, sidelink control information 222 can include a sidelink control information (SCI) message (e.g., in SCI format 1), which can include any suitable information that can be used by one or more other UEs to, for example, schedule transmissions (e.g., in SL resource selection mode 2). For example, SCI can include a priority of a transmission being scheduled, which can reflect a latency requirement of a communication. In a more particular example, SCI can include a priority level field that can be used to designate a priority level of a transmission (e.g., a packet(s) to be transmitted using a reserved resource), such as a 3-bit field with a lower value representing a higher priority. As another example, SCI can include information identifying one or more resources that are reserved by the device (e.g., UE 206a, UE 206b) that transmitted the SCI.

Sidelink control information 222 can include a request signal, such as request-to-send (RTS), a source transmit signal (STS), and/or a direction selection signal (DSS). Such a request signal can provide for a UE (e.g., UE 206a, UE 206b) to request a duration of time to keep a sidelink channel available for a sidelink signal. In some aspects, sidelink control information 222 can include a response signal, such as a clear-to-send (CTS) and/or a destination receive signal (DRS). The response signal may provide for the UE (e.g., UE 206a, UE 206b) to indicate the availability of the sidelink channel, e.g., for a requested duration of time. An exchange of request and response signals (e.g., handshake) can facilitate different UEs performing sidelink communications to negotiate the availability of the sidelink channel prior to communication of the sidelink traffic information 224.

Sidelink report information 226 can include information (e.g., a report) that can be used by a first UE (e.g., an RX UE, UE 206a) to indicate which resources are detected as available and/or unavailable by the first UE. The first UE can transmit such a report to a second UE (e.g., a TX UE, UE 206b), e.g., using sidelink report link 226. The first UE may transmit report information 226 using reserved resources (e.g., reserved using sidelink control information (SCI), as described below in connection with FIG. 5). Additionally or alternatively, the UE can transmit the report information 226 using resources that are pre-configured to transmit report information 226 (e.g., resources defined in a standard as designated for transmission of report information 226)

Figure 3:
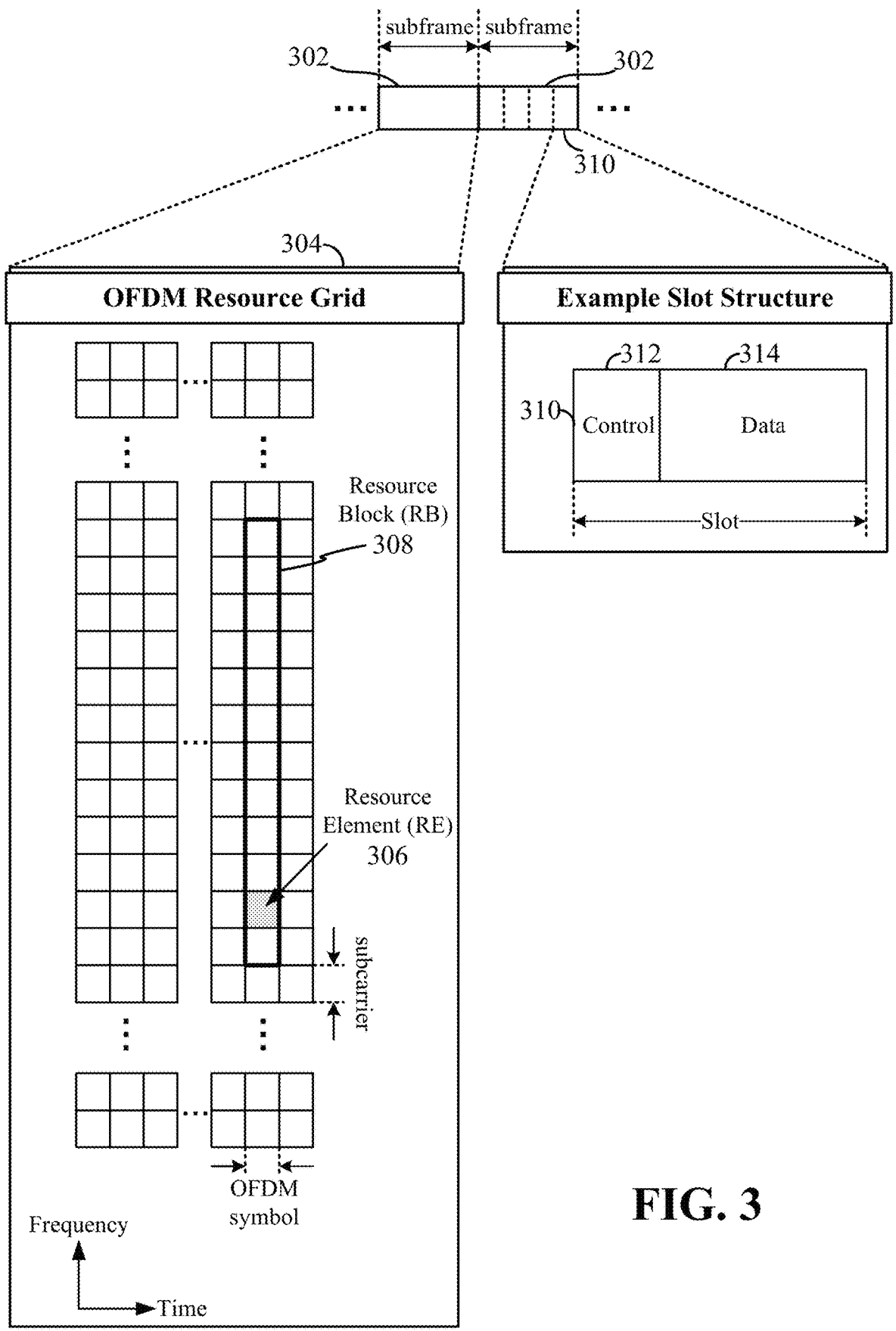
FIG. 3 is a schematic illustration of an organization of wireless resources in an air interface utilizing orthogonal frequency divisional multiplexing (OFDM) according to some aspects.

FIG. 3 is a schematic illustration of an organization of wireless resources in an air interface utilizing orthogonal frequency divisional multiplexing (OFDM) in accordance with some aspects of the disclosed subject matter, and is described as an illustrative example without limitation.

It should be understood by those of ordinary skill in the art that the various aspects of the present disclosure can be applied to a DFT-s-OFDMA waveform in substantially the same way as described herein below. That is, while some examples of the disclosed subject matter may focus on an OFDM link for clarity, it should be understood that the same principles can be applied as well to DFT-s-OFDMA waveforms. DFT-s-OFDM is a single carrier (SC)-like transmission scheme that can be used in conjunction with OFDM. In DFT-s-OFDM a data symbol can be encoded across multiple adjacent OFDM frequency resource elements (e.g., using multiple adjacent OFDM carriers), and the data symbols can be transmitted sequentially in the time domain. In OFDM, a data symbol can be encoded on a single frequency resource element (e.g., using a single OFDM carrier), and multiple data symbols can be transmitted in parallel on adjacent carriers. Signal processing in the transmit chains of OFDM and DFT-s-OFDM have many similarities, with DFT-s-OFDM utilizing an additional discrete Fourier transform (DFT) block to spread data symbols which can then be input to an inverse discrete Fourier transform (IDFT) block to transform the signal into the time domain. All else being equal, DFT-s-OFDM generally has lower peak-to-average power (PAPR) than OFDM. Accordingly, using DFT-s-OFDM for UL can reduce the amount of power used to transmit a given amount of data.

In some examples, a frame can refer to a duration of 10 milliseconds (ms) for wireless transmissions, with each frame including 10 subframes of 1 ms each. On a given carrier, there may be one set of frames in the UL, and another set of frames in the DL. Referring now to FIG. 3, an expanded view of an exemplary DL subframe 302 is illustrated, showing an OFDM resource grid 304. However, as those skilled in the art will readily appreciate, the PHY transmission structure for any particular application can vary from the example described here, depending on any number of factors. Here, time is in the horizontal direction with units of OFDM symbols; and frequency is in the vertical direction with units of subcarriers or tones.

Resource grid 304 can be used to schematically represent time-frequency resources for a given antenna port (e.g., in a MIMO implementation with multiple antenna ports available, a corresponding multiple number of resource grids 304 can be available for communication). Resource grid 304 can be divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE can represent one or more bits of information. In some examples, a block of REs can be referred to as a physical resource block (PRB) or more simply a resource block (RB) 308, which contains any suitable number of consecutive subcarriers in the frequency domain. In one example, an RB can include 12 subcarriers, a number independent of the numerology used. In some examples, depending on the numerology, an RB can include any suitable number of consecutive OFDM symbols in the time domain. Within the present disclosure, unless otherwise stated, it is assumed that a single RB such as RB 308 entirely corresponds to a single direction of communication (either transmission or reception for a given device).

A UE generally utilizes only a subset of resource grid 304. An RB can be the smallest unit of resources that can be allocated to a UE. Thus, as more RBs are scheduled for a particular UE, the modulation scheme chosen for the air interface increases, and data rates that can be achieved by the UE also increase. In FIG. 3, RB 308 is shown as occupying less than the entire bandwidth of subframe 302, with some subcarriers illustrated above and below RB 308. In a given implementation, subframe 302 can have a bandwidth corresponding to any number of one or more RBs 308. Further, in FIG. 3, RB 308 is shown as occupying less than the entire duration of subframe 302, although this is merely one possible example.

Each subframe 302 (e.g., a 1 ms subframe) can include one or multiple adjacent slots. In the example of FIG. 3, one subframe 302 includes four slots 310, as an illustrative example. In some examples, a slot can be defined according to a specified number of OFDM symbols with a given cyclic prefix (CP) length. For example, a slot can include 7 or 14 OFDM symbols with a nominal CP. Additional examples can include mini-slots having a shorter duration (e.g., 1, 2, 4, or 7 OFDM symbols). Such mini-slots can in some cases be transmitted occupying resources scheduled for ongoing slot transmissions for the same or for different UEs.

An expanded view of one of the slots 310 illustrates a slot including a control region 312 and a data region 314. In general, control region 312 can carry control channels (e.g., PDCCH, PSCCH), and data region 414 can carry data channels (e.g., PDSCH, PUSCH, PSSCH). Additionally or alternatively, a slot can contain various combinations of DL, UL, and/or SL, such as all DL, all UL, all SL, at least one DL portion and at least one SL portion, or at least one UL portion and at least one SL portion. The simple structure illustrated in FIG. 3 is merely exemplary in nature, and different slot structures can be utilized, and can include one or more of each of the control region(s) and data region(s).

Although not illustrated in FIG. 3, various REs 306 within an RB 308 can be scheduled to carry one or more physical channels, including control channels, shared channels, data channels, etc. Other REs 306 within RB 308 can also carry pilot signals and/or reference signals. These pilot signals and/or reference signals can facilitate performance of channel estimation of the corresponding channel by a receiving device, which can enable coherent demodulation/detection of the control and/or data channels within RB 308.

In a DL transmission, a transmitting device (e.g., base station 208) can allocate one or more REs 306 (e.g., within a control region 312) to carry DL control information (e.g., downlink control information 214 described above in connection with FIG. 2) including one or more DL control channels that generally carry information originating from higher layers, such as a physical broadcast channel (PBCH), a physical downlink control channel (PDCCH), etc., to one or more scheduled entities (e.g., a particular UE 206). In addition, DL REs can be allocated to carry DL physical signals that generally do not carry information originating from higher layers. These DL physical signals can include a primary synchronization signal (PSS); a secondary synchronization signal (SSS); demodulation reference signals (DMRS); phase-tracking reference signals (PT-RS); channel-state information reference signals (CSI-RS); etc.

The PDCCH can carry downlink control information (DCI) for one or more UEs in a cell. This can include, but is not limited to, power control commands, scheduling information, a grant, and/or an assignment of REs for DL and UL transmissions.

In a UL transmission, a transmitting device (e.g., UE 206a, UE 206b) can utilize one or more REs 306 to carry UL control information (UCI) (e.g., uplink control information 218 described above in connection with FIG. 2). The UCI can originate from higher layers via one or more UL control channels, such as a physical uplink control channel (PUCCH), a physical random access channel (PRACH), etc., to the scheduling entity (e.g., base station 208). Further, UL REs may carry UL physical signals that generally do not carry information originating from higher layers, such as demodulation reference signals (DMRS), phase-tracking reference signals (PT-RS), sounding reference signals (SRS), etc. In some examples, the control information (e.g., uplink control information 218) can include a scheduling request (SR), i.e., a request for the scheduling entity (e.g., base station) 208 to schedule uplink transmissions (and in some examples, sidelink transmissions, such as in sidelink resource allocation mode 1). Here, in response to the SR transmitted on a control channel (e.g., over which uplink control information 218 is transmitted), the scheduling entity (e.g., base station 208) can transmit downlink control information (e.g., downlink control information 214) that can schedule resources for uplink packet transmissions.

In addition to control information, one or more REs 306 (e.g., within the data region 314) can be allocated for user data or traffic data. Such traffic can be carried on one or more traffic channels, such as, for a DL transmission, a physical downlink shared channel (PDSCH); or for an UL transmission, a physical uplink shared channel (PUSCH).

In an SL transmission, a transmitting device (e.g., UE 206a, UE 206b) can utilize one or more REs 306 to carry SL control information (SCI) (e.g., sidelink control information 224 described above in connection with FIG. 2). SL REs may carry SL physical signals that generally do not carry information originating from higher layers, such as demodulation reference signals (DMRS), phase-tracking reference signals (PT-RS), sounding reference signals (SRS), etc.

SL control information can also include hybrid automatic repeat request (HARQ) feedback such as an acknowledgment (ACK) or negative acknowledgment (NACK), channel state information (CSI), and/or any other suitable SL control information. In addition to control information, one or more REs 306 (e.g., within the data region 314) can be allocated (e.g., in sidelink resource allocation mode 1) and/or reserved (e.g., in sidelink resource allocation mode 2) for user data and/or traffic data. Such traffic can be carried on one or more traffic channels, such as, for a SL transmission, a physical sidelink shared channel (PSSCH).

The channels or carriers described above and illustrated in FIGS. 2 and 3 are not necessarily all the channels or carriers that can be utilized between a scheduling entity (e.g., base station 208) and scheduled entities (e.g., UE 206a, UE 206b), and those of ordinary skill in the art will recognize that other channels or carriers can be utilized in addition to those illustrated, such as other traffic, control, and feedback channels. These physical channels described above are generally multiplexed and mapped to transport channels for handling at the medium access control (MAC) layer. Transport channels carry blocks of information called transport blocks (TB). The transport block size (TBS), which can correspond to a number of bits of information, can be a controlled parameter, based on the modulation and coding scheme (MCS) and the number of RBs in a given transmission.

Figure 4:
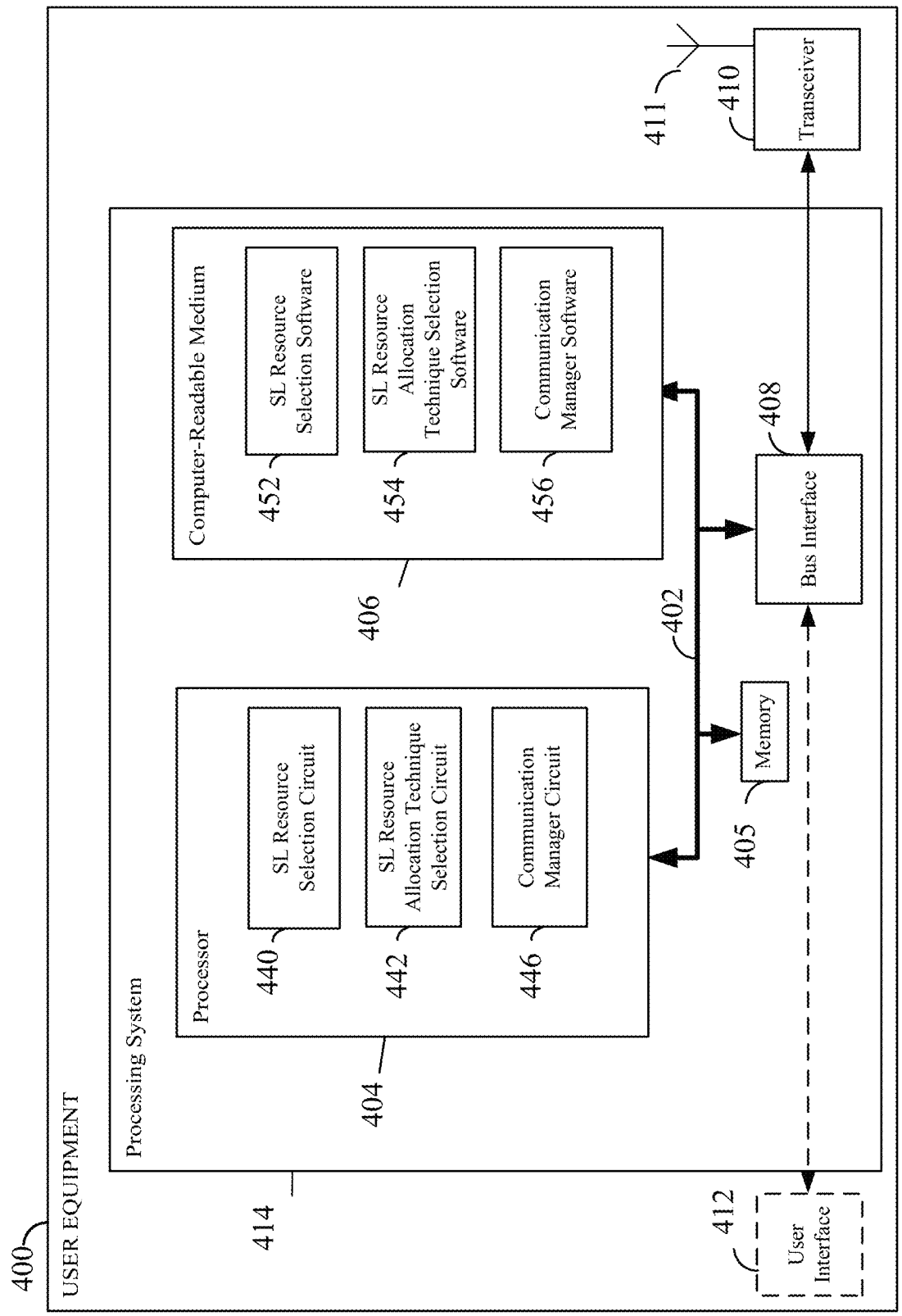
FIG. 4 is a block diagram conceptually illustrating an example of a hardware implementation for a scheduled entity in accordance with some aspects of the disclosed subject matter.

FIG. 4 is a block diagram conceptually illustrating an example of a hardware implementation for a user equipment (UE) 400 in accordance with some aspects of the disclosed subject matter, and is described as an illustrative example without limitation.

In some aspects, scheduling entity 400 can be implemented with a processing system 414 that includes one or more processors 404. Examples of processors 404 include central processing units (CPUs), microprocessors, microcontrollers, digital signal processors (DSPs), field programmable gate arrays (FPGAs), programmable logic devices (PLDs), graphics processing units (GPUs), state machines, gated logic, discrete hardware circuits, and other suitable hardware configured to perform the various functionality described throughout this disclosure. In various examples, UE 400 can be configured to perform any one or more of the functions described herein. That is, processor 404, as utilized in UE 400, can be used to implement any one or more of the processes and procedures described below in connection with FIGS. 5-7, 10-13A, 15, 19, and/or 20.

In this example, processing system 414 can be implemented with a bus architecture, represented generally by the bus 402. Bus 402 can include any number of interconnecting buses and bridges depending on the specific application of processing system 414 and the overall design constraints. Bus 402 can communicatively couple together various circuits including one or more processors (represented generally by processor 404), memory 405, and computer-readable media (represented generally by computer-readable medium 406). Bus 402 can also link various other circuits such as timing sources, peripherals, voltage regulators, and power management circuits, which are well known in the art, and therefore, will not be described any further. A bus interface 408 can provide an interface between bus 402 and a transceiver 410. Transceiver 410 can provide a communication interface or means for communicating with various other apparatus over a transmission medium. In some aspects, transceiver 410 can be configured using an array of antennas (e.g., antenna array 418) to facilitate directional transmission and/or reception. Depending upon the nature of the apparatus, a user interface 412 (e.g., keypad, display, touchscreen, speaker, microphone, joystick, etc.) can also be provided. Of course, such a user interface 412 can be omitted in some examples, such as a sensor (e.g., an IoT-based sensor).

In some aspects of the disclosed subject matter, transceiver 410 can be configured to facilitate various functions. For example, transceiver 410 can be configured to transmit any suitable signal(s) (e.g., a signal encoded with data, a reference signal, etc.) using an antenna and/or to receive a signal (e.g., a signal encoded with data, a reference signal, etc.) from another device using an antenna. In a more particular example, transceiver 410 can be configured as means for transmitting a signal, and/or means for receiving a signal from another device.

As another example, transceiver 410 can be configured to receive, during a sensing window and using an antenna, a plurality of sidelink control information (SCI) messages from one or more devices located proximate to UE 400. In a more particular example, transceiver 410 can be configured as means for receiving, during a sensing window, a plurality of SCI messages from one or more devices located proximate to UE 400. For example, transceiver 410 can be configured to perform the preceding functions using techniques described below in connection with 1110 of FIG. 11 and/or 2004 of FIG. 20.

As another example, transceiver 410 can be configured to receive, from the second UE and using an antenna, a second report indicative of which of the plurality of resources in the resource selection window are available. In a more particular example, transceiver 410 can be configured as means for receiving, from the second UE, a second report indicative of which of the plurality of resources in the resource selection window are available. For example, transceiver 410 can be configured to perform the preceding functions using techniques described below in connection with 1118 of FIG. 11 and/or 2008 of FIG. 20.

As another example, transceiver 410 can be configured to receive, from the second UE and using an antenna, a first value indicative of a first RSRP and a second value indicative of a second RSRP. In a more particular example, transceiver 410 can be configured as means for receiving, from the second UE, a first value indicative of the first RSRP and a second value indicative of the second RSRP. For example, transceiver 410 can be configured to perform the preceding functions using techniques described below in connection with 1302 of FIG. 13, 1502 of FIG. 15, 2004 of FIG. 20, and/or 2008 of FIG. 20.

As another example, transceiver 410 can be configured to receive, from the second UE and using an antenna, a first value indicative of an SIR of a RSRP associated with a first link between the first UE and the second UE, and a second RSRP associated with a second link between a third UE and the second UE. In a more particular example, transceiver 410 can be configured as means for receiving, from the second UE, a first value indicative of an SIR of a RSRP associated with a first link between the first UE and the second UE, and a second RSRP associated with a second link between a third UE and the second UE. For example, transceiver 410 can be configured to perform the preceding functions using techniques described below in connection with 1302 of FIG. 13, 1502 of FIG. 15, 2004 of FIG. 20, and/or 2008 of FIG. 20.

As another example, transceiver 410 can be configured to receive, from the third UE and using an antenna, a third value indicative of the third RSRP and a fourth value indicative of the fourth RSRP. In a more particular example, transceiver 410 can be configured as means for receiving a third value indicative of the third RSRP and a fourth value indicative of the fourth RSRP. For example, transceiver 410 can be configured to perform the preceding functions using techniques described below in connection with 1502 of FIG. 15, and/or 2008 of FIG. 20.

As another example, transceiver 410 can be configured to transmit, via an antenna, a packet to the second UE using the selected resources. In a more particular example, transceiver 410 can be configured as means for transmitting a packet to the second UE using the selected resources. For example, transceiver 410 can be configured to perform the preceding functions using techniques described below in connection with 1126 of FIG. 13, and/or 1904 of FIG. 19.

In some aspects of the disclosed subject matter, processor 404 can include sidelink (SL) resource selection circuitry 440 configured for various functions, including. For example, SL resource selection circuitry 440 and/or a module included in SL resource selection circuitry 440 can be configured to request a report from a second UE indicative of resources available in a resource selection window, and/or to request that the report from the second UE be based on a comparison of an SIR between the first link and links from at least one device of the one or more devices. In a more particular example, SL resource selection circuitry 440 and/or a module included in SL resource selection circuitry 440 can be configured as means for requesting a report from a second UE indicative of resources available in a resource selection window, and/or means for requesting that the report from the second UE be based on a comparison of an SIR between the first link and links from at least one device of the one or more devices. For example, SL resource selection circuitry 440 can be configured to perform the preceding functions using techniques described below in connection with 1116 of FIG. 11, and/or 2008 of FIG. 20.

As another example, SL resource selection circuitry 440 and/or a module included in SL resource selection circuitry 440 can be configured to generate a first report indicative of which of a plurality of resources in the resource selection window are available based on the plurality of SCI messages received during the sensing window. In a more particular example, SL resource selection circuitry 440 and/or a module included in SL resource selection circuitry 440 can be configured as means for generating a first report indicative of which of a plurality of resources in the resource selection window are available based on the plurality of SCI messages received during the sensing window. For example, SL resource selection circuitry 440 can be configured to perform the preceding functions using techniques described below in connection with 1110, 1112 of FIG. 11, and/or 2004 of FIG. 20.

As another example, SL resource selection circuitry 440 and/or a module included in SL resource selection circuitry 440 can be configured to select resources in the resource selection window indicated as available in both the first report and the second report. In a more particular example, SL resource selection circuitry 440 and/or a module included in SL resource selection circuitry 440 can be configured as means for selecting a resource in the resource selection window indicated as available in both the first report and the second report. For example, SL resource selection circuitry 440 can be configured to perform the preceding functions using techniques described below in connection with 1122 of FIG. 11.

As another example, SL resource selection circuitry 440 and/or a module included in SL resource selection circuitry 440 can be configured to determine, for each of the plurality of SCI messages, a reference signal received power (RSRP), In a more particular example, SL resource selection circuitry 440 and/or a module included in SL resource selection circuitry 440 can be configured as means for determining, for each of the plurality of SCI messages, an RSRP. For example, SL resource selection circuitry 440 can be configured to perform the preceding functions using techniques described below in connection with 1112 of FIG. 11, and/or 2004 of FIG. 20.

As another example, SL resource selection circuitry 440 and/or a module included in SL resource selection circuitry 440 can be configured to identify a subset of the plurality of SCI messages associated with an RSRP below a threshold power, and/or identify a second subset of the plurality of SCI messages associated with an RSRP that exceed a threshold power. In a more particular example, SL resource selection circuitry 440 and/or a module included in SL resource selection circuitry 440 can be configured as means for identifying a subset of the plurality of SCI messages associated with an RSRP below a threshold power, and/or as means for identifying a second subset of the plurality of SCI messages associated with an RSRP that exceed a threshold power. For example, SL resource selection circuitry 440 can be configured to perform the preceding functions using techniques described below in connection with 1110 of FIG. 11, and/or 2004 of FIG. 20.

As another example, SL resource selection circuitry 440 and/or a module included in SL resource selection circuitry 440 can be configured to determine that the resources reserved by the subset of the plurality of SCI messages are available. In a more particular example, SL resource selection circuitry 440 and/or a module included in SL resource selection circuitry 440 can be configured as means for determining that the resources reserved by the subset of the plurality of SCI messages are available. For example, SL resource selection circuitry 440 can be configured to perform the preceding functions using techniques described below in connection with 1110 of FIG. 11, and/or 2004 of FIG. 20.

As another example, SL resource selection circuitry 440 and/or a module included in SL resource selection circuitry 440 can be configured to determine that resources that are not reserved by any SCI message are available, and/or to determine that the resources reserved by the second subset of the plurality of SCI messages are unavailable. In a more particular example, SL resource selection circuitry 440 and/or a module included in SL resource selection circuitry 440 can be configured as means for determining that resources that are not reserved by any SCI message are available, and/or means for determining that the resources reserved by the second subset of the plurality of SCI messages are unavailable. For example, SL resource selection circuitry 440 can be configured to perform the preceding functions using techniques described below in connection with 1124 of FIG. 11, and/or 2020 of FIG. 20.

As another example, SL resource selection circuitry 440 and/or a module included in SL resource selection circuitry 440 can be configured to determine, for at least a first device associated with a first SCI message of the plurality of SCI messages, a signal-to-interference ratio (SIR) of a first reference signal received power (RSRP) associated with a first link between the first UE and the second UE, and a second RSRP associated with a second link between a third UE and the second UE. In a more particular example, SL resource selection circuitry 440 and/or a module included in SL resource selection circuitry 440 can be configured as means for determining, for at least a first device associated with a first SCI message of the plurality of SCI messages, an SIR of a first RSRP associated with a first link between the first UE and the second UE, and a second RSRP associated with a second link between a third UE and the second UE. For example, SL resource selection circuitry 440 can be configured to perform the preceding functions using techniques described below in connection with 1302 of FIG. 13, and/or 2014 of FIG. 20.

As another example, SL resource selection circuitry 440 and/or a module included in SL resource selection circuitry 440 can be configured to determine that the SIR is below an SIR threshold, and/or to determine that resources reserved by the first SCI message are available based on the SIR being below the SIR threshold. In a more particular example, SL resource selection circuitry 440 and/or a module included in SL resource selection circuitry 440 can be configured as means for determining that the SIR is below an SIR threshold, and/or means for determining that resources reserved by the first SCI message are available based on the SIR being below the SIR threshold. For example, SL resource selection circuitry 440 can be configured to perform the preceding functions using techniques described below in connection with 1312 of FIG. 13, and/or 2014 of FIG. 20.

As another example, SL resource selection circuitry 440 and/or a module included in SL resource selection circuitry 440 can be configured to determine, for at least a second device, a cross-link interference (CLI) between a third RSRP associated with a third link between the first UE and a third UE, and a fourth RSRP associated with a fourth link between a fourth UE and the third UE. In a more particular example, SL resource selection circuitry 440 and/or a module included in SL resource selection circuitry 440 can be configured as means for determining, for at least a second device, a cross-link interference (CLI) between a third RSRP associated with a third link between the first UE and a third UE, and a fourth RSRP associated with a fourth link between a fourth UE and the third UE. For example, SL resource selection circuitry 440 can be configured to perform the preceding functions using techniques described below in connection with 1506 of FIG. 15, and/or 2018 of FIG. 20.

As another example, SL resource selection circuitry 440 and/or a module included in SL resource selection circuitry 440 can be configured to determine that the CLI is above a CLI threshold and/or determine that resources reserved by the third UE are unavailable based on the CLI above the CLI threshold. In a more particular example, SL resource selection circuitry 440 and/or a module included in SL resource selection circuitry 440 can be configured as means for determining that the CLI is above a CLI threshold and/or means for determining that resources reserved by the third UE are unavailable based on the CLI above the CLI threshold. For example, SL resource selection circuitry 440 can be configured to perform the preceding functions using techniques described below in connection with 1512 of FIG. 15, and/or 2018 of FIG. 20.

As another example, SL resource selection circuitry 440 and/or a module included in SL resource selection circuitry 440 can be configured to receive a packet to be transmitted using a sidelink (SL) slot. In a more particular example, SL resource selection circuitry 440 and/or a module included in SL resource selection circuitry 440 can be configured as means for receiving a packet to be transmitted using a sidelink (SL) slot. For example, SL resource selection circuitry 440 can be configured to perform the preceding functions using techniques described below in connection with 1122 of FIG. 11, and/or 2020 of FIG. 20.

Additionally, in some aspects, processor 404 can include SL resource allocation technique selection circuitry 442 configured for various functions. For example, SL resource allocation technique selection circuitry 442 and/or a module included in SL resource allocation technique selection circuitry 442 can be configured to determine one or more parameters related to reliability of sidelink transmission to a second UE. In a more particular example, SL resource allocation technique selection circuitry 442 and/or a module included in SL resource allocation technique selection circuitry 442 can be configured as means for determining one or more parameters related to reliability of sidelink transmission to a second UE. For example, SL resource allocation technique selection circuitry 442 can be configured to perform the preceding functions using techniques described below in connection with 1104 of FIG. 11, and/or 1904 of FIG. 19.

For example, SL resource allocation technique selection circuitry 442 and/or a module included in SL resource allocation technique selection circuitry 442 can be configured to select, based on the one or more parameters, a resource selection technique from a plurality of resource selection techniques. In a more particular example, SL resource allocation technique selection circuitry 442 and/or a module included in SL resource allocation technique selection circuitry 442 can be configured as means for selecting, based on the one or more parameters, a resource selection technique from a plurality of resource selection techniques. For example, SL resource allocation technique selection circuitry 442 can be configured to perform the preceding functions using techniques described below in connection with 1106 of FIG. 11, and/or 1904 of FIG. 19.

For example, SL resource allocation technique selection circuitry 442 and/or a module included in SL resource allocation technique selection circuitry 442 can be configured to measure power received in a plurality of resource elements, wherein the one or more parameters comprises a channel utilization parameter calculated based on the power received in the plurality of resource elements. In a more particular example, SL resource allocation technique selection circuitry 442 and/or a module included in SL resource allocation technique selection circuitry 442 can be configured as means for measuring power received in a plurality of resource elements, wherein the one or more parameters comprises a channel utilization parameter calculated based on the power received in the plurality of resource elements. For example, SL resource allocation technique selection circuitry 442 can be configured to perform the preceding functions described below in connection with 1104 of FIG. 11, and/or 1904 of FIG. 19.

For example, SL resource allocation technique selection circuitry 442 and/or a module included in SL resource allocation technique selection circuitry 442 can be configured to request that the report from the second UE be based on a comparison of an SIR between the first link and links from at least one device of the one or more devices. In a more particular example, SL resource allocation technique selection circuitry 442 and/or a module included in SL resource allocation technique selection circuitry 442 can be configured as means for requesting that the report from the second UE be based on a comparison of an SIR between the first link and links from at least one device of the one or more devices. For example, SL resource allocation technique selection circuitry 442 can be configured to perform the preceding functions using techniques described below in connection with 1116 of FIG. 11, and/or 2008 of FIG. 20.

Additionally, in some aspects, processor 404 can include communications manager circuit 446 configured for various functions. For example, communications manager circuit 446 and/or a module included in communications manager circuit 446 can be configured to transmit the packet to a second UE on a set of sidelink resources of the sidelink resource pool; receive a resource report from the second UE, the resource report indicative of a first resource availability comprising one or more first available sidelink resources of the sidelink resource pool; transmit a request to the second UE for the resource report; receive a sidelink control information (SCI) message from a third UE; and/or receive an SCI message from a third UE. For example, communication manager circuitry 446 can be configured to perform the preceding functions using techniques described below in connection with 516, 612, 626, 722, 1126, 1202, 1210, 1316, 1502, 1504, 1706, 1710, 1804, 1808, 1812, 1904, 2004, 2008, and/or 2020 of FIGS. 5-7, 11-13, 15, and/or 17-20.

Processor 404 can manage bus 402 and can perform general processing, including the execution of software stored on computer-readable medium 406, which, when executed by processor 404, causes processing system 414 to perform the various functions described below (e.g., in connection with FIGS. 5-7, 10-13A, and 15) for any particular apparatus. In some aspects, computer-readable medium 406 and memory 405 can also be used for storing data that is manipulated by processor 404 when executing software.

One or more processors 404 in the processing system can execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software can reside on a computer-readable medium 406. The computer-readable medium 7406 can be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that can be accessed and read by a computer. The computer-readable medium 406 can reside in the processing system 414, external to the processing system 414, or distributed across multiple entities including the processing system 414. The computer-readable medium 406 can be embodied in a computer program product. By way of example, a computer program product can include a computer-readable medium in packaging materials. Those skilled in the art will recognize how best to implement the described functionality presented throughout this disclosure depending on the particular application and the overall design constraints imposed on the overall system.

In one or more examples, computer-readable storage medium 406 can SL resource selection software 452 configured for various functions, including, for example, combining sidelink resource availability information from multiple sources (e.g., UE 400 and another nearby UE) to identify resources in a selection window that are available, determining an adaptive reference power received power (RSRP) threshold based on an SIR threshold and an RSRP of a signal from a transmitting UE (e.g., UE 400, or another nearby UE), and/or determining that a resource is not available based on a cross-link interference estimation. For example, SL resource selection software 452 can be configured to implement one or more of the functions described below in connection with FIGS. 5, 7, 10, 11, 13A, and 15, such as functions described in connection with 524, 730, 1032, 1124, 1302, and/or 1506. Additionally, in some aspects, computer-readable storage medium 406 can include SL resource allocation technique selection software 454 configured for various functions, including, for example, selecting a resource selection technique (e.g., a particular resource selection technique that includes various actions) that is appropriate based on one or more parameters indicative of transmission reliability. For example, SL resource allocation technique selection software 454 can be configured to implement one or more of the functions described below in connection with FIGS. 7 and 11, such as functions described in connection with 714, 716, 1104, and 1106. Additionally, in some aspects, computer-readable storage medium 406 can include communications manager software 456 configured for various functions, including, for example, transmitting the packet to a second UE on a set of sidelink resources of the sidelink resource pool; receiving a resource report from the second UE, the resource report indicative of a first resource availability comprising one or more first available sidelink resources of the sidelink resource pool; transmitting a request to the second UE for the resource report; receiving a sidelink control information (SCI) message from a third UE; and/or receive an SCI message from a third UE. For example, communication manager circuitry 446 can be configured to perform the preceding functions using techniques described below in connection with 516, 612, 626, 722, 1126, 1202, 1210, 1316, 1502, 1504, 1706, 1710, 1804, 1808, 1812, 1904, 2004, 2008, and/or 2020 of FIGS. 5-7, 11-13, 15, and/or 17-20.

In some aspects, UE 400 can include means for combining sidelink resource availability information from multiple sources (e.g., UE 400 and another nearby UE) to identify resources in a selection window that are available, determining an adaptive reference power received power (RSRP) threshold based on an SIR threshold and an RSRP of a signal from a transmitting UE (e.g., UE 400, or another nearby UE), and/or determining that a resource is not available based on a cross-link interference estimation, and/or means for electing a resource selection technique (e.g., a particular resource selection technique that includes various actions) that is appropriate based on one or more parameters indicative of transmission reliability. In some aspects, the aforementioned means can be the processor(s) 404 shown in FIG. 4 configured to perform the functions recited by the aforementioned means. In another aspect, the aforementioned means can be a circuit or any apparatus configured to perform the functions recited by the aforementioned means.

Of course, in the above examples, the circuitry included in the processor 404 is merely provided as an example, and other means for carrying out the described functions can be included within various aspects of the present disclosure, including but not limited to the instructions stored in the computer-readable storage medium 406, or any other suitable apparatus or means described in any one of FIGS. 1 and/or 2 and utilizing, for example, the processes and/or algorithms described below in connection with FIGS. 5-7, 10-13A, 15, 19, and/or 20.

Figure 5:
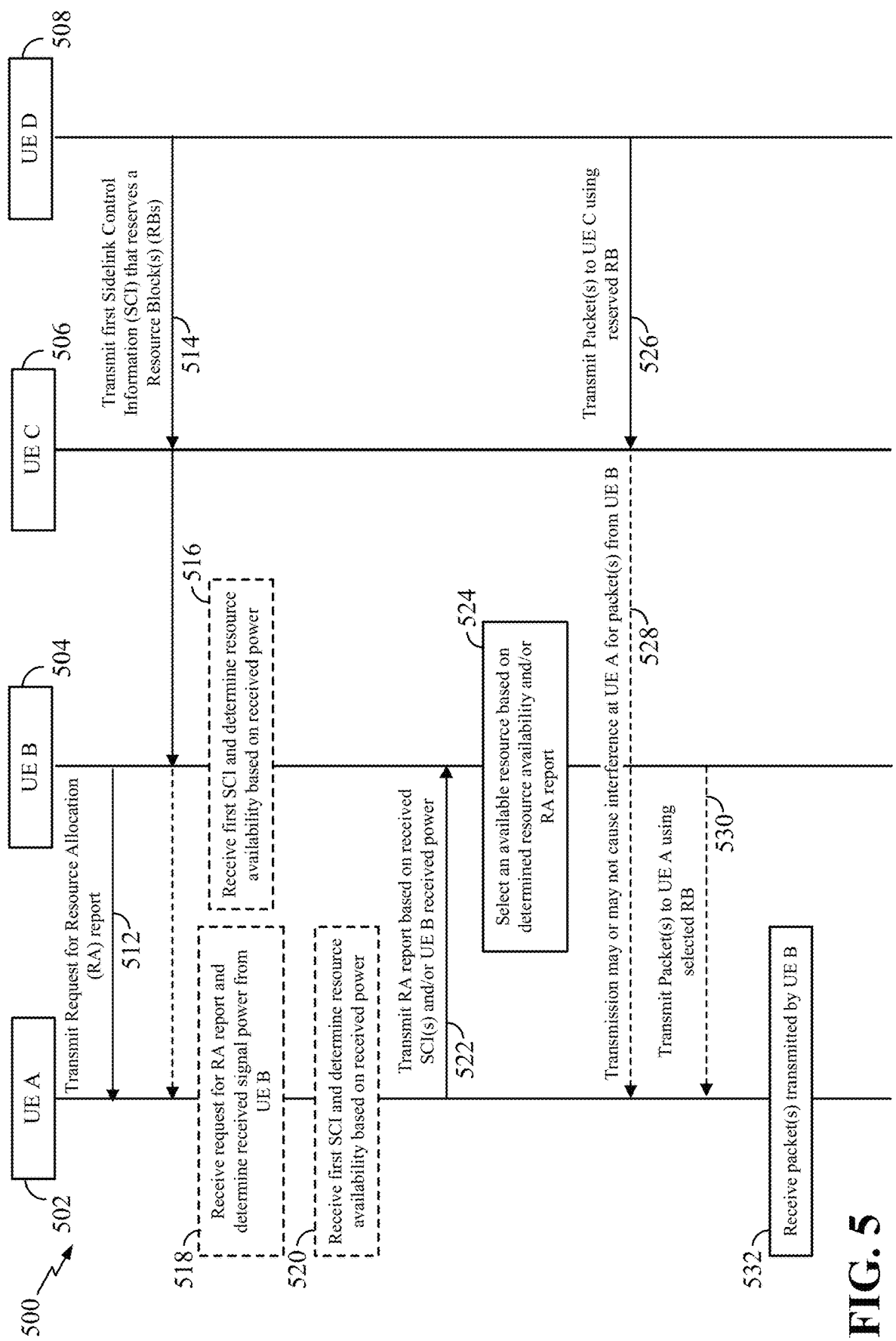
FIG. 5 is a call flow diagram illustrating exemplary sidelink signaling between various user equipment (UEs) to use information from multiple UEs to schedule and transmit data within a wireless communication system in accordance with some aspects of the disclosed subject matter.

FIG. 5 is a call flow diagram illustrating exemplary sidelink signaling between various UEs (e.g., UE A 502, UE B 504, UE C, 506, and UE D 508) to schedule and transmit data within a wireless communication system 500 in accordance with some aspects of the disclosed subject matter. In some aspects, wireless communication system 500 can correspond, for example, to a portion of RAN 100 described above in connection with, and shown in, FIG. 1, and/or a portion of wireless communication system 200 described above in connection with, and shown in, FIG. 2.

In some examples, a base station can provide or assist sidelink resource allocation (RA) for one or more UEs in RAN 100. Such base station-assisted sidelink resource allocation may correspond to gNB-assisted sidelink RA (mode 1) as described in release-16 of 3GPP specifications for 5G NR. In mode 1 sidelink RA, a base station or other scheduling entity schedules sidelink slots for a UE. In other examples, a UE may employ autonomous sidelink resource allocation, which may correspond to autonomous sidelink RA (mode 2) as also described in release-16 of 3GPP specifications for 5G NR. In mode 2 sidelink RA, a UE can select and/or reserve one or more sidelink slots or resources unassisted by a base station. As described below in connection with FIG. 8, a UE that has sidelink data to transmit (e.g., UE 126, UE 132, UE B 504, or UE D 508) can monitor sidelink resources within a sliding sensing window for messages indicating that another UE has reserved a particular set of resources in an upcoming resource selection window corresponding to the current sensing window. For example, a UE may monitor a physical sidelink control channel (PSCCH) for sidelink control information (SCI) messages. These SCI messages can include a reservation for resources associated with one or more upcoming sidelink (SL) slots. In such an example, the UE can decode received SCI messages, and identify reserved resources. In another example, an SCI may indicate that no upcoming resources are reserved by the device that transmitted the SCI.

When a UE transmits an SCI, which may include sidelink resource allocation or reservation information, the UE may include a demodulation reference signal (DMRS) to facilitate channel estimation of the PSCCH and decoding of the SCI. In some examples, a sensing UE may additionally estimate a reference signal received power (RSRP) based on the DMRS included in the SCI, or any other suitable reference signal. In a further example, a sensing UE may estimate an RSRP of a signal transmitted on a sidelink data channel (e.g., a physical sidelink shared channel, PSSCH). Here, the RSRP may be estimated based on a DMRS associated with the message. Thus, a sensing UE can use an RSRP of the SCI and/or an RSRP of a signal transmitted on the PSSCH to determine whether a resource reserved by the device that transmitted the signal is available for use by the sensing UE. For example, a UE can determine an RSRP associated with the device that transmitted the signal, and can compare the RSRP to a suitable RSRP threshold (e.g., a predetermined RSRP threshold). In such an example, if the RSRP is below the threshold, the UE can identify any resources reserved by the device as available. If the RSRP is above the threshold, the UE can identify any resources reserved by the device as unavailable. Note that a UE can be configured to identify an RSRP that is equal to the threshold as below the threshold or above the threshold.

In some examples, a sensing UE can determine an average RSRP associated with a particular device based on a suitable number (e.g., a predetermined number) of signals transmitted by the device and/or signals transmitted by the device over a suitable (e.g., predetermined) time period. For example, the UE can record an RSRP for each signal (e.g., a signal transmitted using the PSSCH or PSCCH) the UE detects from a particular UE, and can determine an average of a last three RSRPs. As another example, the UE can record an RSRP for each signal the UE detects from a particular UE, and can determine an average of RSRPs of signals received within the previous 8 slots. As yet another example, the UE can record an RSRP for each signal the UE detects from a particular UE, and can determine an average of up to three RSRPs of signals received within the previous 8 slots. Note that the values are merely examples, and within the present disclosure, reference to such an average should be understood as any suitable combination or aggregation of any suitable number of RSRP values over any suitable period of time. Averaging multiple RSRP values can facilitate a UE in accounting for mobility of the UE that received the signals and/or the device (e.g., UE) that transmitted the signals.

In some aspects, the UE can select one or more of the available resources for a future transmission. Additionally, in some aspects, the UE can transmit an SCI message on the PSCCH indicating that the selected resource is reserved.

Some UEs may be relatively power sensitive (e.g., the UE may have a limited power budget, such as a wearable device or battery operated sensors), and/or may not require low latency communications (e.g., the UE may not transmit data that is relatively insensitive to delay, such as wearable device or an internet-of-things device). Thus, such UEs may prioritize power savings over resource monitoring. For example, such a UE can realize power savings by monitoring fewer resources. That is, monitoring resources can require power to amplify received signals and/or to attempt to decode received signals. However, if a UE anticipates transmitting data using one or more SL slots, monitoring fewer resources may result in the UE having difficulty identifying available resources for transmitting.

Therefore, a further aspect of the present disclosure provides that a UE that anticipates transmitting data using one or more SL slots (which is sometimes referred to herein as a TX UE) can leverage resources of a nearby UE (e.g., a UE that is a target for the data to be transmitted using the one or more SL slots) to increase the fraction of a sensing window that can be monitored and/or to monitor the resources within the sensing window with a finer granularity. For example, the TX UE can request that a nearby UE (which may or may not be a UE that is a target of a transmission from the TX UE, which is sometimes referred to herein as an RX UE) monitor resources in the sensing window and report which resources in a selection window are available and/or unavailable.

In some aspects, a nearby UE and/or RX UE may have a larger power budget for monitoring (e.g., due to a larger battery, due to less power being dedicated to other functions) than the TX UE and/or may be configured to continuously monitor resources for its own purposes. For example, a nearby UE can be a recipient of a transmission by the TX UE (e.g., as a target of a unicast communication or a member of a group of a multicast, groupcast, broadcast, or type of communication configured to transmit from one device to more than one device). Examples below are often described using an RX UE as a particular example of a nearby UE that monitors resources and provides a report to a TX UE. However, this is merely an example, and any nearby UE can monitor resources and provide a report to a TX UE.

In some aspects, an RX UE (e.g., UE A 502, UE C 506) can monitor resources within a sliding sensing window for messages indicating that another UE (e.g., UE D 508) has reserved particular resources in an upcoming resource selection window. For example, the RX UE can monitor the PSCCH for SCI messages that can include a reservation for one or more resources associated with one or more upcoming SL slots. In such an example, the RX UE can decode received SCI messages, and identify resources that the SCI indicates as being reserved.

When a UE transmits an SCI, the UE may include a DMRS in the transmission to facilitate performance of channel estimation of the PSCCH and facilitate decoding of the SCI. Further, when a UE transmits a message on the PSSCH, the UE may include a DMRS for similar reasons. In some aspects, an RX UE can estimate the reference signal received power (RSRP) based on the DMRS included in the SCI, the DMRS included in the PSSCH message, or any other suitable reference signal.

According to a further aspect of the present disclosure, an RX UE can additionally or alternatively use such RSRP of the SCI and/or RSRP of a signal transmitted on the PSSCH to determine whether a resource reserved by the device that transmitted the signal (e.g., UE D 508) is available for use by the TX UE. For example, the RX UE can determine an RSRP associated with the device, and can compare the RSRP to a suitable RSRP threshold (e.g., a predetermined threshold). In such an example, if the RSRP is below the threshold, the UE can identify any resources reserved by the device as available. If the RSRP is above the threshold, the UE can identify any resources reserved by the device as unavailable. Note that a UE can be configured to identify an RSRP that is equal to the threshold as below the threshold or above the threshold.

In a still further aspect, an RX UE can determine an average, an aggregate, or other suitable calculation of an RSRP associated with a particular device based on a suitable number (e.g., a predetermined number) of signals transmitted by the device and/or signals transmitted by the device over a suitable (e.g., predetermined) time period. In the present disclosure, reference to an average RSRP should be understood not only referring to an arithmetic mean, but broadly including any average, aggregate, or other suitable calculation based on a plurality of RSRP estimates. For example, the RX UE can record an RSRP for each signal (e.g., a signal transmitted using the PSSCH or PSCCH) the RX UE detects from a particular UE, and can determine an average of a last three RSRPs. As another example, the RX UE can record an RSRP for each signal the RX UE detects from a particular UE, and can determine an average of RSRPs of signals received within the previous 8 slots. As yet another example, the RX UE can record an RSRP for each signal the RX UE detects from a particular UE, and can determine an average of up to three RSRPs of signals received within the previous 8 slots. Note that the values provided above are merely examples, and an RX UE can record and average any suitable number of RSRP values over any suitable period of time.

In some aspects, an RX UE can generate a report indicating which resources in the resource selection window are available and/or which resources are not available. Additionally, in some aspects, the RX UE can transmit such a report to one or more TX UEs (e.g., UE B 504 and/or UE D 508).

A TX UE that receives such a report can utilize the report to supplement sidelink resource allocation information that the TX UE detected, which can provide information about resource availability from multiple locations (e.g., the locations of the TX UE and the RX UE that provided the report).

In some aspects, for example as described below in connection with FIGS. 6 and 13A, an RSRP threshold used to determine whether a particular resource is available can be adaptively determined based on an observed received signal power from the TX UE. Alternatively, the RSRP threshold can be a predetermined value based on one or more parameters, such as a priority of a packet(s) being transmitted, a priority of a device(s) to which a transmission is directed, a latency requirement associated with the packet(s), a cast type of the transmission (e.g., unicast, multicast, groupcast, or broadcast), any other suitable parameter, and/or any suitable combination of parameters. In some aspects, accounting for a difference in power of a signal from the TX UE (e.g., UE B 504) and a potentially interfering TX UE (e.g., UE D 508) can facilitate efficient use of resources. For example, if the received power of a transmission from the TX UE observed at the RX UE is at least a threshold amount (e.g., 10 decibels (dB)) greater than the received power of a transmission from the potentially interfering TX UE observed at the RX UE, a transmission from the TX UE to the RX UE can be expected to be received and decoded with relatively high reliability. If the signal from the potentially interfering TX UE (e.g., UE D 508) is only sensed by the TX UE (e.g., UE B 504), the received power at the TX UE (e.g., UE B 504) may be greater than a fixed threshold (and marked unavailable by the TX UE) when the resource can be used for reliable communications to the RX UE.

A TX UE (e.g., UE B 504) may further combine a report that the TX UE itself generates (e.g., indicating which resources in the resource selection window are available and/or unavailable) with a report received from an RX UE (e.g., UE A 502) using any suitable technique or combination of techniques. For example, the report from the RX UE can be formatted as a binary matrix or string in which each bit represents particular resources (e.g., a particular RB, a particular slot, etc.). In such an example, the TX UE can perform a bitwise logical AND operation between a report generated by the TX UE and the report received from the RX UE.

In some aspects, a resource can be identified as available if it is identified as available in both the report generated by the TX UE and the report received from the RX UE. For example, an available resource can be designated as a binary 1, such that if both reports include a 1 for a particular resource, the resource can be designated available (e.g., 1 AND 1=1, or 1×1=1). In such an example, if one report includes a 1 and the other report includes a 0 for a particular resource, the resource can be designated unavailable (e.g., 1 AND 0=0, or 1×0=1). Note that this is merely an example, and the reports can be combined using any other suitable operation(s).

In some aspects, any suitable combining technique can be used to combine information generated by a TX UE (e.g., UE B 504) and an RX UE (e.g., UE A 502). For example, UE B 504 can generate a first report that represents at least a portion of a resource selection window, and UE A 502 can generate a second report that represents at least the portion of a resource selection window. In some aspects, UE A 502 can transmit the second report to UE B 504 (e.g., using a sidelink reporting link, using the physical sidelink shared channel (PSSCH), using a physical sidelink control channel (PSCCH), and/or any other suitable resources). In some aspects, UE B 504 can combine the first report and the second report, to generate an output that represents a combination of information from both reports. In some aspects, UE B 504 can randomly select resources from the resources identified as available in the output that represents the combination of information from both reports.

In some aspects, a TX UE (e.g., UE B 504) can select a resource for transmission randomly from the selection window. For example, a TX UE that is constrained from monitoring for SCI from other UEs can randomly select a resource for transmission. As another example, if there is relatively low congestion (e.g., a relatively low channel busy ration (CBR), a relatively low channel occupancy ration (SL CR)) if the transmission has a relatively low priority, if the transmission has a relatively low reliability requirement, etc., the TX UE can randomly select a resource for transmission (e.g., transmission of a packet(s) to an RX UE). In such an example, monitoring of resources in a sensing window, which can reduce power consumption by the TX UE. In some aspects, UE 504 B can determine a CBR threshold at a higher layer (e.g., an application layer), and can provide the CBR threshold to a lower layer (e.g., a physical layer). In further aspects, the TX UE may re-use a CBR value measured by other UE(s) by means of receiving it within a report or within a regular data transmission. Then, the TX UE may use this remotely measured and reported CBR to make a choice between the proposed resource selection procedures.

In some aspects, UE B 504 can be configured to transmit data over a sidelink channel (e.g., a physical sidelink shared channel (PSSCH)) to one or more other UEs, such as UE A 502. Additionally, UE C 506 and UE D 508 can represent other UEs that are communicating using the PSSCH, and may cause interference with transmission sent by UE B 504 (e.g., to UE A 504) if they are transmitted using the same resources. In the signaling diagram of FIG. 5, UE A 502, UE B 504, UE C 506, and/or UE D 508 can schedule transmissions autonomously (e.g., using sidelink resource allocation mode 2).

At 512, UE B 504 can transmit a request to a nearby UE (e.g., UE A 502) for a resource allocation (RA) report. In some aspects, the request can include any suitable information, such as a priority associated with a transmission (e.g., a priority that is included in sidelink control information (SCI)), a priority associated with a target of the communication (e.g., UE A 502, and/or one or more other UEs). Additionally or alternatively, in some aspects, the request for the RA report can include a request that the UE that receives the request for the RA report use an adaptive threshold when determining whether a particular resource is available or unavailable.

In some aspects, UE B 504 can use any suitable technique or combination of techniques to transmit the request. For example, UE B 504 can transmit the request using any suitable communication network (e.g., via a RAN, such as RAN 100 or RAN 204, using one or more SL slots, etc.). In some aspects, UE B 504 can transmit the request using any suitable communication interface, such as a transceiver (e.g., transceiver 410). In some aspects, UE B 504 can transmit the request using sidelink resources (e.g., PSCCH and/or PSSCH). In some aspects, information related to the request (e.g., a source ID, an SIR threshold, etc.) can be transmitted using PSSCH.

In some aspects, UE B 504 can transmit a request using reserved resources (e.g., reserved using sidelink control information (SCI)). Additionally or alternatively, UE B can transmit a request using resources that are pre-configured to transmit requests for resource allocation reports report (e.g., resources defined in a standard as designated for transmission of requests for resource allocation reports report). Such pre-configured resources can be designated for transmitting requests for resource allocation reports, and may or may not be restricted to only transmitting requests for resource allocation reports.

At 514, UE D 508 can transmit a first SCI message that includes a reservation for resources. For example, as described above, the SCI can reserve one or more resources for UE D 508 to transmit data (e.g., one or more packets) in a resource selection window. In some aspects, the first SCI message can include a destination ID (e.g., identifying information associated with a particular UE, identifying information associated with a group for groupcast transmission, etc.).

In some aspects, UE D 508 can use any suitable technique or combination of techniques to transmit the first SCI. For example, UE D 508 can transmit the request using any suitable communication network (e.g., via a RAN, such as RAN 100 or RAN 204, using one or more SL slots, etc.). In some aspects, UE D 508 can transmit the SCI using any suitable communication interface, such as a transceiver (e.g., transceiver 410). In some aspects, UE D 508 can transmit the request using PSCCH.

At 516, UE B 504 can receive the first SCI message transmitted by UE D 508 at 514. Additionally, in some aspects, at 516, UE B 504 can determine resource availability based on information in the first SCI using any suitable technique or combination of techniques. For example, UE B 504 can use one or more techniques described above in connection with FIG. 5, and/or one or more techniques described below in connection with FIGS. 11, 13A, and/or 15. Although not shown, UE B 504 can receive SCI messages from any suitable number of UEs that are proximate to UE B 504 (e.g., in addition the first SCI message). In such examples, UE B 504 can determine resource availability using information derived from any or all of the received SCI messages.

In some aspects, UE B 504 can use any suitable technique or combination of techniques to receive the first SCI message. For example, UE B 504 can sample and buffer a received wireless signal encoded with information included in the SCI, and apply suitable processing to the buffered signal such as energy detection, demodulation, decoding, etc. In some aspects, UE B 504 can receive first SCI message using any suitable communication interface, such as a transceiver (e.g., transceiver 410). In some aspects, UE B 504 can receive the first SCI message using PSCCH.

In some aspects, UE B 504 may not receive the first SCI message transmitted by UE D 508 at 514. For example, UE B 504 may be sufficiently distant (e.g., physical distance and/or RF distance) that UE B cannot reliably receive and/or decode the first SCI message. Additionally or alternatively, in some aspects, UE B 504 can omit monitoring of one or more resources (e.g., a resource used to transmit the first SCI message). For example, UE B 504 may be configured to operate on a discontinuous basis (e.g., based on a discontinuous reception interval) and/or may be configured to monitor less than all of the resources in the resource sensing window (e.g., only a subset of subcarriers, only a subset of resource elements within one or more sub-carriers, etc.). As another example, UE B 504 can be configured to omit any sensing in the resource sensing window. In such an example, UE B 504 can select a resource for transmission using only information about resource availability from one or more other UEs (e.g., using a report from UE A 502, and/or one or more other UEs), or without using any information about resource availability (e.g., selecting a resource randomly).

At 518, UE A 502 can receive the request for an RA report and/or any other suitable signal transmitted by UE B 504 using any suitable technique or combination of techniques. In some aspects, UE A 502 can use any suitable technique or combination of techniques to receive the request for an RA. For example, UE A 502 can sample and buffer a received wireless signal encoded with information included in the request, and apply suitable processing to the buffered signal such as energy detection, demodulation, decoding, etc. In some aspects, UE A 502 can receive request using any suitable communication interface, such as a transceiver (e.g., transceiver 410). In some aspects, UE A 502 can receive the request using sidelink resources (e.g., PSSCH and/or PSSCH). For example, information associated with the request can be transmitted using PSSCH.

In some aspects, UE A 502 can determine a received power of a signal transmitted by UE B 504 using any suitable technique or combination of techniques. For example, UE A 502 can determine a received power by estimating a reference signal received power (RSRP) based on a demodulation reference signal (DMRS) included in a transmission from UE B 504. In a more particular example, the DMRS can be included in an SCI message transmitted by UE B 504, and/or any other suitable message transmitted using the PSCCH. As another more particular example, the DMRS can be associated with a message transmitted by UE B 504 using the PSSCH.

In some aspects, UE A 502 may not measure the received power of a signal transmitted by UE B for the express purpose of determining resource availability. However, in general UE A 502 can be configured to determine the RSRP of signals transmitted by UE B for other operations, such as channel estimation.

At 520, UE A 502 can receive the first SCI message transmitted by UE D 508 at 514. Additionally, in some aspects, at 520, UE A 502 can determine resource availability based on information in the first SCI using any suitable technique or combination of techniques. For example, UE A 502 can use one or more techniques described above in connection with FIG. 5, one or more techniques described below in connection with FIGS. 11, 13A, and/or 15. Although not shown, UE A 502 can receive SCI messages from any suitable number of UEs that are proximate to UE A 502 (e.g., in addition the first SCI message). In such examples, UE A 502 can determine resource availability using information derived from any or all of the received SCI messages.

In some aspects, UE A 502 may not receive the first SCI message transmitted by UE D 508 at 514. For example, UE A 502 may be sufficiently distant (e.g., physical distance and/or RF distance) that UE A 502 cannot reliably receive and/or decode the first SCI message. Additionally or alternatively, in some aspects, UE A 502 can omit monitoring of one or more resources (e.g., a resource used to transmit the first SCI message). For example, UE A 502 may be configured to operate on a discontinuous basis (e.g., based on a discontinuous reception interval) and/or may be configured to monitor less than all of the resources in the resource sensing window (e.g., only a subset of subcarriers, only a subset of resource elements within one or more sub-carriers, etc.).

In some aspects, UE A 502 can use any suitable technique or combination of techniques to receive the first SCI message. For example, UE A 502 can sample and buffer a received wireless signal encoded with information included in the SCI, and apply suitable processing to the buffered signal such as energy detection, demodulation, decoding, etc. In some aspects, UE A 502 can receive the first SCI message using any suitable communication interface, such as a transceiver (e.g., transceiver 410). In some aspects, UE A 502 can receive the first SCI message using PSCCH.

In some aspects, UE A 502 (and/or UE B 504) can use a fixed threshold to determine which resources are available. For example, UE A 502 may measure an RSRP for a signal from UE D 508 of −102 decibel-milliwats (dBm) (e.g., $RSRP_{D \to A}$=−102 dBm), and an RSRP for a signal from another UE (e.g., UE C 504 is used in this example for convenience) of −92 dBm (e.g., $RSRP_{C \to A}$=−92 dBm). In the example, UE A 502 can determine a fixed threshold for received signals that can be used to identify which signals are likely to cause an unacceptable level of interference. In the example, UE A 502 sets the threshold at −107 dBm based on a priority associated with a transmission (e.g., $Prior_B$, reported in SCI from UE B 504). As another example, UE A 502 can receive a value at which to set the threshold from UE B 504 (e.g., in associated with a request, such as the request transmitted by UE B 504 at 512. As yet another example, UE A 502 can determine a priority in a higher layer (e.g., an application layer) based on a QoS target, $Prior_A$, $Prior_B$, and/or any other suitable factors, and can provide the priority to a lower layer (e.g., a physical layer) In some aspects, UE B 502 can set an RSRP threshold based on a priority associated with a transmission (e.g., $Prior_B$) and/or a device priority associated with UE A 502 (e.g., $Prior_A$, assigned by an application that maintains a connection to UE A). In general, priority can be a value, which can represent, for example, a latency requirement, and/or any other suitable reliability requirement(s). In such an example, UE A 502 can determine that resources reserved by UE C 506 or UE D 508 are unavailable, because the RSRP measured for signals from UE C 506 and UE D 508 are above the threshold.

In some aspects, UE A 502 (and/or UE B 504) can use an adaptive threshold and/or a signal-to-interference (SIR) threshold based on a power of a signal received from a transmitting UE (e.g., UE B 504) to determine which resources are available. For example, UE A 502 may measure the same RSRP from UE C 506 and UE D 508 as in the preceding example (e.g., $RSRP_{C \to A}$=−92 dBm, and $RSRP_{D \to A}$=−102 dBm), and an RSRP for a signal from UE B of −90 dBm (e.g., $RSRP_{B \to A}$=−90 dBm). In the example, UE A 502 can determine an SIR threshold representing a difference in signal power of a desired signal (e.g., a signal from UE B 502) and a potentially interfering signal (e.g., a signal from UE C 506 and/or UE D 508). In the example, UE A 502 sets the SIR threshold at 10 dB based on a priority associated with a transmission, a device priority associated with UE A 502, and/or any other suitable factor(s), such as a modulation and coding scheme (MCS) used by UE B 504 to transmit the signal (e.g., a lower code rate and/or lower modulation order can be more robust to interference, while higher code rates and/higher modulation order can be more sensitive to interference).

In a particular example, UE A 502 can determine an SIR between the TX UE and a potentially interfering UE (e.g., SIR(B, C)=−92 dBm−(−90 dBm)=2 dB, and SIR(B, D)=−102 dBm−(−90 dBm)=12 dB), which UE A 502 can compare to the SIR threshold. In such an example, UE A 502 can determine that resources reserved by UE C 506 are unavailable because SIR(B,C) is less than the SIR threshold, while resources reserved by UE D 508 are available because SIR(B,D) satisfies the SIR threshold. Note that because subtraction of two values in the log domain corresponds to division in the linear domain followed by conversion to the log domain. Accordingly, SIR can be calculated by subtracting an RSRP of the interfering signal(s) expressed in the log domain (e.g., dBm) from the RSRP of the desired signal expressed in the log domain.

Additionally or alternatively, in another particular example, UE A 502 can determine an adaptive RSRP threshold based on the SIR threshold and the RSRP of a signal received from the transmitting UE (e.g., $RSRP_{adpt-thr}=RSRP_{B \to A}-SIR_{thr}$). In the example, UE A 502 can calculate the adaptive threshold ($RSRP_{adpt-thr}$=−90 dB−10 dB=−100 dB. In such an example, UE A 502 can determine that resources reserved by UE C 506 are unavailable because $RSRP_{C \to A}$ exceeds the adaptive RSRP threshold (e.g., −92 dBm>−100 dBm), while resources reserved by UE D 508 are available because, and $RSRP_{D \to A}$ satisfies the adaptive RSRP threshold (e.g., −102 dBm<−100 dBm).

Note that although the preceding examples are described using a single RSRP value for each UE, this is merely an example, and any suitable number of RSRP values can be averaged to identify an RSRP value to be compared to a threshold and/or to estimate an SIR. Additionally, although described in connection with UE A 502, UE B 504 can be configured to use a fixed RSRP threshold, an SIR threshold, and/or an adaptive RSRP threshold. For example, UE A 502 can include RSRP values associated with another UE (e.g., UE D 508) measured at UE A 502, an RSRP value associated with UE B 504, one or more SIR values (e.g., based on a comparison of a link between UE B 504 and UE A 502, and a link between another UE, such as UE D 508, and UE A 502), and/or any other suitable values.

In some aspects, UE A 502 can set the $SIR_{threshold}$ based on one or more parameters. For example, if UE A 502 receives and/or otherwise determines a modulation and coding scheme (MCS) index to be utilized by UE B 504, UE A 502 can use the MCS index to set the $SIR_{threshold}$. As another example, UE A 502 can set the $SIR_{threshold}$ based on quality of service (QoS) targets of UE B 504 and/or UE A 502.

In some aspects, the $SIR_{threshold}$ can be set in a range of about 0 dB to about 20 dB. For example, a very low code rate and low modulation order (e.g., QPSK), UE A 502 can set the SIR threshold relatively low (e.g., 0 dB. 1 dB, 5 dB). As another example, for 64-QAM modulation with relatively high channel code rate, UE A 502 can set the SIR threshold relatively high (e.g., about 20 dB). However, these are merely examples, and the $SIR_{threshold}$ can be set to various values (e.g., any value in the range from about 0 dB to about 20 dB). Alternatively, in some aspects, the $SIR_{threshold}$ can be fixed (e.g., at a particular value, such as 7, dB, 8 dB, 9 dB, 10 dB, 11 dB, 12 dB, etc.). In some aspects, the $SIR_{threshold}$ can be provided to UE A 502 by UE B 504 (e.g., in connection with a request for a report).

At 522, UE A 502 can transmit an RA report based on a received power in the first SCI message and/or based on the UE B received power. In some aspects, the report can include a binary resource availability map (e.g., formatted as a matrix or string) that represents at least a portion of a resource selection window (e.g., as described above in connection with FIG. 5, and below in connection with FIG. 8).

In some aspects, UE A 502 can use any suitable technique or combination of techniques to transmit the RA report. For example, UE A 502 can transmit the request using any suitable communication network (e.g., via a RAN, such as RAN 100 or RAN 204, using one or more SL slots, etc.). In some aspects, UE A 502 can transmit the RA report using any suitable communication interface, such as a transceiver (e.g., transceiver 410). In some aspects, UE A 502 can transmit the RA report using a SL report link (e.g., sidelink report link 226 described above in connection with FIG. 2).

At 524, UE B 504 can receive the report and select an available resource based on the report received from UE A 502 and/or based on resource availability determined by UE B 504 (e.g., based on the received power associated the first SCI message received at 516, and/or the received power of any other suitable signal such as one or more SCI messages transmitted by other UEs). In some aspects, the resource availability determined by UE B 504 can be formatted as a binary resource availability map.

As described above in connection with FIG. 5, and below in connection with FIGS. 9, 14, and 16, in some aspects, UE B 504 can combine resource availability information received in the report from UE A 502 with resource availability information derived by UE B 504 using any suitable technique or combination of techniques. In some aspects, UE B 504 can use any suitable technique or combination of techniques to receive the RA report transmitted by UE A 502. For example, UE B 504 can sample and buffer a received wireless signal encoded with information included in the RA report, and apply suitable processing to the buffered signal such as energy detection, demodulation, decoding, etc. In some aspects, UE B 504 can receive the RA report using any suitable communication interface, such as a transceiver (e.g., transceiver 410). In some aspects, UE B 504 can receive the RA report using a SL report link (e.g., sidelink report link 226 described above in connection with FIG. 2).

In some aspects, UE B 504 can randomly select an available resource from the available resources identified in the report and/or resource availability information derived by UE B 504. For example, as described below in connection with FIG. 8, a portion of the resource selection window may not be suitable for selection (e.g., due to processing time associated with formatting a packet to be transmitted).

At 526, UE D 508 can transmit one or more packets intended for at least UE C using resources reserved by the first SCI. In some aspects, UE D 508 can use any suitable technique or combination of techniques to transmit the one or more packets. For example, UE D 508 can transmit the one or more packets using any suitable communication network (e.g., via a RAN, such as RAN 100 or RAN 204, using one or more SL slots, etc.). In some aspects, UE D 508 can transmit the one or more packets using any suitable communication interface, such as a transceiver (e.g., transceiver 410). In some aspects, UE D 508 can transmit the one or more packets using PSSCH.

At 528, the signal transmitted by UE D 508 at 526 may or may not interfere with a signal transmitted by UE B 504 to UE A 502. For example, if the selected resource to transmit one or more packets to UE A 502 is the same resource that UE D 508 used to transmit a message to UE C 506, the signal can cause at least some interference at UE A 502, which may reduce the likelihood that UE A 502 can reliability receive and/or decode a signal transmitted by UE B 504. As described below in connection with FIG. 13A, UE A 502 and/or UE B 504 can determine (e.g., at 520 or 516, respectively) that the amount of interference likely to be caused by the signal transmitted by UE D 508 at UE A 502 is unlikely to substantially reduce reliably below an acceptable level (e.g., less than about a 1% chance, less than about a 5% chance, less than about a 10% chance, etc.).

At 530, UE B 504 can transmit one or more packets intended for at least UE A using resources selected at 524. As described above, the resource can be a resource that is used by another relatively nearby UE (e.g., that is unlikely to interfere with reception at UE A 502) or a resource that is not used by any nearby UE. In some aspects, UE B 504 can use any suitable technique or combination of techniques to transmit the one or more packets. For example, UE B 504 can transmit the one or more packets using any suitable communication network (e.g., via a RAN, such as RAN 100 or RAN 204, using one or more SL slots, etc.). In some aspects, UE B 504 can transmit the one or more packets using any suitable communication interface, such as a transceiver (e.g., transceiver 410). In some aspects, UE B 504 can transmit the one or more packets using PSSCH.

At 532, UE A 502 can receive the packet(s) transmitted by UE B 504 that was transmitted using the selected resource. In some aspects, UE A 502 can use any suitable technique or combination of techniques to receive the packets(s) transmitted by UE B 504. For example, UE A 502 can sample and buffer a received wireless signal encoded with information included in the packet(s), and apply suitable processing to the buffered signal such as energy detection, demodulation, decoding, etc. In some aspects, UE A 502 can receive the packet(s) using any suitable communication interface, such as a transceiver (e.g., transceiver 410). In some aspects, UE A 502 can receive the packet(s) using PSSCH. Note that although not shown, in some aspects, UE B 504 can transmit an SCI message reserving the resource selected at 524.

Figure 6:
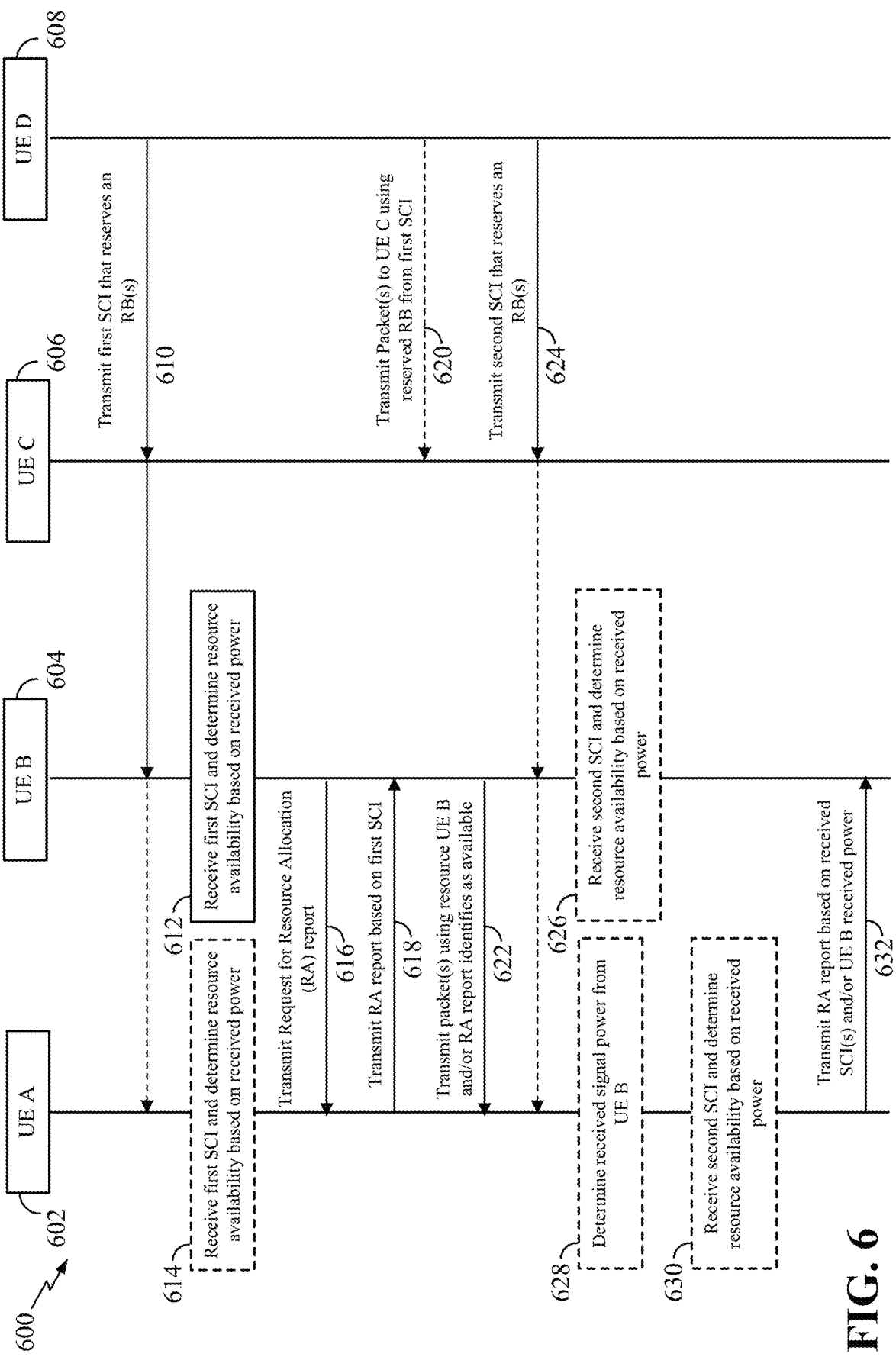
FIG. 6 is a call flow diagram illustrating exemplary sidelink signaling between various UEs to monitor resources using a different resource selection technique after a transmitting UE requests assistance monitoring resources from another UE within a wireless communication system in accordance with some aspects of the disclosed subject matter.

FIG. 6 is a signaling diagram illustrating exemplary sidelink signaling between various UEs (e.g., UE A 502, UE B 504, UE C, 506, and UE D 508) to monitor resources using a different resource selection technique after a transmitting UE requests assistance monitoring resources from another UE within a wireless communication system 600 in accordance with some aspects of the disclosed subject matter. In some aspects, wireless communication system 600 can correspond, for example, to a portion of RAN 100, wireless communication system 200, and/or wireless communication system 500 described above in connection with FIGS. 1, 2, and/or 5, respectively.

In some aspects, UE B 604 can be configured to transmit data over the PSSCH to one or more other UEs, such as UE A 602. Additionally, UE C 606 and UE D 608 can represent other UEs that are communicating using the PSSCH, and may cause interference with transmission sent by UE B 604 (e.g., to UE A 604) if they are transmitted using the same resources. In the signaling diagram of FIG. 6, UE A 602, UE B 604, UE C 606, and/or UE D 608 can schedule transmissions autonomously (e.g., using sidelink resource allocation mode 2), as described above in connection with FIG. 5.

At 610, UE D 608 can transmit a first SCI message that includes a reservation for one or more resources. For example, as described above in connection with FIG. 5, the SCI can reserve one or more resources for UE D 608 to transmit data (e.g., one or more packets) in a resource selection window. In some aspects, UE D 608 can transmit the SCI using any suitable technique or combination of techniques, such as techniques described above in connection with 514 of FIG. 5.

At 612, UE B 604 can receive the first SCI message transmitted by UE D 608 at 610. In some aspects, UE B 604 can use any suitable technique or combination of techniques to receive the first SCI message, such as techniques described above in connection with 514 of FIG. 5. Additionally, in some aspects, at 612, UE B 604 can determine resource availability based on information in the first SCI using any suitable technique or combination of techniques, such as techniques described above in connection with 516 of FIG. 5.

At 614, UE A 602 can receive the first SCI message transmitted by UE D 608 at 610. Additionally, in some aspects, at 614, UE A 602 can determine resource availability based on information in the first SCI using any suitable technique or combination of techniques, such as techniques described above in connection with 520 of FIG. 5. For example, UE A 602 can determine resource availability using a fixed RSRP threshold (e.g., because UE A 602 has not received a transmission from UE B 604 that can be used to determine SIR, because a threshold amount of time has elapsed since a previous transmission from UE B 604 was received, because the number of transmissions received from UE B 604 within a predetermine period of time is less than a minimum number, etc.).

In some aspects, UE A 602 may not receive the first SCI message transmitted by UE D 608 at 610. For example, UE A 602 may be sufficiently distant (e.g., physical distance and/or RF distance) that UE A 602 cannot reliably receive and/or decode the first SCI message. Additionally or alternatively, in some aspects, UE A 602 can omit monitoring of one or more resources (e.g., a resource used to transmit the first SCI message). For example, UE A 602 may be configured to operate on a discontinuous basis (e.g., based on a discontinuous reception interval) and/or may be configured to monitor less than all of the resources in the resource sensing window (e.g., only a subset of subcarriers, only a subset of resource elements within one or more sub-carriers, etc.).

In some aspects, UE A 602 can monitor resources in a sensing window regardless of whether UE A 602 has received an explicit request to monitor such resources. Alternatively, in some aspects, UE A 602 can monitor resources in a sensing window only after UE A 602 has received an explicit request to monitor such resources. For example, UE A 602 can begin monitoring such resources in response to receiving a request, and can continue monitoring for a predetermined period of time after receiving the request, for a predetermined time after receiving a most recent transmission from the requesting UE, and/or until receiving an explicit request to stop monitoring resources for a particular UE.

In some aspects, UE A 602 can monitor resources in a resource selection window continuously, and can transmit an RA report periodically with a pre-defined period (e.g., as a unicast to any UE(s) that requested such a report, as a multicast or groupcast to multiple one or more UE(s) that requested such a report, and/or as a broadcast to any nearby UEs that are capable of receiving and demodulating the report). For example, UE A 602 can be configured to transmit a report every N slots (e.g., every 8 slots).

Particularly, in this second case with periodic reporting, the last reception from TX-UE might be too old to be utilized for SIR calculation and in this case RX-UE might fall back to legacy fixed RSRP thresholding. Definition of too old may be based on application and in particular, the mobility of the UEs.

At 616, UE B 604 can transmit a request to a nearby UE (e.g., UE A 602) for a resource allocation (RA) report. In some aspects, the request can include any suitable information, such as information described above in connection with 512 of FIG. 5. In some aspects, the request can be transmitted using any suitable technique or combination of techniques, such as techniques described above in connection with 512 of FIG. 5.

At 618, UE A 602 can transmit an RA report based on a received power in the first SCI message and/or received power in any other SCI messages that reserve a resource in the resource sensing window. In some aspects, the report can include a binary resource availability map (e.g., formatted as a matrix or string) that represents at least a portion of a resource selection window (e.g., as described above in connection with FIG. 5, and below in connection with FIG. 8). In some aspects, UE A 602 can use any suitable technique or combination of techniques to submit the report, such as techniques described above in connection with 522 of FIG. 5.

At 620, UE D 608 can transmit one or more packets intended for at least UE C using resources reserved by the first SCI. In some aspects, UE D 608 can transmit the one or more packets using any suitable technique or combination of techniques, such as techniques described above in connection with 526 of FIG. 5.

At 622, UE B 604 can transmit one or more packets intended for at least UE A 602 using resources selected from a set of resources that UE B 604 determines are available based on information detected by US B 604 and/or the report received at 618 (e.g., using any suitable technique or combination of techniques described above in connection with 524 of FIG. 5).

At 624, UE D 608 can transmit a second SCI that reserves one or more resources in a resource selection window. In some aspects, UE D 608 can transmit the SCI using any suitable technique or combination of techniques, such as techniques described above in connection with 514 of FIG. 5.

At 626, UE B 604 can receive the second SCI message transmitted by UE D 608 at 624. In some aspects, UE B 604 can use any suitable technique or combination of techniques to receive the second SCI message, such as techniques described above in connection with 514 of FIG. 5. Additionally, in some aspects, at 626, UE B 604 can determine resource availability based on information in the second SCI using any suitable technique or combination of techniques. For example, UE B 604 can use one or more techniques described above in connection with 516 of FIG. 5.

In some aspects, UE B 604 may not receive the second SCI message transmitted by UE D 608 at 624. For example, UE B 604 may have become sufficiently distant (e.g., physical distance and/or RF distance) such that UE B 604 can no longer reliably receive and/or decode the second SCI message. Additionally or alternatively, in some aspects, UE B 604 can omit monitoring of one or more resources (e.g., as described above in connection with 516 of FIG. 5). For example, UE B 604 can reduce the resources monitored (e.g., partially or entirely) after transmitting a request for, and/or receiving, an RA report.

At 628, UE A 602 can determine a received power of a signal transmitted by UE B 604 using any suitable technique or combination of techniques, such as techniques described above in connection with 518 of FIG. 5.

At 630, UE A 602 can receive the second SCI message transmitted by UE D 608 at 624. In some aspects, UE B 604 can use any suitable technique or combination of techniques to receive the second SCI message, such as techniques described above in connection with 516 of FIG. 5. Additionally, in some aspects, at 630, UE A 602 can determine resource availability based on information in the first SCI using any suitable technique or combination of techniques, such as techniques described above in connection with 516 of FIG. 5.

At 632, UE A 602 can transmit a second RA report based on the second SCI and/or any other suitable SCI, and/or based on the UE B received power. In some aspects, UE B 604 can use any suitable technique or combination of techniques to transmit the second RA report, such as techniques described above in connection with 522 of FIG. 5.

Although not shown, UE B 604, UE D 608, and UE A 602, can perform similar actions to those described above in connection with 524 to 532 of FIG. 5, such as selecting a resource based on the second RA report, transmitting a packet using the selected resource, and receiving the transmitted packet.

Figure 7:
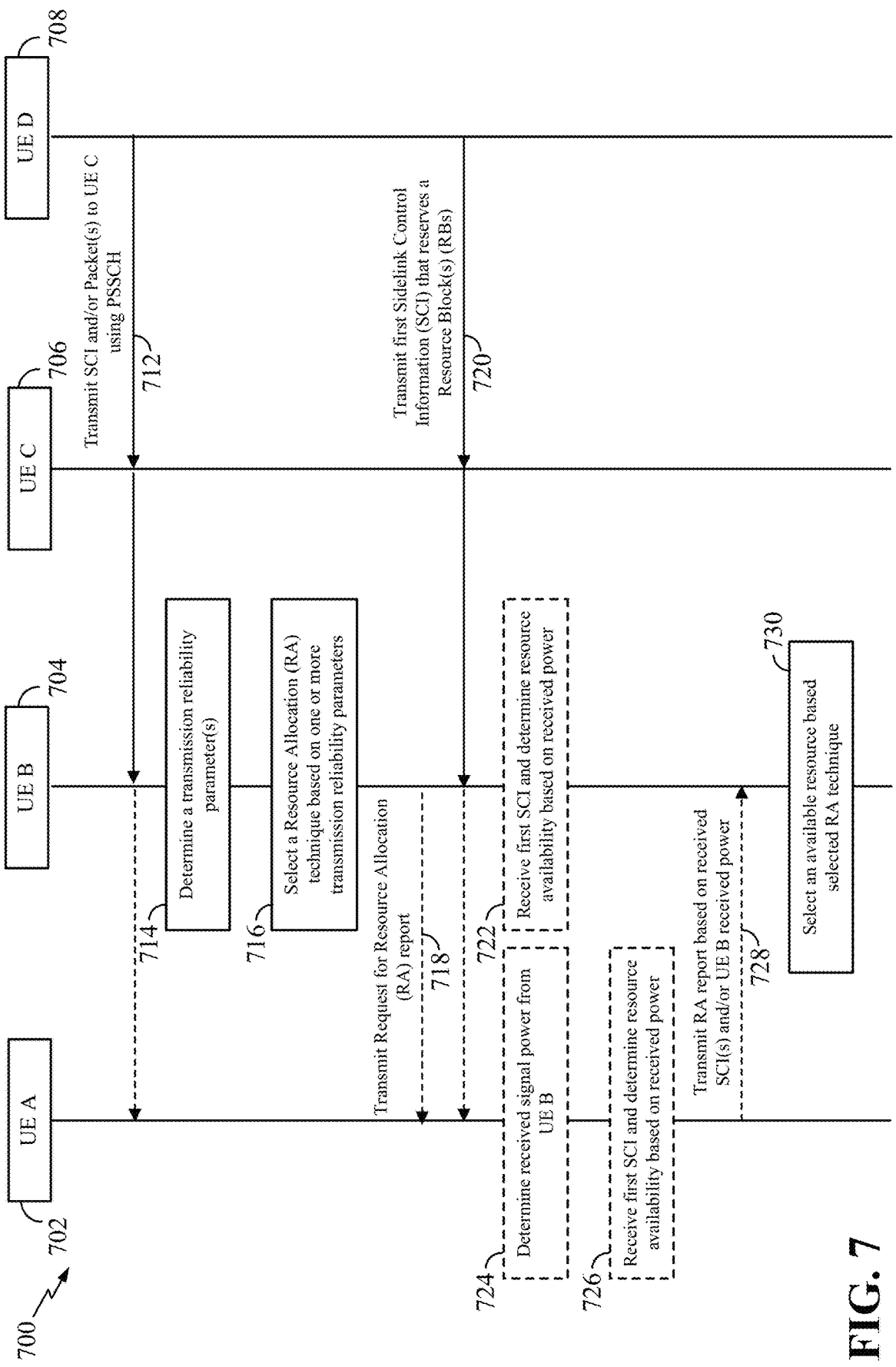
FIG. 7 is a call flow diagram illustrating exemplary sidelink signaling between various UEs to select a resource monitoring technique based on a transmission reliability parameter within a wireless communication system in accordance with some aspects of the disclosed subject matter.

FIG. 7 is a signaling diagram illustrating exemplary sidelink signaling between various UEs (e.g., UE A 702, UE B 704, UE C 706, and UE D 708) to select a resource monitoring technique based on a transmission reliability parameter within a wireless communication system 700 in accordance with some aspects of the disclosed subject matter. In some aspects, wireless communication system 700 can correspond, for example, to a portion of RAN 100, wireless communication system 200, wireless communication system 500, and/or wireless communication system 600 described above in connection with FIGS. 1, 2, 5, and/or 6, respectively.

In some aspects, UE B 704 can be configured to transmit data over the PSSCH to one or more other UEs, such as UE A 702. Additionally, UE C 706 and UE D 708 can represent other UEs that are communicating using the PSSCH, and may cause interference with transmission sent by UE B 704 (e.g., to UE A 704) if they are transmitted using the same resources. In the signaling diagram of FIG. 7, UE A 702, UE B 704, UE C 706, and/or UE D 708 can schedule transmissions autonomously (e.g., using sidelink resource allocation mode 2), as described above in connection with FIG. 5.

At 712, UE D 708 can transmit an SCI message using PSCCH and/or one or more packets using PSSCH. In some aspects, UE D 708 can transmit the SCI message and/or packet(s) using any suitable technique or combination of techniques, such as techniques described above in connection with 514 of FIG. 5 and/or 526 of FIG. 5.

At 714, UE B 704 can determine and/or retrieve a parameter related to a target reliability for transmissions (e.g., to UE A 702), and/or a parameter that can be used to estimate a likely reliability of transmissions (e.g., to UE A 702). In some aspects, the parameter can be based on signals detected and/or received prior to 714, such as an SCI and/or message including a packet transmitted at 712. For example, UE B 704 can determine a channel busy ratio (CBR) (e.g., based on a fraction of subframes for which received signal strength indicator (RSSI) exceeds a pre-configured value over a predetermined period of time) as a parameter that can be used to estimate congestion of communication system 700.

As another example, UE B 704 can determine and/or retrieve a priority of a packet(s) to be transmitted (e.g., a packet priority parameter associated with the packet). In such an example, UE B 704 can target a higher reliability for packets associated with a higher priority (e.g., to reduce latency, to reduce a likelihood that the packet is dropped, etc.).

As yet another example, UE B 704 can determine a remaining packet delay budget (PDB) associated with a packet to be transmitted as a parameter related to a target reliability. In such an example, a shorter PDB can indicate that UE B 704 should target a higher reliability for a transmission associated with the packet to increase the likelihood that the packet is successfully received by the target within the PDB.

As still another example, UE B 704 can determine a cast type associated with a packet to be transmitted. In such an example, packets that are to be unicast may not be as sensitive to reduced reliability as packets that are to be groupcast or broadcast (e.g., because a packet that is groupcast should be decodable by all members of the group, increasing the chance that a low reliability packet will be dropped for at least one group member if reliability is relatively low).

As a further example, UE B 704 can determine a zone ID of a target(s) and/or a parameter indicative of distance to the target (e.g., a parameter indicative of RF-distance, such as RSRP of a signal received from the target). In a more particular example, UE B 704 can determine an RSRP of a UE to which a packet is to be unicast (e.g., UE A 702). As another example, UE B 704 can use a range parameter derived from SCI received from UEs to which a packet is to be groupcast. In a more particular example, groupcast communications (e.g., connectionless groupcast communications) can define a range parameter that can be used to create an ad hoc group of nearby UEs. In such an example, UEs within range can be expected to decode the groupcast transmission, and can be expected to respond with a N(ACK). In such an example, a larger range for a groupcast can be expected to impact reliability (e.g., signals transmitted over a longer range can be expected to be received with a lower power if other parameters, such as transmission power, remain static). In general, UE B 704 can use any suitable parameter indicative of a location of each of one or more UEs to which the packet is to be transmitted to determine a target reliability for a packet (e.g., larger transmission distances can be associated with lower reliability).

As another further example, UE B 704 can determine and/or retrieve an explicit reliability requirement associated with a packet(s) to be transmitted. In a more particular example, such a reliability requirement can indicate that a packet is to be transmitted with characteristics (e.g., transmission power, MCS, etc.) configured to target at least the required reliability. In a more particular example, the reliability requirement associated with a packet can be used to determine a level of reliability to target for transmission (e.g., a reliability requirement of 0.99 can indicate that at least 99 of every 100 packets that are transmitted should be receivable and decodable by the target(s) of the transmission).

As yet another further example, UE B 704 can determine a parameter indicative of a periodicity at which UE B 704 is configured to monitor received signals. For example, if UE B 704 is configured to use a particular discontinuous reception (DRX) interval, UE B 704 cannot monitor all of the resources in the resource sensing window, and accordingly can positively identify available resources in only a portion of the resource selection window.

As still another further example, UE B 704 can determine and/or retrieve a parameter indicative of a power at which UE B 704 is configured to transmit using sidelink slots. If all other parameters are held constant, transmitting with lower power can reduce reliability of a transmission.

At 716, UE B 704 can select a resource allocation (RA) technique (e.g., a particular technique used to determine which resource are available in a resource selection window) based on one or more transmission reliability parameters determined and/or retrieved at 714.

In some aspects, UE B 704 can use any suitable technique or combination of techniques to select an RA technique based on one or more parameters. For example, UE B 704 can retrieve a lookup table associated with one or more parameters. In such an example, such a lookup table can indicate which RA technique is to be selected based on the value(s) of the one or more parameters.

As another example, UE B 704 can compare a value of a parameter to a threshold, and UE B 704 can select a first technique if the parameter is below the threshold and select a second technique if the parameter is above the threshold.

As yet another example, UE B 704 can compare a value of a parameter to a threshold, and UE B 704 can select a first technique if the parameter is below (or above) the threshold and select a group of techniques (e.g., excluding the first technique) if the parameter is above (or below) the threshold.

In a particular example, if UE B 704 determines that network load in the proximity of UE B 704 is relatively light (e.g., a CBR less than of less than about 0.5, a CBR of less than about 0.8, or any other suitable CBR threshold), UE B 704 can select a first technique (e.g., a technique in which a report by UE B 704 is combined with a report from UE A 702). Otherwise, if UE B 704 determines that network load in the proximity of UE B 704 is not relatively light (e.g., CBR is over the threshold), UE B 704 can select a first technique (e.g., a technique in which a report by UE B 704 is combined with a report from UE A 702).

In another particular example, if UE B 704 is configured to monitor received signals discontinuously, UE B 704 can select a technique that uses an RA report from another device (e.g., UE A 702) in addition to, or in lieu of, using only information monitored by UE B 704.

At 718, UE B 704 can transmit a request to a nearby UE (e.g., UE A 702) for a resource allocation (RA) report if the technique selected at 716 incorporates an RA report from another UE (e.g., UE A 702). In some aspects, the request can include any suitable information, such as information described above in connection with 512 of FIG. 5. In some aspects, the request can be transmitted using any suitable technique or combination of techniques, such as techniques described above in connection with 512 of FIG. 5. In some aspects, UE B 704 can omit requesting an RA report if the selected technique does not incorporate an RA report from another UE.

At 720, UE D 708 can transmit a first SCI that reserves one or more resources in a resource selection window. In some aspects, UE D 708 can transmit the SCI using any suitable technique or combination of techniques, such as techniques described above in connection with 514 of FIG. 5.

At 722, UE B 704 can receive the first SCI message transmitted by UE D 708 at 720. In some aspects, UE B 704 can use any suitable technique or combination of techniques to receive the first SCI message, such as techniques described above in connection with 514 of FIG. 5. Additionally, in some aspects, at 722, UE B 704 can determine resource availability based on information in the first SCI using any suitable technique or combination of techniques. For example, UE B 704 can use one or more techniques described above in connection with 516 of FIG. 5.

In some aspects, UE B 704 may not receive the first SCI message transmitted by UE D 708 at 722. For example, UE B 704 may have become sufficiently distant (e.g., physical distance and/or RF distance) such that UE B 704 can no longer reliably receive and/or decode the first SCI message. Additionally or alternatively, in some aspects, UE B 704 can omit monitoring of one or more resources (e.g., as described above in connection with 516 of FIG. 5). For example, UE B 704 can reduce the resources monitored (e.g., partially or entirely) after transmitting a request for, and/or receiving, an RA report.

At 724, UE A 702 can determine a received power of a signal transmitted by UE B 704 using any suitable technique or combination of techniques, such as techniques described above in connection with 518 of FIG. 5.

At 726, UE A 702 can receive the first SCI message transmitted by UE D 708 at 720. In some aspects, UE B 704 can use any suitable technique or combination of techniques to receive the first SCI message, such as techniques described above in connection with 516 of FIG. 5. Additionally, in some aspects, at 726, UE A 702 can determine resource availability based on information in the first SCI using any suitable technique or combination of techniques, such as techniques described above in connection with 516 of FIG. 5.

At 728, UE A 702 can transmit an RA report based on the first SCI and/or any other suitable SCI, and/or based on the UE B received power. In some aspects, UE B 704 can use any suitable technique or combination of techniques to transmit the RA report, such as techniques described above in connection with 522 of FIG. 5.

At 730, UE B 704 can receive the report and select an available resource based on the selected technique. For example, UE B 704 can select an available resource based on the report received from UE A 702 and/or based on resource availability determined by UE B 704 (e.g., based on the received power associated the first SCI message received at 720, and/or the received power of any other suitable signal such as one or more SCI messages transmitted by other UEs). In some aspects, the resource availability determined by UE B 704 can be formatted as a binary resource availability map. In some aspects, UE B 704 can use any suitable technique or combination of techniques to select available resources, which may or may not include combining an RA report generated by UE B 704 and an RA report received from UE A 702. Examples of such techniques are described above in connection with FIG. 5, and below in connection with FIGS. 9, 14, and 16.

Although not shown, UE B 704, UE D 708, and UE A 702, can perform similar actions to those described above in connection with 526 to 532 of FIG. 5, such as transmitting a packet using the selected resource, and receiving the transmitted packet.

Figure 8:
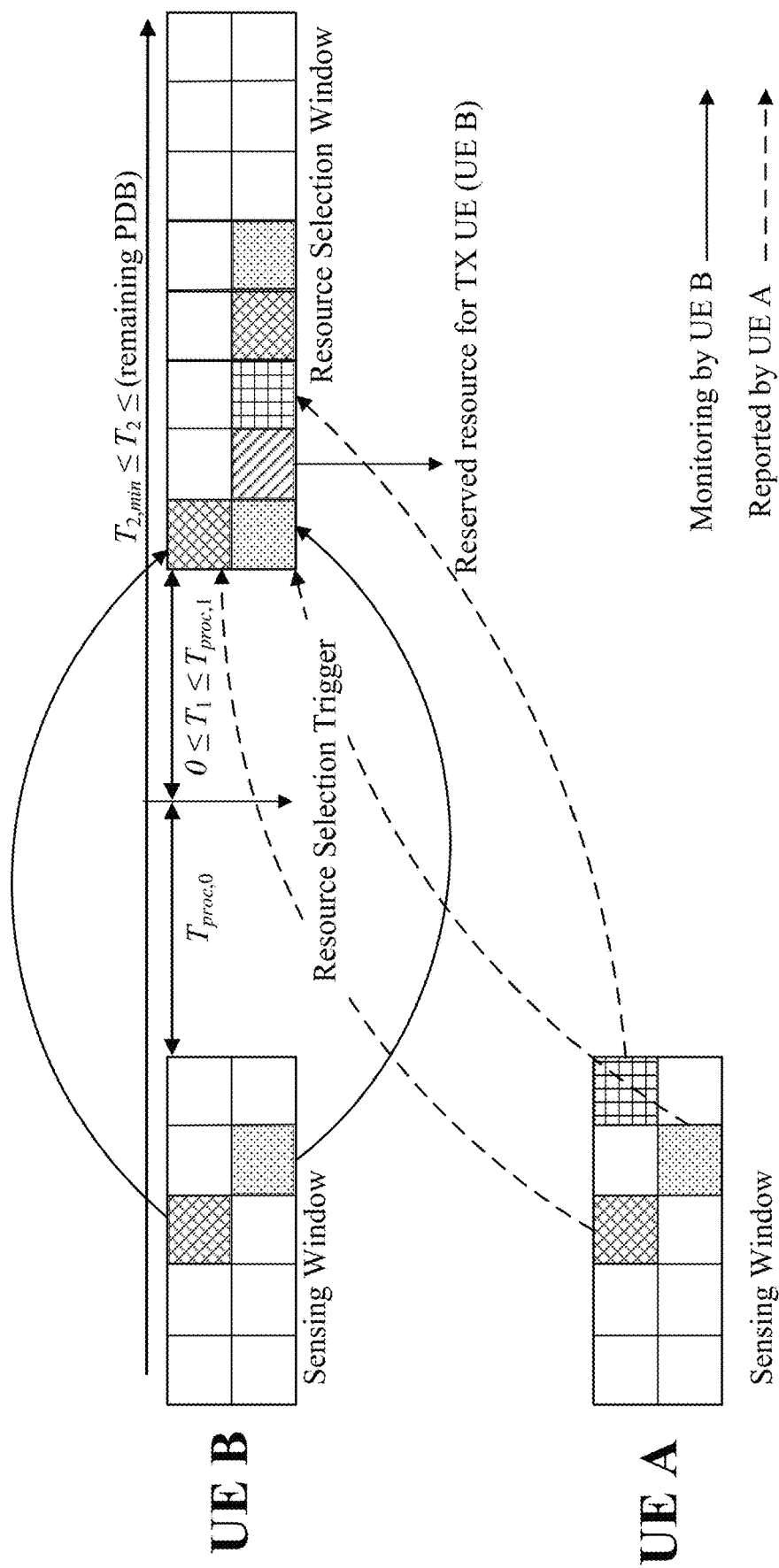
FIG. 8 is an example of signals detected in a sensing window and resources reserved in a resource selection window that a user equipment can use to select a resource to use to transmit data in accordance with some aspects of the disclosed subject matter.

FIG. 8 is an example of signals detected in a sensing window and resources reserved in a resource selection window that a user equipment can use to select a resource to use to transmit data in accordance with some aspects of the disclosed subject matter. As shown in FIG. 8, a transmitting UE (e.g., UE B) and/or a receiving UE (e.g., UE A) can both monitoring a sensing window for transmissions (e.g., SCI messages). In the example of FIG. 8, both UEs are monitoring the sensing window. However, as described above, mechanisms described herein can use monitoring results generated by a single device (e.g., UE A or UE B) to determine which resource are and are not available in the resource selection window.

As conceptually illustrated in FIG. 8, a transmission received in the sensing window can include a reservation for one or more resources in the resource selection window. Additionally, a (variable) gap can exist between the sensing window and the earliest time in the selection window that UE B can select for transmission of a packet. For example, a processing time $T_{proc,0}$ can represent an amount of time that UE B spends processing received signals to determine whether a particular resource in the resource selection window has been reserved. For example, to determine whether a particular resource in the resource selection window has been reserved, UE B can receive an SCI, decode the SCI, and determine which resource(s) are reserved by the SCI.

As another example, a processing time $T_{proc,1}$ can represent an amount of time that UE B spends to select a particular resource after a resource selection has been triggered (e.g., when a packet is received for transmission, e.g., from a processor of UE B).

As yet another example, the total time period represented in the sensing window and the resource selection window can be a time $T_2$ that is at least a minimum value (e.g., $T_{proc,0}+T_{proc,1}$) and no greater than a remaining packet delay budget.

As shown in FIG. 8, mechanisms described herein can incorporate information from both UEs into a process of selecting a resource for transmission by UE B.

Figure 9:
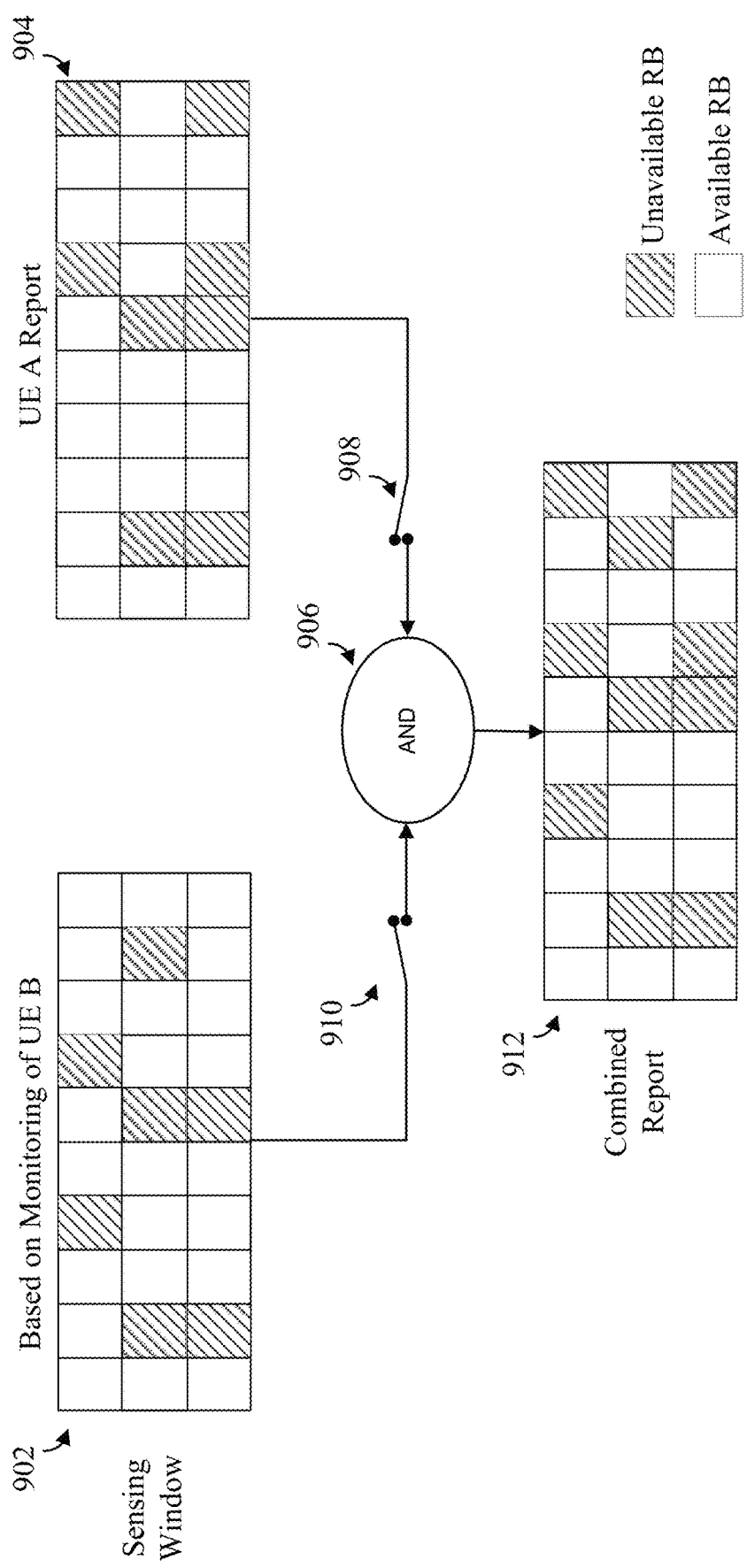
FIG. 9 is an example of reports generated by a transmitting UE and an assisting UE for an upcoming resource selection window, and a combined report that can be used to select a resource to use to transmit data in accordance with some aspects of the disclosed subject matter.

FIG. 9 is an example of reports generated by a transmitting UE and an assisting UE for an upcoming resource selection window, and a combined report that can be used to select a resource to use to transmit data in accordance with some aspects of the disclosed subject matter. FIG. 9 shows a first RA report 902 generated by UE B, and a second RA report 904 generated by UE A. As described above in connection with FIG. 5, in some aspects, UE B can combine report 902 and report 904 to determine whether a particular resource is available or unavailable for use by UE B. For example, UE B can perform a bitwise logical AND operation 906 between report 902 and report 904, and a resource can be identified as available if it is identified as available in both report 902 and report 904. As another example, UE B can perform a bitwise multiplication between report 902 and report 904, and a resource can be identified as available if it is identified as available in both report 902 and report 904 (e.g., if a 1 represents an available resource, and a 0 represents an unavailable resources).

FIG. 9 includes conceptual illustrations of switches 908 and 910, which can represent a result of a technique selection process. In the example shown in FIG. 9 both switches 908 and 910 are illustrated as closed, which can represent a technique in which reports 902 and 904 are both used to generate a combined report 912 that can be used to identify available resources that can be selected by UE B. The example in FIG. 9 can be referred to as AND-combining.

Although not shown, an example with switch 908 open and switch 910 closed can represent a technique in which only report 902 is used (in such an example AND 906 and combined report 912 can be omitted). Such an example can be referred to as a TX-only technique.

Additionally, although also not shown, an example with switch 908 closed and switch 910 open can represent a technique in which only report 904 is used by UE B (in such an example AND 906 and combined report 912 can be omitted). Such an example can be referred to as an RX-only technique.

Figure 10:
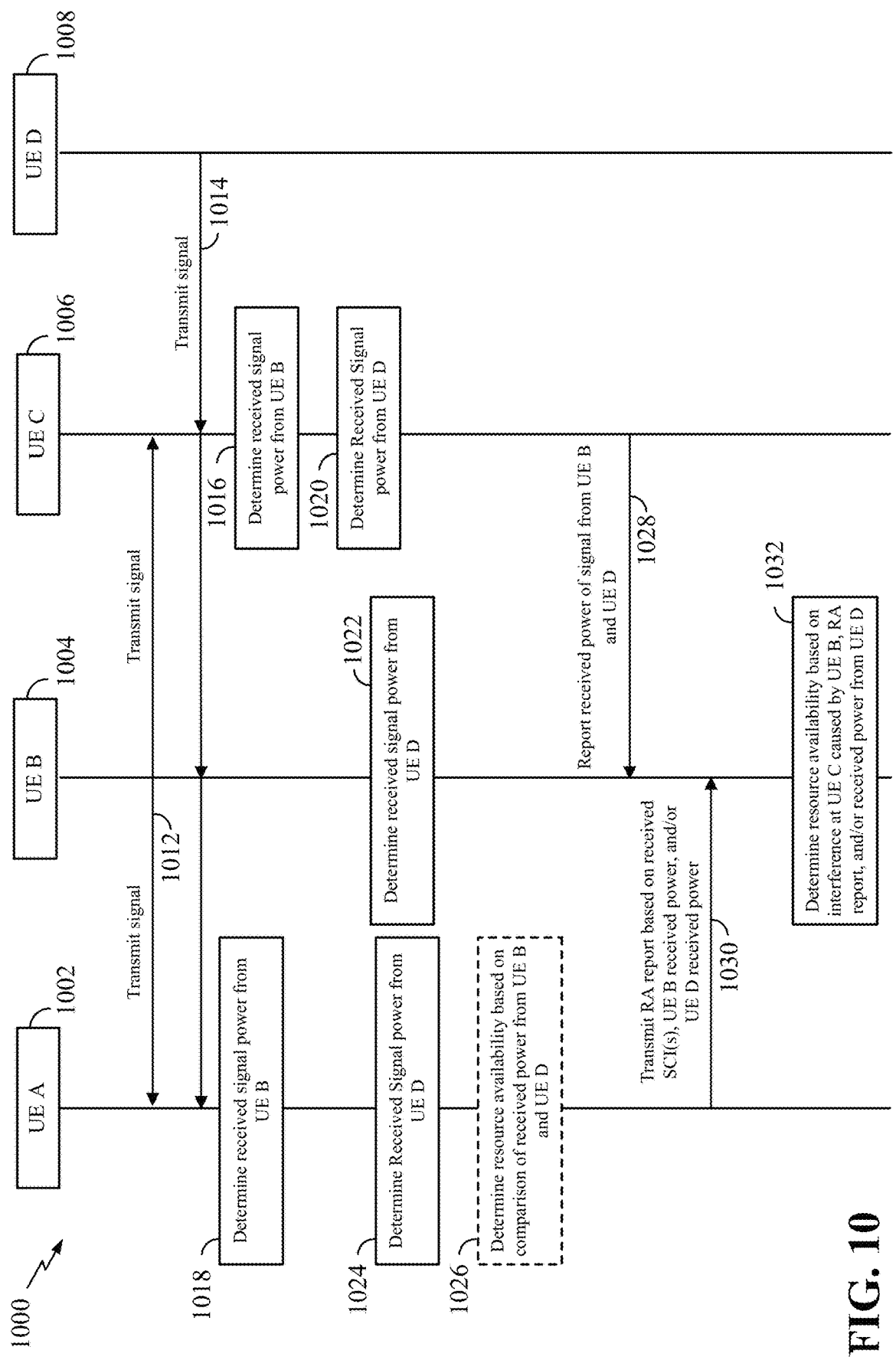
FIG. 10 is a call flow diagram illustrating exemplary sidelink signaling between various user equipment devices to sense resources reserved in an upcoming resource selection window within a wireless communication system in accordance with some aspects of the disclosed subject matter.

FIG. 10 is a signaling diagram illustrating exemplary sidelink signaling between various user equipment devices (e.g., UE A 1002, UE B 1004, UE C 1006, and UE D 1008) to sense resources reserved in an upcoming resource selection window within a wireless communication system 1000 in accordance with some aspects of the disclosed subject matter. In some aspects, wireless communication system 1000 can correspond, for example, to a portion of RAN 100, wireless communication system 200, wireless communication system 500, wireless communication system 600, and/or wireless communication system 700 described above in connection with FIGS. 1, 2, 5, 6, and/or 7, respectively.

In some aspects, UE B 1004 can be configured to transmit data over the PSSCH to one or more other UEs, such as UE A 1002, and UE D can be configured to transmit data over the PSSCH to one or more other UEs, such as UE C 1006. Additionally, communications between UE D 1008 and UE C 1006 may cause interference with transmission sent by UE B 1004 (e.g., to UE A 1004) if they are transmitted using the same resources. Similarly, communications between UE B 1004 and UE A 1002 may cause interference with transmission sent by UE D 1008 (e.g., to UE C 1006) if they are transmitted using the same resources. In the signaling diagram of FIG. 10, UE A 1002, UE B 1004, UE C 1006, and/or UE D 1008 can schedule transmissions autonomously (e.g., using sidelink resource allocation mode 2), as described above in connection with FIG. 5.

At 1012, UE B 1004 can transmit a signal (e.g., an SCI message transmitted using PSCCH and/or one or more packets transmitted using PSSCH). In some aspects, UE B 1004 can transmit the SCI message and/or packet(s) using any suitable technique or combination of techniques, such as techniques described above in connection with 514 of FIG. 5 and/or 526 of FIG. 5.

At 1014, UE D 1008 can transmit an SCI message using PSCCH and/or one or more packets using PSSCH. In some aspects, a signal (e.g., an SCI message transmitted using PSCCH and/or one or more packets transmitted using PSSCH). In some aspects, UE D 1008 can transmit the SCI message and/or packet(s) using any suitable technique or combination of techniques, such as techniques described above in connection with 514 of FIG. 5 and/or 526 of FIG. 5.

At 1016, UE C 1006 can determine a received power of a signal transmitted by UE B 1004 using any suitable technique or combination of techniques, such as techniques described above in connection with 518 of FIG. 5.

At 1018, UE A 1002 can determine a received power of a signal transmitted by UE B 1004 using any suitable technique or combination of techniques, such as techniques described above in connection with 518 of FIG. 5.

At 1020, UE C 1006 can determine a received power of a signal transmitted by UE D 1008 using any suitable technique or combination of techniques, such as techniques described above in connection with 518 of FIG. 5.

At 1022, UE B 1006 can determine a received power of a signal transmitted by UE D 1008 using any suitable technique or combination of techniques, such as techniques described above in connection with 518 of FIG. 5.

At 1024, UE A 1002 can determine a received power of a signal transmitted by UE D 1008 using any suitable technique or combination of techniques, such as techniques described above in connection with 518 of FIG. 5.

At 1026, UE A 1002 can determine resource availability based on information in the signal transmitted by UE D 1008 at 1014 using any suitable technique or combination of techniques, such as techniques described above in connection with 516 of FIG. 5. Additionally, at 1026, UE A 1002 can determine whether a resource reserved by UE D 1008 is available based on a comparison of the received power of the signal from UE D and the received power of the signal from UE B. For example, UE A 1002 can use an SIR threshold and/or an adaptive RSRP threshold to determine whether a resource reserved by UE D 1008 can be used by UE B 1004 to transmit a packet(s) to UE A 1002 (e.g., as described above in connection with 520 of FIG. 5). In some aspects, 1026 can be omitted. For example, when a report is not requested by UE B 1004, UE A 1002 may omit determining resource availability and/or generating a report. However, in the example shown in FIG. 10, UE A 1002 can report the received power of a signal from UE B 1004 and the received power of a signal from UE D 1008, as described below in connection with 1030.

At 1028, UE C 1006 can transmit a report indicative of a received power of a signal from UE B 1004 at UE C 1006, and a received power of a signal from UE D 1008 at UE C 1006. In some aspects, UE C 1006 can use any suitable technique or combination of techniques to transmit the report, such as techniques described above in connection with 522 of FIG. 5. In some aspects, the report transmitted by UE C 1006 can be in any suitable format. For example, UE C 1006 can report the RSRP of each signal, and identifying information of a UE from which the signal was received. Additionally or alternatively, as another example, UE C 1006 can report an SIR of a pair of signals received from two different UEs (e.g., an SIR(B,D) comparing the RSRP from UE B and the RSRP from UE D as measured at UE C).

At 1030, UE A 1002 can transmit an RA report, and/or a report indicative of a received power of a signal from UE B 1004 at UE A 1002, and a received power of a signal from UE D 1008 at UE A 1002. In some aspects, UE A 1002 can use any suitable technique or combination of techniques to transmit the report, such as techniques described above in connection with 522 of FIG. 5. In some aspects, the report transmitted by UE A 1002 can be in any suitable format, such as formats described above in connection with 522 of FIG. 5 and/or formats described above in connection with 1028.

At 1032, UE B 1004 can determine resource availability based on interference that UE B 1004 may cause at UE C 1006 when UE B 1004 transmits a packet targeted at UE A 1002 (e.g., cross-link interference (CLI)). Additionally or alternative, UE B 1004 can determine resource availability based on a signal-to-interference ration (SIR) representing an amount of interference that a transmission from UE D 1008 may cause at UE A 1002 when UE B 1004 transmits a packet targeted at UE A 1002 (e.g., SIR(B,D) measured at UE A).

In some aspects, UE B 1004 can identify resources reserved by UE D 1008 that are targeted at UE C 1006 unavailable if the amount of CLI at UE C is greater than a threshold, regardless of the $RSRP_{D \to B}$ or $RSRP_{D \to A}$. For example, even if a resource might be considered available because the signal received at UE B 1004 is below a fixed or adaptive threshold, UE B 1004 can identify the resource as unavailable if transmitting using that frequency is likely to interference with a transmission from UE D 1008 to UE C 1006. A technique that takes cross-link interference (CLI) into account can be referred to as a CLI-based technique, and can be used in conjunction with other types of techniques (e.g., AND-combining, TX-only, or RX-only).

In some aspects, UE B 1004 can identify resources reserved by UE D 1008 (or another UE) as available if the SIR(D,A) at UE A 1002 is greater than a threshold SIR and/or if $RSRP_{D \to A}$ is below an adaptive RSRP threshold based on $RSRP_{B \to A}$ and an SIR threshold. A technique in which a TX UE (e.g., UE B 1004) takes SIR at an RX UE (e.g., UE A 1002) into account can be referred to as an SIR-based technique, and can be used in conjunction with other types of techniques (e.g., CLI-based, AND-combining, TX-only, or RX-only).

Figure 11:
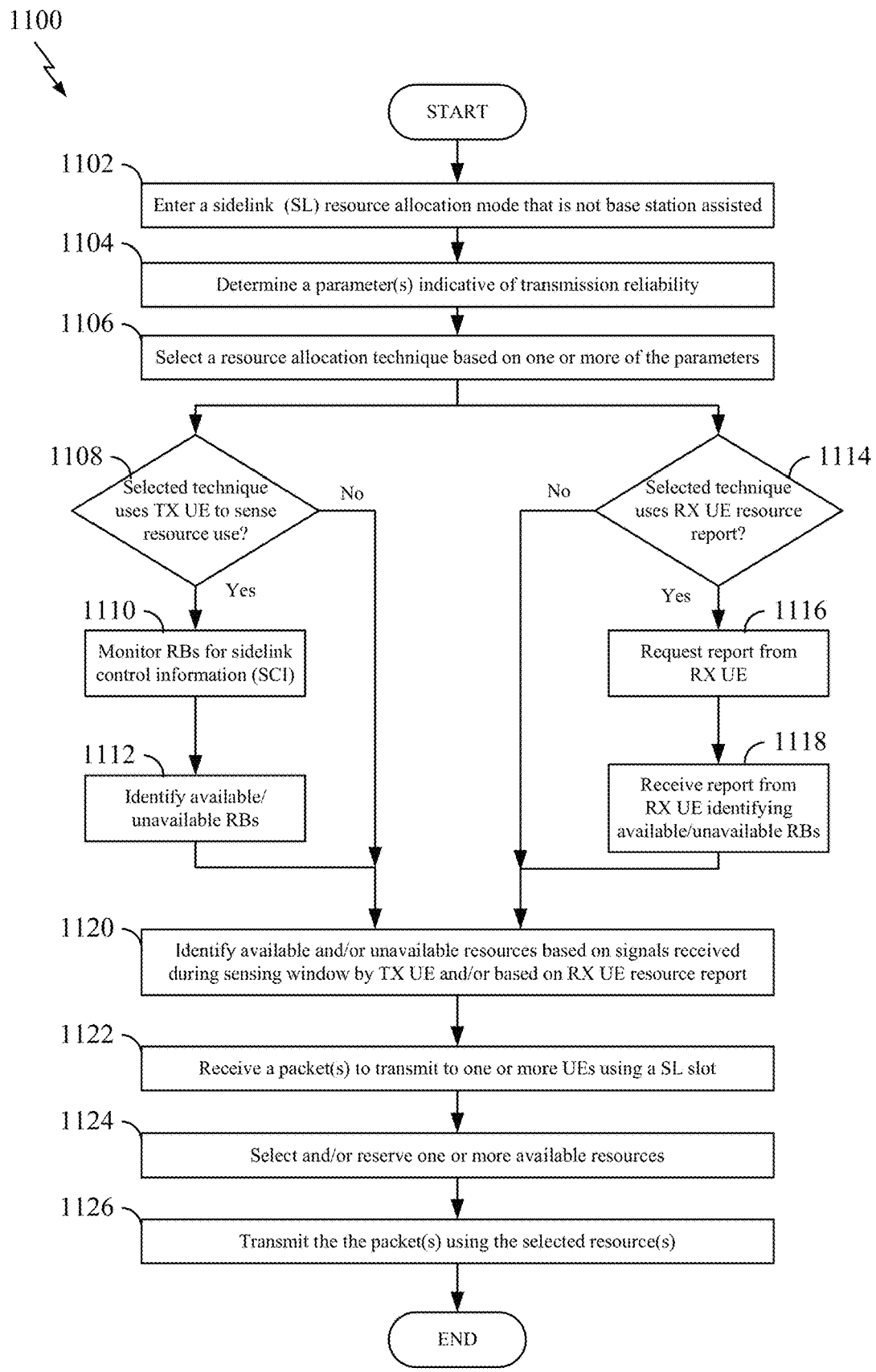
FIG. 11 is a flow chart illustrating an exemplary process for a transmitting user equipment to select resources in an upcoming resource selection window based on resources reported as unavailable by the transmitting UE and/or an assisting UE in accordance with some aspects of the disclosed subject matter.

FIG. 11 is a flow chart illustrating an exemplary process 1100 for a transmitting user equipment to select resources in an upcoming resource selection window based on resources reported as unavailable by the transmitting UE and/or an assisting UE in accordance with some aspects of the disclosed subject matter. At 1102, a UE (e.g., UE 126, UE 206b, UE B 504, etc.) can enter a sidelink (SL) resource allocation mode 2. As described above in connection with FIG. 5, in mode 2, a UE can select and/or reserve one or more sidelink slots unassisted by a base station.

At 1104, a UE can determine and/or retrieve a parameter related to a target reliability for transmissions (e.g., to an RX UE(s), such as UE 128, UE 206a, UE A 502, etc.), and/or a parameter that can be used to estimate a likely reliability of transmissions (e.g., to the RX UE(s)). In some aspects, the UE can use any suitable technique or combination of techniques to determine and/or retrieve such a parameter(s), such as techniques described above in connection with 714 of FIG. 7.

At 1106, a UE can select a resource allocation (RA) technique (e.g., a particular technique used to determine which resource are available in a resource selection window) based on one or more transmission reliability parameters determined and/or retrieved at 1104. In some aspects, the UE can use any suitable technique or combination of techniques to determine and/or retrieve such a parameter(s), such as techniques described above in connection with 716 of FIG. 7.

At 1108, a UE can determine if the selected RA technique uses the UE (e.g., a TX UE, such as UE 126, UE 206b, UE B 504, etc.) to sense resource availability. For example, if the selected technique is a TX-only technique or an AND-combining technique, the UE can determine that the technique uses the UE to sense resource availability. As another example, if the selected technique is an RX-only technique, the UE can determine that the technique does not use the UE to sense resource availability.

If the UE determines that the selected technique uses the UE to sense resource availability ("YES" at 1108), process 1100 can move to 1110. Otherwise, if the UE determines that the selected technique does not use the UE to sense resource availability ("NO" at 1108), process 1100 can move to 1120.

At 1110, a UE can monitor resources in a resource sensing window for signals, such as sidelink control information (SCI) messages. In some aspects, the UE can use any suitable technique or combination of techniques to monitor the resources, such as techniques described above in connection with 516 and/or 520 of FIG. 5.

At 1112, a UE can identify resources in the resource selection window that are available, and which are unavailable. In some aspects, the UE can use any suitable technique or combination of techniques to determine which resources are available and/or which are unavailable. For example, the UE can use techniques described above in connection with 520 and/or 524 of FIG. 5 and/or 1032 of FIG. 10. For example, if the selected technique is a TX-only technique or an AND-combining, the UE can use a fixed RSRP threshold to determine which resources are available and/or which are unavailable. As another example, if the selected technique is an SIR-based technique, the UE can use an adaptive RSRP threshold and/or an SIR threshold to determine which resources are available and/or which are unavailable. In such an example, the UE can receive supplemental information (e.g., RSRP values, or SIR values) from another UE (e.g., an RX UE, such as UE 128, UE 206a, UE A 502, etc.). As yet another example, if the selected technique is a CLI-based technique, the UE can use a CLI threshold to determine which resources are available and/or which are unavailable based on interference that the UE may cause at RX UEs that are not a target of the UE. In such an example, the UE can receive supplemental information (e.g., RSRP values, or SIR values) from other UEs (e.g., an RX UE, such as UE 128 and UE 130, UE A 502 and UE C 504, etc.). In some aspects, process 1100 can move to 1120 from 1112.

At 1114, a UE can determine if the selected RA technique uses an RA report from another UE (e.g., an RX UE, such as UE 128, UE 206a, UE A 502, etc.) to sense resource availability. For example, if the selected technique is an RX-only technique or an AND-combining technique, the UE can determine that the technique uses an RA report from another UE to determine resource availability. As another example, if the selected technique is a TX-only technique, the UE can determine that the technique does not use an RA report from another UE to determine resource availability.

If the UE determines that the selected technique uses an RA report from another UE to determine resource availability ("YES" at 1114), process 1100 can move to 1116. Otherwise, if the UE determines that the selected technique does not use an RA report from another UE to determine resource availability ("NO" at 1114), process 1100 can move to 1120.

At 1116, a UE request a report from another UE (e.g., an RX UE, such as UE 128, UE 206a, UE A 502, etc.). In some aspects, the UE can use any suitable technique or combination of techniques to request a report from another UE, such as techniques described above in connection with 512 of FIG. 5.

At 1118, a UE can receive an RA report from another UE that identifies resources that are available and/or unavailable in a resource selection window. In some aspects, the UE can use any suitable technique or combination of techniques to receive a report from another UE, such as techniques described above in connection with 524 of FIG. 5.

Although not shown, a UE can also receive reports from other RX UEs that indicate, for example, RSRP from various UEs (e.g., UE 126 and UE 132), and/or SIR between various pairs of UEs (e.g., UE 126 and UE 130, UE 132 and UE 130). Note that such a report may or may not be associated with an RA report. For example, an RX UE can report RSRP values without accompanying the report with a binary resource availability map (or other information indicative of resource availability).

At 1120, a UE can identify available and/or unavailable resources based on a signal(s) received during a sensing window by the UE and/or based on an RA report received from another UE. In some aspects, the UE can use any suitable technique or combination of techniques to identify available and/or unavailable resources. For example, the UE can use techniques described above in connection with FIGS. 1 and 9, and/or techniques described below in connection with FIGS. 14, and 16.

At 1122, a UE can receive a packet or packets to transmit to one or more RX UEs using a SL slot. In some aspects, the UE can receive the packet from any suitable source. For example, the packet can be generated by the UE in response to the UE determining that there is information to be transmitted to another UE. As another example, the packet can be received from another device (e.g., another UE, a device connected via a communication link, such as a Bluetooth link, a Wi-Fi link, etc.) that is to be forwarded to another UE (e.g., an RX UE).

At 1124, a UE can select and/or reserve one or more available resources in the resource selection window from the available resources identified at 1120. In some aspects, the UE can use any suitable technique or combination of techniques to select one or more available resources. For example, the UE can randomly select available resources from all available resources.

In some aspects, the UE can use any suitable technique or combination of techniques to reserve the selected resources. For example, as described above in connection with 514 of FIG. 5, a UE can transmit sidelink control information (SCI) that includes reservation information indicating which resources the UE has reserved.

At 1126, a UE can transmit the packet or packets received at 1122 using the resources selected and/or reserved at 1126. In some aspects, the UE can use any suitable technique or combination of techniques to transmit the packet or packets, such as techniques described above in connection with 530 of FIG. 5.

Figure 12:
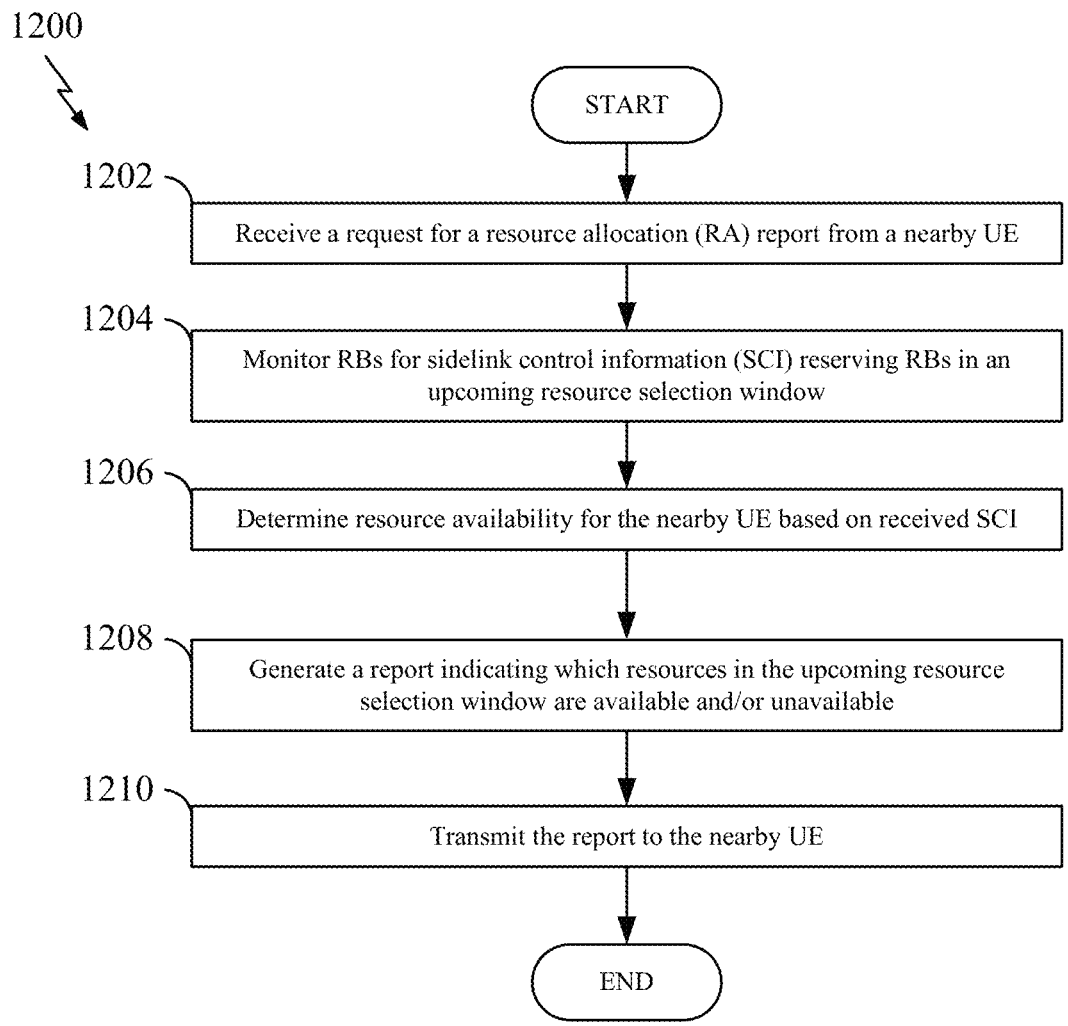
FIG. 12 is a flow chart illustrating an exemplary process for an assisting user equipment to generate a report for a transmitting UE indicating which resources are available and/or unavailable for selection by the transmitting UE in an upcoming resource selection window in accordance with some aspects of the disclosed subject matter.

FIG. 12 is a flow chart illustrating an exemplary process 1200 for an assisting user equipment to generate a report for a transmitting UE indicating which resources are available and/or unavailable for selection by the transmitting UE in an upcoming resource selection window in accordance with some aspects of the disclosed subject matter.

At 1202, a UE (e.g., an RX UE, such as UE 128, UE 206a, UE A 502, etc.) can receive a request for a resource allocation report (RA) from a nearby UE (e.g., a TX UE, such as UE 126, UE 206b, UE B 504, etc.). In some aspects, the UE can receive the request using any suitable technique or combination of techniques, such as techniques described above in connection with 518 of FIG. 5.

At 1204, a UE can monitor resources within a resource sensing window for sidelink control information (SCI) that may include reservations for resources within a resource selection window. In some aspects, the UE can use any suitable technique or combination of techniques to monitor the resources, such as techniques described above in connection with 516 and/or 520 of FIG. 5.

At 1206, a UE can determine resource availability for the nearby UE (e.g., the UE from which the request for an RA report was received at 1202) based on reservations and/or received power of signals received at 1204, such as SCI messages. In some aspects, the UE can use any suitable technique or combination of techniques to determine resource availability. For example, the UE can use techniques described above in connection with 520 and/or 524 of FIG. 5 and/or 1026 of FIG. 10. For example, the UE can use a fixed RSRP threshold to determine which resources are available and/or which are unavailable. As another example, the UE can use an adaptive RSRP threshold and/or an SIR threshold to determine which resources are available and/or which are unavailable.

At 1208, a UE can generate a report indicating which resources in the resource selection window are available and/or unavailable. In some aspects, the UE can use any suitable technique or combination of techniques to generate an RA report at 1208, such as techniques described above in connection with 520 of FIG. 5.

At 1210, a UE can transmit the report generated at 1208 to the nearby UE. In some aspects, the UE can use any suitable technique or combination of techniques to transmit the report to the nearby UE, such as techniques described above in connection with 522 of FIG. 5.

Figure 13A:
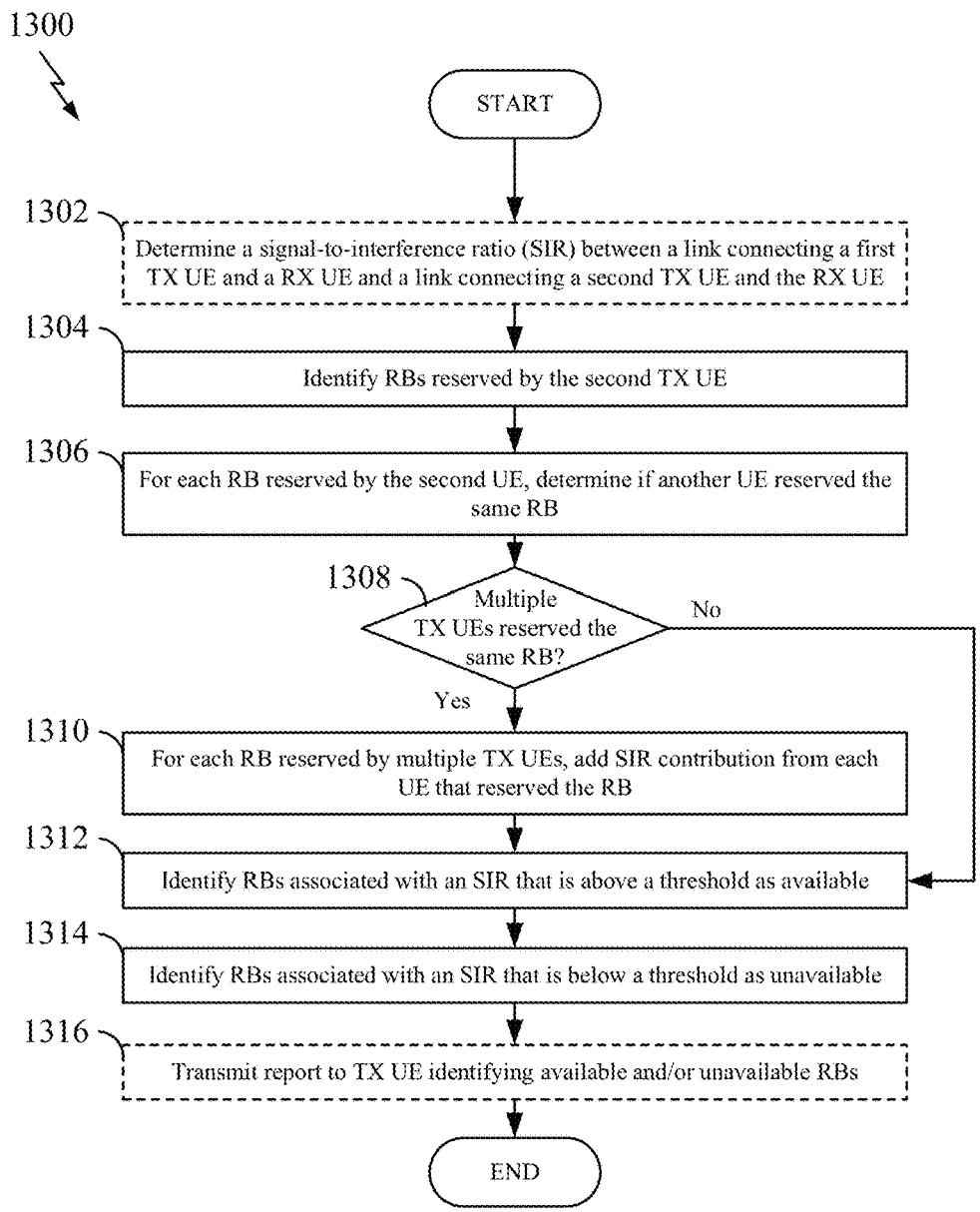
FIG. 13A is a flow chart illustrating an exemplary process for a transmitting UE to sense resources that are reserved but have a relatively low level of interference with a link between the transmitting UE and the receiving UE(s) in accordance with some aspects of the disclosed subject matter.
Figure 13B:
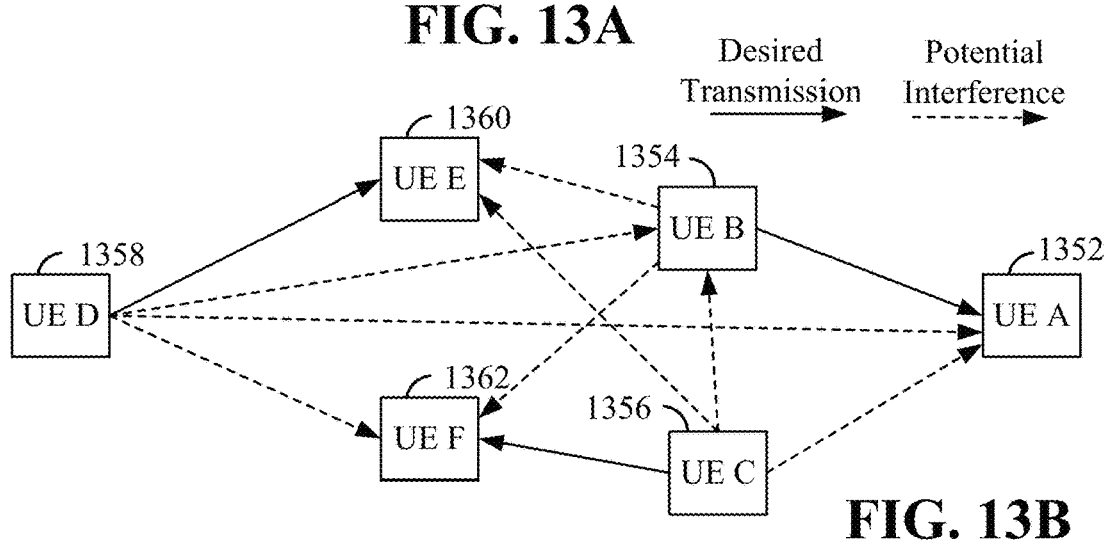
FIG. 13B is a schematic illustration of a transmitting UE, a receiving UE, and other UEs that may cause interference on a link between the transmitting UE and the receiving UE(s) and/or be affected by interference caused by a link between the transmitting UE and the receiving UE(s) in accordance with some aspects of the disclosed subject matter.

FIG. 13A is a flow chart illustrating an exemplary process 1300 for a transmitting UE to sense resources that are reserved but have a relatively low level of interference with a link between the transmitting UE and the receiving UE(s) in accordance with some aspects of the disclosed subject matter, and FIG. 13B is a schematic illustration of a transmitting UE, a receiving UE, and other UEs that may cause interference on a link between the transmitting UE and the receiving UE(s) and/or be affected by interference caused by a link between the transmitting UE and the receiving UE(s) in accordance with some aspects of the disclosed subject matter.

At 1302, a UE (e.g., UE 126, UE 128, UE 130, UE 132, UE 206a, UE 206b, UE A 502, UE B 504, UE A 1352, UE B 1354, UE C 1356, UE D 1358, UE E 1360, UE F 1362, etc.) can determine a signal-to-interference ratio (SIR) between a first link connecting a first TX UE and an RX UE, and a second link connecting a second TX UE and the RX UE.

For example, the UE can determine an SIR between a first link connecting UE B 1354 and UE A 1352, and a second link connecting UE C 1356 and UE A 1352.

As another example, the UE can determine an SIR between a first link connecting UE B 1354 and UE A 1352, and a second link connecting UE D 1358 and UE A 1352.

As yet another example, the UE can determine an SIR between a first link connecting UE C 1356 and UE F 1362, and a second link connecting UE B 1354 and UE F 1362.

In some aspects, the UE can determine the SIR based on values that it has measured. For example, if the UE executing process 1300 is an RX UE (e.g., UE A 1352), the UE can determine the SIR based on reference signal received power (RSRP) estimates that the UE generated based on signals received by the UE.

Alternatively, in some aspects, the UE can determine the SIR based on values that it has received from another device. For example, if the UE executing process 1300 is a TX UE (e.g., UE B 1354), the UE can determine the SIR based on RSRP estimates that the UE received from another UE (e.g., UE A 1352).

In addition to, or in lieu of, determining the SIR at 1302, in some aspects, a UE can determine an adaptive RSRP threshold (e.g., as described above in connection with FIG. 5) based on an SIR threshold and an RSRP at an RX UE. For example, if the UE determines an adaptive RSRP threshold, the UE can compare an RSRP from a potentially interfering TX measured at an RX UE to the RSRP threshold to determine if transmission from the potentially interfering TX are likely to interfere with a transmission to the RX UE. Accordingly, in some aspects, 1302 can be omitted.

At 1304, a UE can identify resources reserved by the second UE. In some aspects, the UE can use any suitable technique or combination of techniques to identify resources reserved by the second UE. For example, as described above in connection with 516 and 520 of FIG. 5, the UE can receive SCI from the second UE that reserves resources, and can identify the reserved resources by decoding the SCI.

At 1306, a UE can determine, for each resource reserved by the second UE, if another UE reserved the same resource. For example, the UE can execute 1302 and/or 1304 for any number of nearby UEs (e.g., any TX UE that transmits an SCI that can be decoded by the UE), and can identify resources that are reserved by multiple UEs.

If a UE determines that there are multiple reservations for a common resource ("YES" at 1308), process 1300 can move to 1310. At 1310, a UE can determine an aggregate SIR (or total RSRP) based on the RSRP of each potentially interfering link. For example, the UE can aggregate an RSRP from each potentially interfering link. For example, the UE can sum the RSRP's from each potential interfering UE in the linear domain (e.g., $\Sigma_{i=1}^{N} RSRP_{UE_i \to UE_A}$, where N is the number of potentially interfering UEs). In such an example, the aggregate power can be converted into a log domain value to facilitate comparison to an RSRP threshold in the log domain. In such an example, the UE can determine an aggregate SIR (e.g., by subtracting an aggregated RSRP in the log domain from the RSRP of the desired link in the log domain). Alternatively, the UE can compare the aggregate RSRP to an adaptive RSRP threshold (e.g., as described above in connection with FIG. 5).

Otherwise, for resources that are not associated with multiple reservations, ("NO" at 1308), process 1300 can move to 1312. At 1312, a UE can identify resources that are associated with an SIR that is above the SIR threshold as available resources. In some aspects, a UE can identify resources that are associated with an SIR that is above the SIR threshold by comparing an RSRP of a potentially interfering link(s) to an adaptive RSRP threshold (e.g., if the interfering RSRP is below the adaptive RSRP threshold the resource can be identified as available, as the power of the interfering link(s) is sufficiently lower than the desired signal).

At 1314, a UE can identify resources that are associated with an SIR that is below the SIR threshold as unavailable resources. In some aspects, a UE can identify resources that are associated with an SIR that is below the SIR threshold by comparing an RSRP of a potentially interfering link(s) to an adaptive RSRP threshold (e.g., if the interfering RSRP is above the adaptive RSRP threshold the resource can be identified as unavailable, as the power of the interfering link(s) is not sufficiently lower than the desired signal and is likely to cause an unacceptable level of interference).

At 1316, a UE can transmit a report to a TX UE identifying available and/or unavailable resources. In some aspects, the UE can transmit the report using any suitable technique or combination of techniques. For example, the UE can transmit the report using techniques described above in connection with 522 of FIG. 5. In some aspects, 1316 can be omitted when a UE executing process 1300 is a TX UE.

Figure 14:
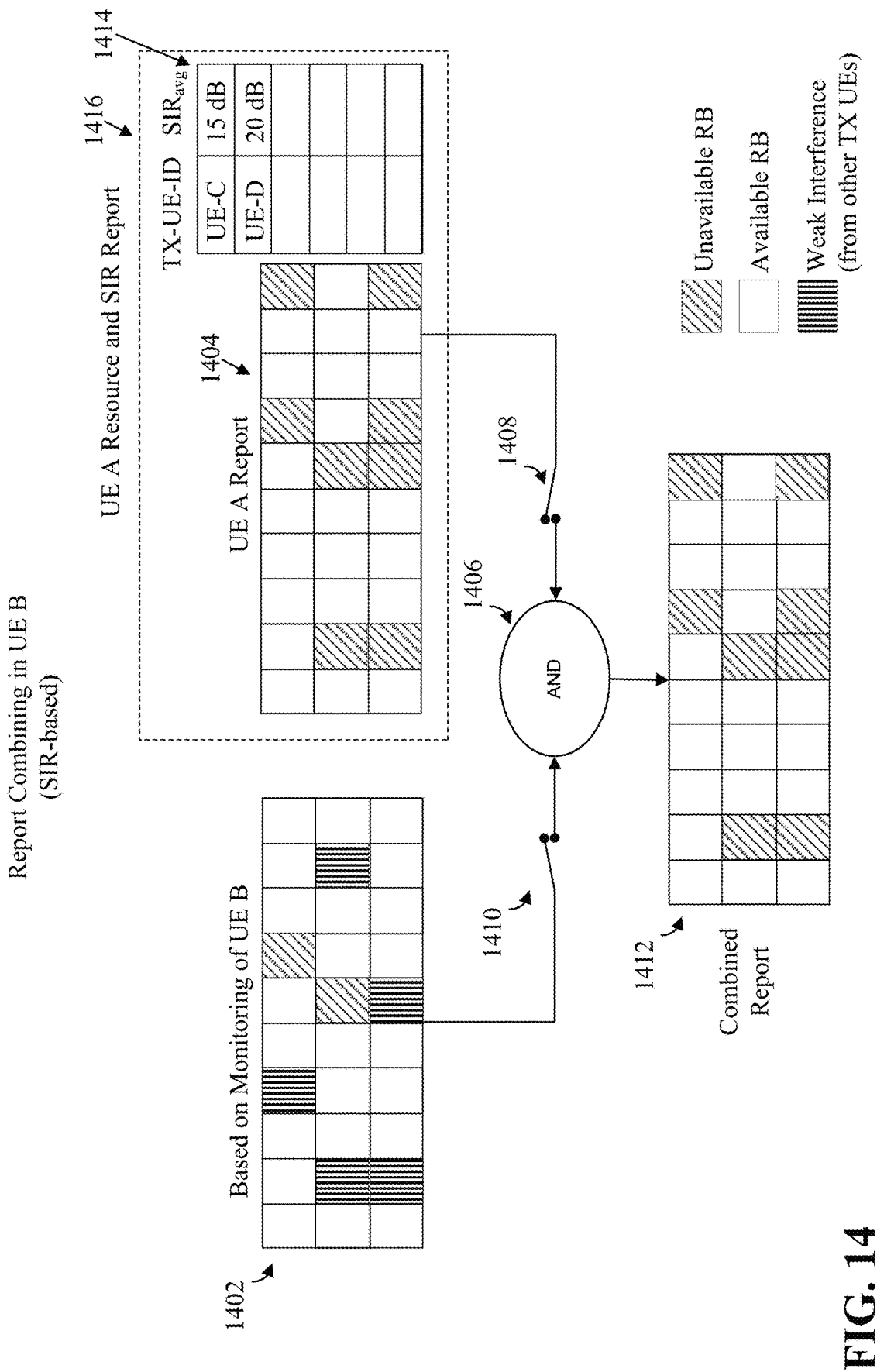
FIG. 14 is an example of reports generated by a transmitting UE accounting for resources that have a relatively low level of interference with a link between the transmitting UE and the receiving UE(s), and a report from an assisting UE for an upcoming resource selection window, and a combined report that can be used to select a resource to use to transmit data in accordance with some aspects of the disclosed subject matter.

FIG. 14 is an example of reports generated by a transmitting UE accounting for resources that have a relatively low level of interference with a link between the transmitting UE and the receiving UE(s), and a report from an assisting UE for an upcoming resource selection window, and a combined report that can be used to select a resource to use to transmit data in accordance with some aspects of the disclosed subject matter. FIG. 14 shows a first RA report 1402 generated by UE B, and a second RA report 1404 generated by UE A. As described above in connection with FIG. 5, in some aspects, UE B can combine report 1402 and report 1404 to determine whether a particular resource is available or unavailable for use by UE B. For example, UE B can perform a bitwise logical AND operation 1406 between report 1402 and report 1404, and a resource can be identified as available if it is identified as available in both report 1402 and report 1404.

FIG. 14 includes conceptual illustrations of switches 1408 and 1410, which can represent a result of a technique selection process. In the example shown in FIG. 14 both switches 1408 and 1410 are illustrated as closed, which can represent a technique in which reports 1402 and 1404 are both used to generate a combined report 1412 that can be used to identify available resources that can be selected by UE B.

Although not shown, an example with switch 1408 open and switch 1410 closed can represent a technique in which only report 1402 is used (in such an example AND 1406 and combined report 1412 can be omitted).

Additionally, although also not shown, an example with switch 1408 closed and switch 1410 open can represent a technique in which only report 1404 is used by UE B (in such an example AND 1406 and combined report 1412 can be omitted).

Additionally, FIG. 14 shows a conceptual illustration of another report 1414 (e.g., an SIR report) that can be used to convey SIR values (in FIG. 14, average SIR values) based on a comparison of the power on a link between UE B and UE A, and links between potentially interfering UEs (e.g., UE-C and UE-D, such as UE C 1356 and UE D 1358 in FIG. 13B). In the example of FIG. 14, the values in report 1414 can be used by UE B to identify resources that are reserved but would not cause an unacceptable level of interfere with transmissions to UE A. In some aspects, RA report 1404 and SIR report 1414 can be included in a resource availability and SIR report 1416. For example, resource availability and SIR report 1416 can be transmitted to UE B to convey information in both report 1404 and SIR report 1414. Alternatively, in some aspects, RA report 1404 and SIR report 1414 can be conveyed to UE B separately (e.g., as separate reports transmitted using different resources).

Figure 15:
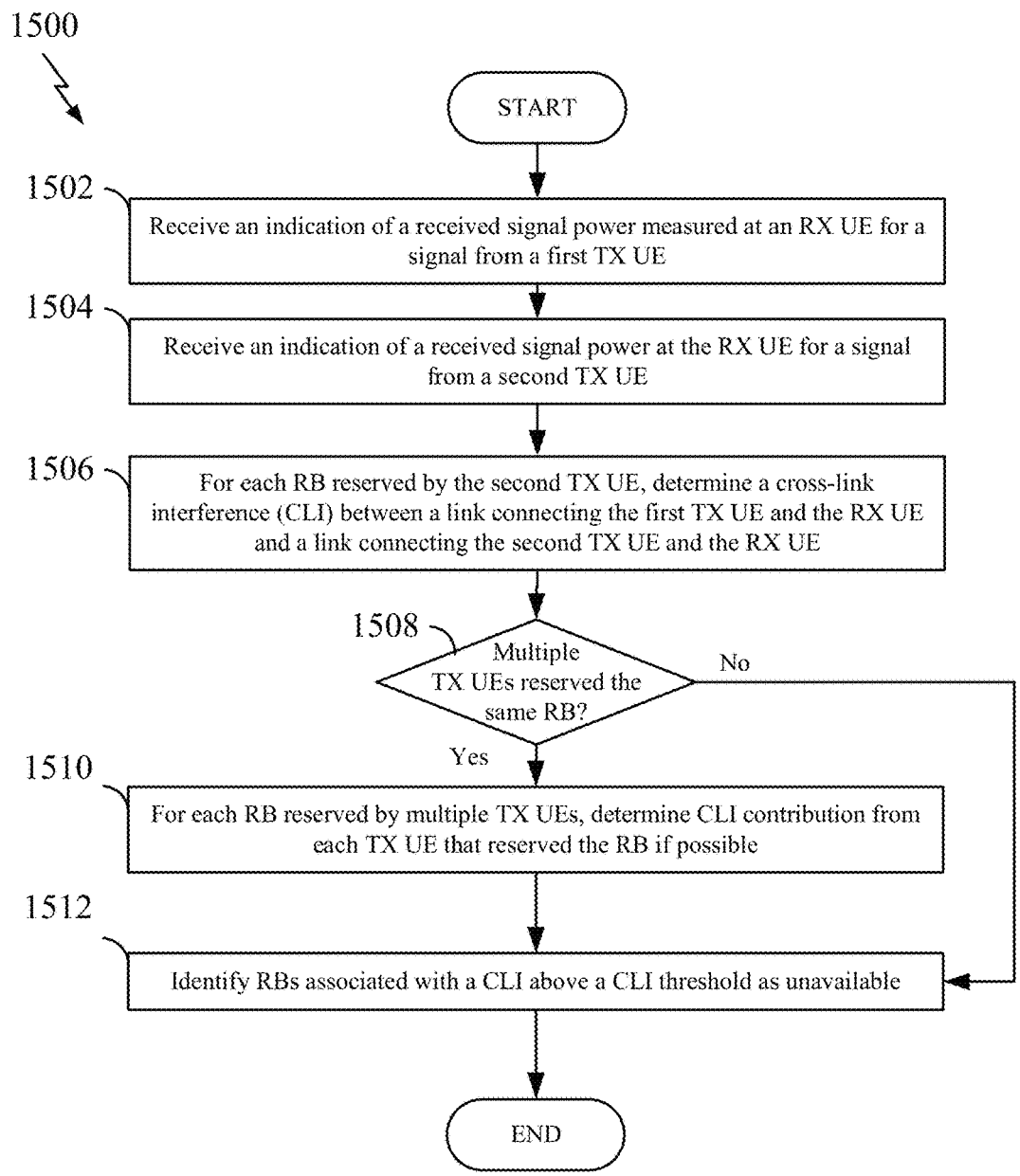
FIG. 15 is a flow chart illustrating an exemplary process for a transmitting UE to sense resources that are reserved and which would be subject to a relatively high level of interference from a link between the transmitting UE and the receiving UE(s) in accordance with some aspects of the disclosed subject matter.

FIG. 15 is a flow chart illustrating an exemplary process 1500 for a transmitting UE to sense resources that are reserved and which would be subject to a relatively high level of interference from a link between the transmitting UE and the receiving UE(s) in accordance with some aspects of the disclosed subject matter.

At 1502, a UE (e.g., UE 126, UE 132, UE 206b, UE B 504, UE B 1354, UE C 1356, UE D 1358, etc.) can receive an indication of a received power signal (e.g., an RSRP value) measured at an RX UE for a signal transmitted from a first TX UE. In some aspects, the UE can receive the indication using any suitable technique or combination of techniques. For example, the UE can use techniques described above in connection with 1026 of FIG. 10.

At 1504, a UE can receive an indication of a received power signal (e.g., an RSRP value) measured at the RX UE for a signal transmitted from a second TX UE. In some aspects, the UE can receive the indication using any suitable technique or combination of techniques. For example, the UE can use techniques described above in connection with 1026 of FIG. 10.

At 1506, a UE can determine, for each resource reserved by the second UE, if a cross-link interference (CLI) between a link connecting the first TX UE and the RX another UE reserved the same resource. For example, the UE can execute 1302 and/or 1304 for any number of nearby UEs (e.g., any TX UE that transmits an SCI that can be decoded by the UE), and can identify resources that are reserved by multiple UEs.

If a UE determines that there are multiple reservations for a common resource ("YES" at 1508), process 1500 can move to 1510. At 1510, a UE can determine a CLI contribution caused by each TX UE at a peer RX UE.

For example, UE B 1354 in FIG. 13B can receive an RSRP value from UE E 1360 indicative of an RSRP of a signal transmitted by UE B 1354 and received by UE E 1360 (e.g., at 1502), and can receiving receive an RSRP value from UE E 1360 indicative of an RSRP of a signal transmitted by UE D 1358 and received by UE E 1360 (e.g., at 1504). As another example, UE B 1354 can receive an SIR value from UE E 1360 indicating an SIR between a desired link from UE D 1358 to UE E 1360 and an interfering link between UE B 1354 and UE E 1360. UE B 1354 can use $RSRP_{B \to E}$ and $RSRP_{D \to E}$ to determine a CLI caused by UE B 1354 at UE E 1360. However, if UE C 1356 reserved the same resource as UE D 1358 (e.g., to transmit a packet to UE F 1362), the signal from UE C 1356 can also be expected to cause CLI at UE E 1360. Accordingly, in some aspects, UE B 1354 can aggregate the CLI at UE E 1360 caused by UE C 1356 and the CLI at UE E 1360 that can be expected if UE B 1354 reserves the same resource.

Otherwise, for resources that are not associated with multiple reservations, ("NO" at 1508), process 1500 can move to 1312. At 1312, a UE can identify resources that are associated with an SIR that is above the SIR threshold as available resources. In some aspects, a UE can identify resources that are associated with an SIR that is above the SIR threshold by comparing an RSRP of a potentially interfering link(s) to an adaptive RSRP threshold (e.g., if the interfering RSRP is below the adaptive RSRP threshold the resource can be identified as available, as the power of the interfering link(s) is sufficiently lower than the desired signal).

At 1512, a UE can identify resources with a CLI that exceeds a CLI threshold as unavailable (e.g., due to an unacceptable level of interference that can be expected if the UE selected the resource). Returning to the example described above in connection with 1510, if the aggregated CLI is above a CLI threshold (e.g., a fixed CLI threshold or an adaptive CLI threshold based on $RSRP_{D \to E}$), UE B 1354 can identify the resource as unavailable, even if the interference at UE A 1352 is acceptable and/or an $RSRP_{D \to B}$ is below a fixed threshold. Otherwise, if the aggregated CLI is below the CLI threshold, the resource can remain available.

In some aspects, the UE can compare an SIR (e.g., based on a comparison of desired link and the potentially interfering link from the UE) to an SIR threshold to identify resources that may experience an unacceptable level of CLI if the UE selects the resource.

Figure 16:
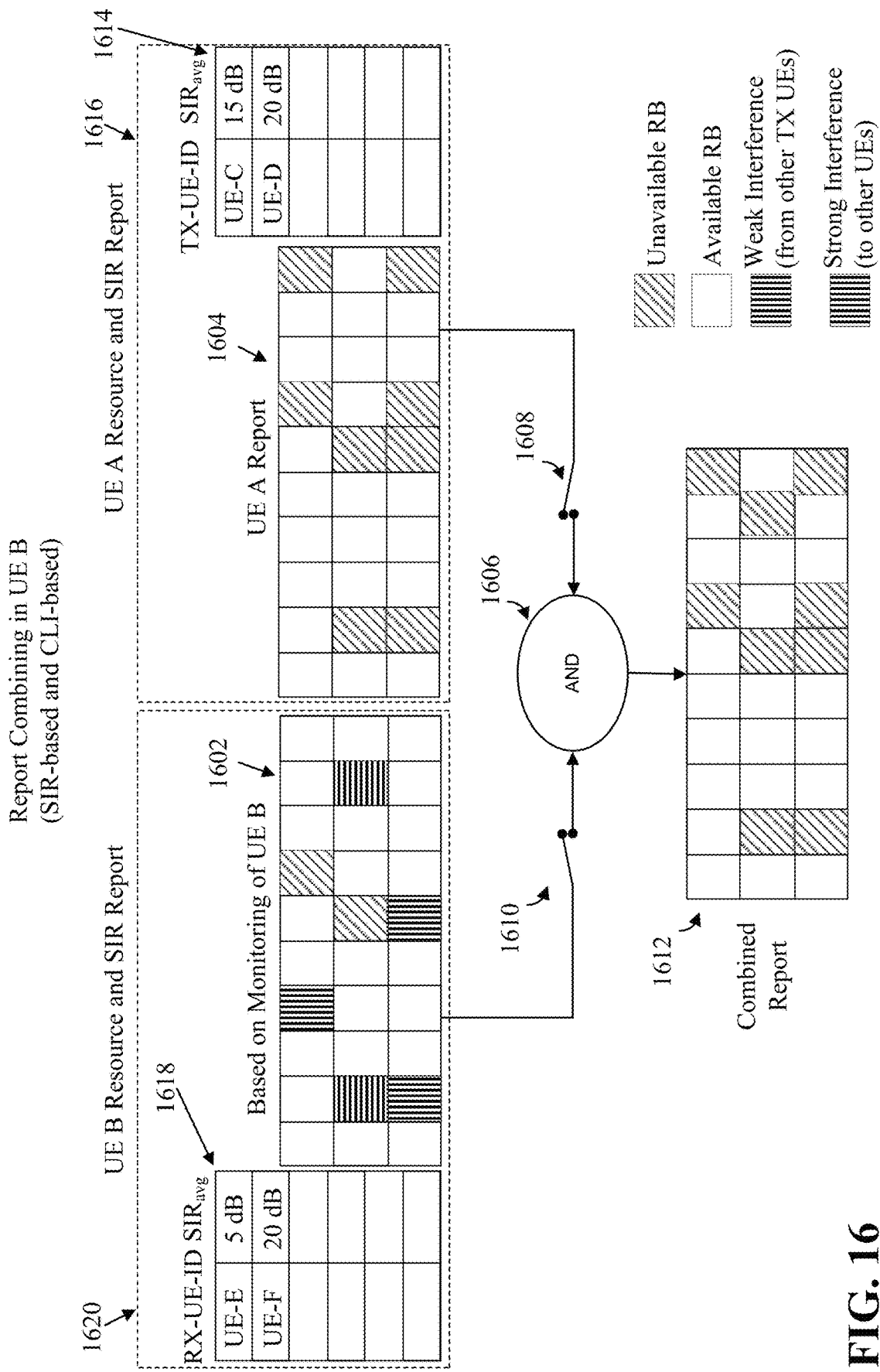
FIG. 16 is an example of reports generated by a transmitting UE accounting for resources that would be subject to a relatively high level of interference from a link between the transmitting UE and the receiving UE(s), and a report from an assisting UE for an upcoming resource selection window, and a combined report that can be used to select a resource to use to transmit data in accordance with some aspects of the disclosed subject matter.

FIG. 16 is an example of reports generated by a transmitting UE accounting for resources that would be subject to a relatively high level of interference from a link between the transmitting UE and the receiving UE(s), and a report from an assisting UE for an upcoming resource selection window, and a combined report that can be used to select a resource to use to transmit data in accordance with some aspects of the disclosed subject matter.

FIG. 16 is similar to FIG. 14, and further includes resources that are identified as unavailable by UE B due to strong interference with other UEs. For example, FIG. 16 shows a first RA report 1602, a second RA report 1604, a bitwise logical AND operation 1606 that can be used to combine reports 1602 and 1604, a combined report 1612, and switches 1608 and 1610 that conceptually represent which report(s) are used to identify available resources, which are similar to corresponding components in FIG. 14. Additionally, FIG. 16 shows another report 1614 that is similar to report 1414 described above in connection with FIG. 14. In some aspects, RA report 1604 and SIR report 1614 can be included in a resource availability and SIR report 1616. For example, resource availability and SIR report 1616 can be transmitted to UE B to convey information in both report 1604 and SIR report 1614. Alternatively, in some aspects, RA report 1604 and SIR report 1614 can be conveyed to UE B separately (e.g., as separate reports transmitted using different resources).

FIG. 16 shows a conceptual illustration of yet another report 1618 that can be used to convey SIR values (in FIG. 16, average SIR values) based on a comparison of the power on a link between a TX UE (e.g., UE C 1356 and UE D 1358 in FIG. 13B), and an RX UE (e.g., UE E 1360 and UE F 1362, respectively), and links between UE B (e.g., UE B 1354 in FIG. 13B) and non-targeted RX UEs (e.g., UE E 1360 and UE F 1362, respectively). In the example of FIG. 16, the values in report 1618 can be used by UE B to identify resources that are reserved and may cause weak interference at a target UE (e.g., UE A), but would cause an unacceptable level of interfere with transmissions to other UEs (e.g., UE E or UE F). In some aspects, RA report 1602 and SIR report 1618 can be included in a resource availability and SIR report 1620 that can be used to record resource availability and/or SIR information that can be used to determine which resources are available in a resource selection window. Alternatively, in some aspects, RA report 1604 and SIR report 1614 can be recorded separately (e.g., as separate reports transmitted using different resources).

Figure 17:
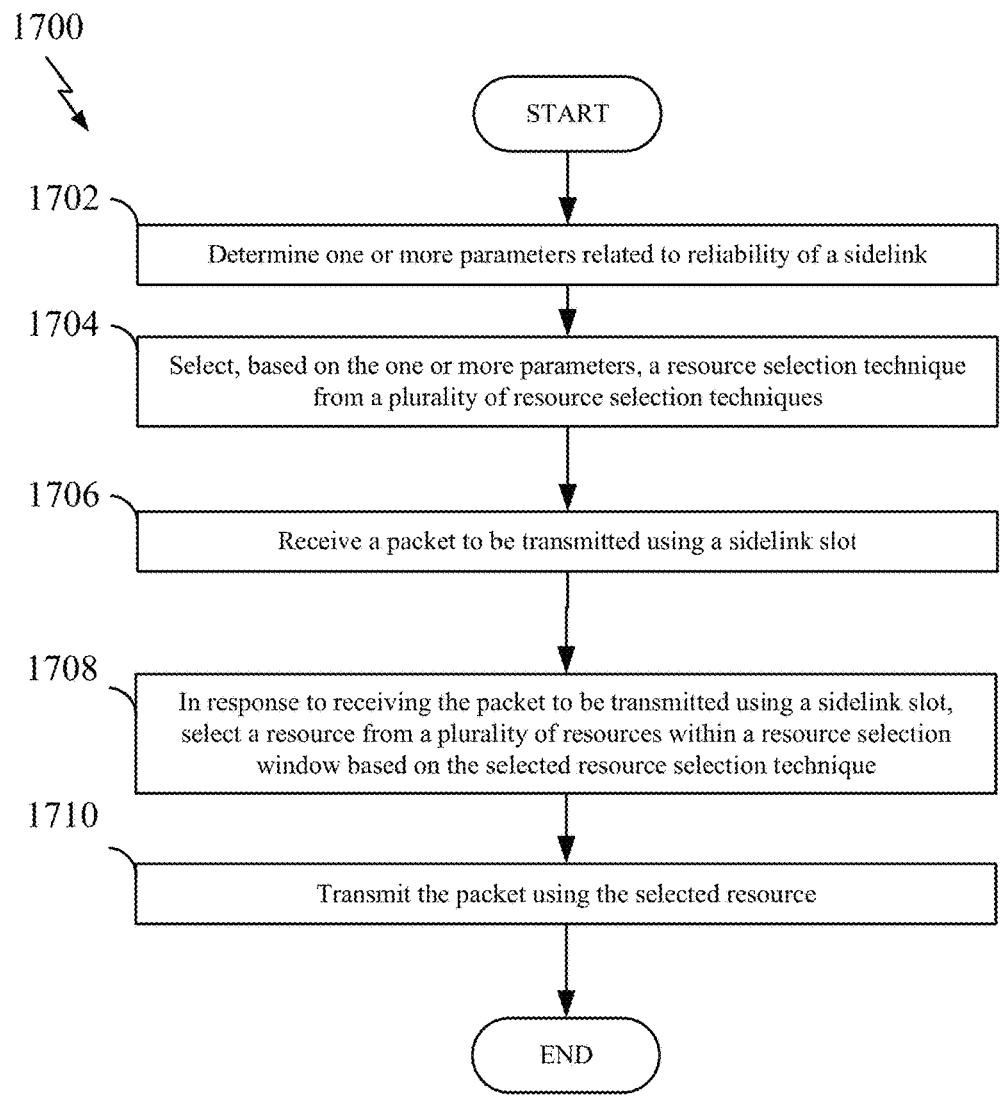
FIG. 17 is a flow chart illustrating an exemplary process for sidelink resource allocation in accordance with some aspects of the present disclosure.

FIG. 17 is a flow chart illustrating an exemplary process 1700 for sidelink resource allocation in accordance with some aspects of the present disclosure. As described below, some or all illustrated features may be omitted in a particular implementation within the scope of the present disclosure, and some illustrated features may not be required for implementation of all features. In some examples, the process 1700 may be carried out by a UE or scheduled entity as illustrated in any of FIGS. 1, 2, 4, 5, 6, 7, and/or 10. In some examples, the process 1700 may be carried out by any suitable apparatus or means for carrying out the functions or algorithm described below.

At block 1702, a UE may determine one or more parameters related to reliability of a sidelink. For example, a UE 400 may retrieve a parameter related to a target reliability and/or a parameter that can be used to estimate a likely reliability of transmissions, as described above.

At block 1704, the UE may select, based on the one or more parameters, a resource selection technique from a plurality of resource selection techniques. For example, the UE 400 utilize a sidelink resource allocation technique selection circuit 442 to select a suitable resource selection technique, as described above, At block 1706, the UE may receive a packet to be transmitted using a sidelink slot. For example, a data source (e.g., a higher-layer entity such as a MAC entity and/or a software application) may generate and send a message (e.g., including one or more packets) to a physical layer entity (e.g., a sidelink resource selection circuit 440) for transmission over a sidelink channel.

At block 1708, the UE may, in response to receiving the packet to be transmitted using a sidelink slot, select a resource from a plurality of resources within a resource selection window based on the selected resource selection technique. For example, the UE 400 may utilize a sidelink resource selection circuit 440 to employ the algorithm of the selected resource selection technique, as described above.

At block 1710, the UE may transmit the packet using the selected resource. For example, UE 400 may employ a transceiver 410 to transmit the message over the selected resource.

Figure 18:
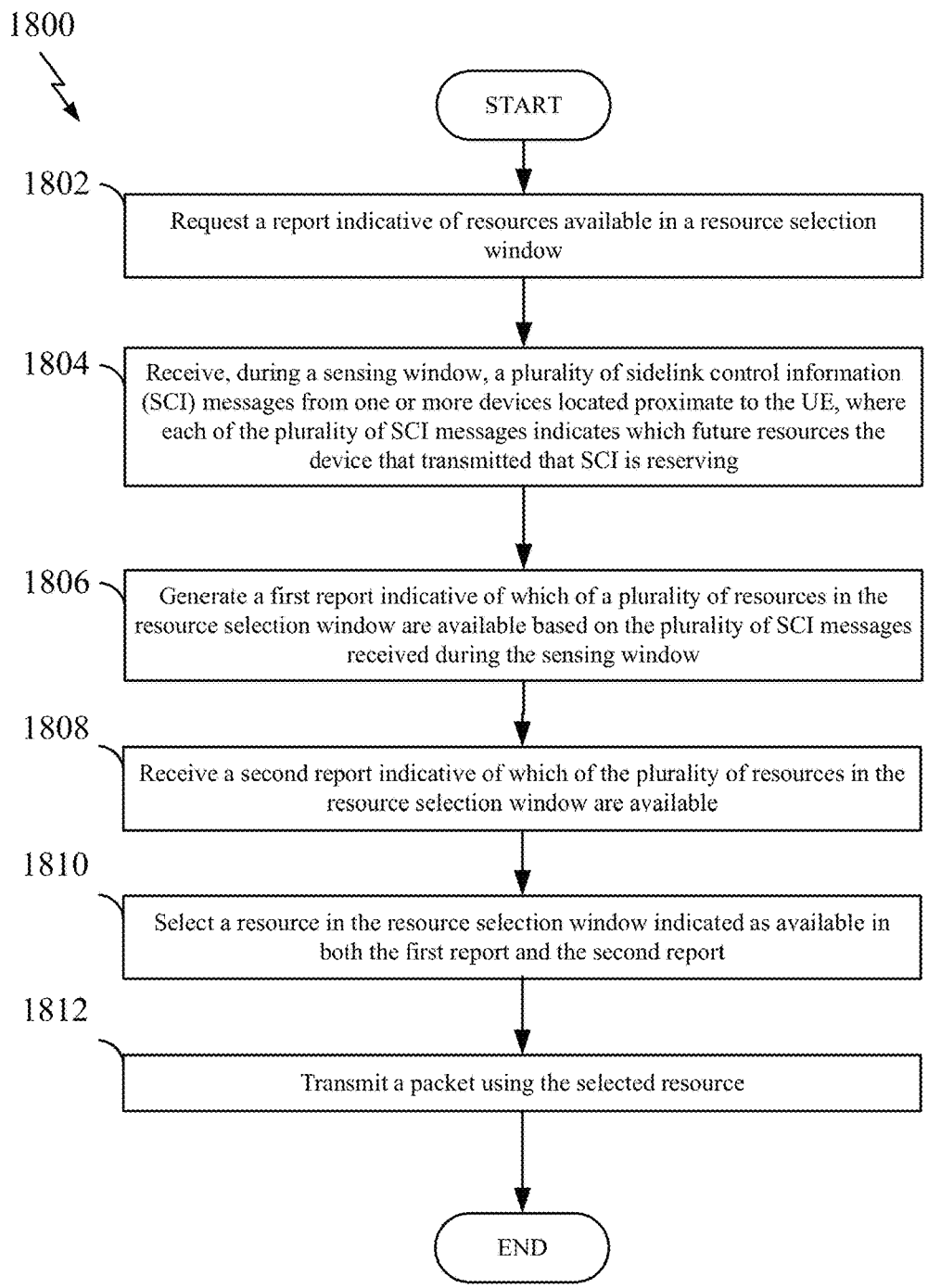
FIG. 18 is a flow chart illustrating a further exemplary process for sidelink resource allocation in accordance with some aspects of the present disclosure.

FIG. 18 is a flow chart illustrating a further exemplary process 1800 for sidelink resource allocation in accordance with some aspects of the present disclosure. As described below, some or all illustrated features may be omitted in a particular implementation within the scope of the present disclosure, and some illustrated features may not be required for implementation of all features. In some examples, the process 1800 may be carried out by a UE or scheduled entity as illustrated in any of FIGS. 1, 2, 4, 5, 6, 7, and/or 10. In some examples, the process 1800 may be carried out by any suitable apparatus or means for carrying out the functions or algorithm described below.

At block 1802, a UE may request a report indicative of resources available in a resource selection window. For example, a UE 400 may employ a transceiver 410 to transmit a request on a sidelink channel or carrier, e.g., via a sidelink control information (SCI), or any other suitable request message format.

At block 1804, the UE may receive, during a sensing window, a plurality of sidelink control information (SCI) messages from one or more devices located proximate to the UE, where each of the plurality of SCI messages indicates which future resources the device that transmitted that SCI is reserving. For example, the UE 400 may employ the transceiver 410 to receive the SCI messages.

At block 1806, the UE may generate a first report indicative of which of a plurality of resources in the resource selection window are available based on the plurality of SCI messages received during the sensing window. For example, the UE 400 may employ a sidelink resource selection circuit 440 to generate (e.g., in memory 405) a table having a suitable format indicating available sidelink resources.

At block 1808, the UE may receive a second report indicative of which of the plurality of resources in the resource selection window are available. For example, the UE 400 may utilize a transceiver 410 to receive a message (e.g., a SCI carried on a sidelink channel, or any other suitable message or format) indicating sidelink resource availability information.

At block 1810, the UE may select a resource in the resource selection window indicated as available in both the first report and the second report. For example, the UE 400 may employ a sidelink resource selection circuit 440 to combine the respective reports in any of the various fashions described above, and to select a suitable resource based on the combined resource allocation report.

At block 1812, the UE may transmit a packet using the selected resource. For example, the UE 400 may employ a transceiver 410 to transmit one or more packets over a sidelink carrier or channel.

The following simulation results represent a particular simulated implementation of techniques described herein, and are not intended to be limiting or represent a prediction of how effective techniques described herein are likely to be in practice.

Various resource allocation techniques described above were simulated, and results of various simulations are described below. In the simulations, each TX UE was associated with a single unique RX UE, which generated RA reports for techniques that included monitoring by an RX UE. In the simulations, RF-distance was used to evaluate the reliability of a link between a TX UE and an associated RX UE. RF-distance in the simulations is the sum of pathloss and shadow fading values for the link between any TX-UE and the associated RX-UE. In the simulations, RA reports were assumed to be immediately available with no latency to avoid overcomplicating the simulations. RSRP can be used as In the tables below, RL-X (e.g., RL-99, RL-95) represents a reliability level-X. For a given RL-X, the average RF-distance at which packet decoding reliability falls below a pre-defined value represents performance of the technique. For example, for RL-99, the simulation was used to determine an average RF distance at which 1 out of every 100 packet was not decoded by the RX UE. Accordingly, a higher RF-distance corresponds to better performance. Alternatively, if the RF-distance were held constant, the TX UE could use less power to achieve a target reliability.

The following parameters were used in the simulations: inter-site distance (ISD); $N_{TX}$; $T_{rep}$; and $N_{RB}$. ISD represents a distance between two adjacent site centers, and can be used to control a density of UEs in a given area in the simulation, and $N_{TX}$ represent the average number of TX UEs per site. Accordingly, if ISD is decreased while holding $N_{TX}$ constant, the density of UEs generally increases, which can simulate a higher network load.

$T_{rep}$ represents the average inter-packet generation time for each TX UE, and $N_{RB}$ represents the packet (or transport block, TB) size in number of RBs used on PSSCH. In the simulations described below, $N_{TX}$ and $T_{rep}$ were fixed at $N_{TX}$=252 UEs per site, and $T_{rep}$=100 ms.

TABLE 1 includes simulation results for a simulated lightly loaded network with ISD=250 meters, and NRB=30 RBs/TB. As shown in TABLE 1, RX-only sensing and AND-combining were about 2 and 3 dBs higher for a reliability level target of 0.90 packet decoding success probability. For reliability >0.99, RX-only sensing and AND-combining were about 3-4 dBs higher than TX-only. The highest performing technique at each reliability level is underlined in the tables below.

TABLE 1

|  | RL-99 | RL-95 | RL-90 |
| --- | --- | --- | --- |
| TX-only | 110.9 dB | 115.4 dB | 116.5 dB |
| RX-only | 114.5 dB | 116.7 dB | 118.7 dB |
| AND-combining | <u>115.4 dB</u> | <u>116.7 dB</u> | <u>119.2 dB</u> |

TABLES 2 and 3 include simulation results for a simulated heavily loaded network with ISD=200 meters and $N_{RB}$=50 RBs/TB. RX-only sensing performed about 8 dB better than TX-only sensing for RL-99, 9 dBs better for RL-95, and 6 dBs for RL-90. Applications that may benefit from higher reliability gain more from the RX-only technique. This can potentially be attributed to TX-only and AND-combining identifying many more resources as unavailable that are available when the RSRP at the RX-UE is measured. RX-only sensing performed better overall reliability levels in this simulation.

TABLE 2

|  | RL-99 | RL-95 | RL-90 |
| --- | --- | --- | --- |
| TX-only | 95.9 dB | 102.8 dB | 107.1 dB |
| RX-only | <u>103.8 dB</u> | <u>111.5 dB</u> | <u>113.0 dB</u> |
| AND-combining | 97.3 dB | 104.4 dB | 109.8 dB |

In TABLE 3, RX-only2 is a technique in which only information monitored by the RX UE is used, and an adaptive RSRP threshold/SIR threshold was also used. Similarly, CLI2 is a technique in which the TX UE evaluates CLI at other nearby RX UEs (e.g., non-targeted UEs), and an adaptive RSRP threshold/SIR threshold was also used by the RX UE. The values in parentheses are the CLI threshold used to determine whether the TX UE would cause an unacceptable level of CLI.

TABLE 3

|  | RL-99 | RL-95 | RL-90 | No. of Links with RL-99 |
| --- | --- | --- | --- | --- |
| TX-only | 95.9 dB | 102.8 dB | 107.1 dB | 33 |
| RX-only | 103.8 dB | 111.5 dB | 113.0 dB | 76 |
| RX-only2 | <u>105.2 dB</u> | 112.2 dB | 113.1 dB | <u>101</u> |
| AND-combining | 97.3 dB | 104.4 dB | 109.8 dB | 41 |
| CLI (10 dB) | 103.7 dB | 110.3 dB | 112.8 dB | 77 |
| CLI (8 dB) | 104.4 dB | 111.5 dB | 113.1 dB | 82 |
| CLI2 (10 dB) | 104.7 dB | 111.8 dB | <u>113.1 dB</u> | 99 |
| CLI2 (8 dB) | 104.1 dB | <u>112.5 dB</u> | <u>113.1 dB</u> | 90 |

Figure 19:
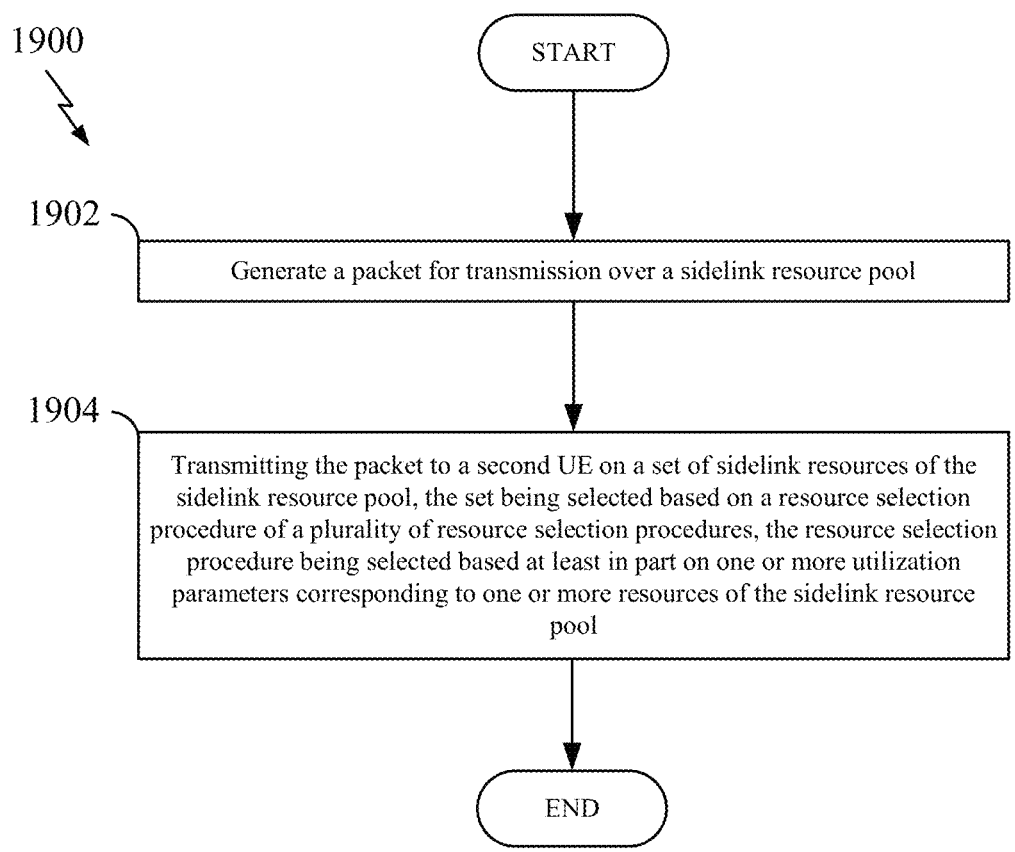
FIG. 19 is a flow chart illustrating an exemplary process for sidelink communication according to a selected resource selection procedure in accordance with some aspects of the present disclosure.

FIG. 19 is a flow chart illustrating an exemplary process for sidelink communication according to a selected resource selection procedure. As described below, some or all illustrated features may be omitted in a particular implementation within the scope of the present disclosure, and some illustrated features may not be required for implementation of all features. In some examples, the process 1900 may be carried out by a UE or scheduled entity as illustrated in any of FIGS. 1, 2, 4-10, 13B, 14, and/or 16. In some examples, the process 1900 may be carried out by any suitable apparatus or means for carrying out the functions or algorithm described below.

At block 1902, a first UE (e.g., TX UE or UE B 504, 604, 704, 1004 of FIGS. 5, 6, 7, and/or 10) may generate a packet for transmission over a sidelink resource pool. In some examples, the first UE may generate a packet to be transmitted in a higher layer entity (e.g., a MAC entity and/or a software entity). In other examples, the first UE may receive and decode another packet from another device and generate a packet to be transmitted based on another packet. In some aspects, a sidelink resource pool may include multiple sidelink resources in a resource selection window. Examples of the sidelink resource may include a resource block, a subcarrier, a frequency spectrum (channel or carrier), a time slot or subframe of a TDD/FDD component carrier, a spreading code, a precoder, and/or other resources commonly used for sidelink communication.

At block 1904, the first UE may transmit, to a second UE (e.g., RX UE or UE A 502, 602, 702, 1002 of FIGS. 5, 6, 7, and/or 10), the packet to a second UE on a set of sidelink resources of the sidelink resource pool. A set of sidelink resources may, for example, include any suitable collection of sidelink resources, or portion of sidelink resources, of the sidelink resource pool. In some scenarios, the first UE may include an antenna and transmit the packet via the antenna to the second UE. In some instances, the first UE may select the set of sidelink resources based on a resource selection procedure of multiple resource selection procedures. This procedure is further explained in connection with FIG. 20. In further instances, the first UE may select the resource selection procedure based on one or more utilization parameters corresponding to one or more resources of the sidelink resource pool.

In some scenarios, the first UE may determine the one or more utilization parameters corresponding to one or more resources of the sidelink resource pool, which correspond to one or more parameters at 714 in FIG. 7. The one or more utilization parameters corresponding to one or more resources of the sidelink resource pool individually or in combination affect reliability of the transmission to the second UE. In some examples, the reliability may be measured by a signal strength or a performance gain for a given reliability level-X (RL-X) (e.g., RL-99, RL-95). For example, for RL-99, the first UE may determine an average signal strength or performance gain at which 1 out of every 100 packet was not decoded by the second UE. Thus, the first UE may measure the reliability of the multiple resources selection procedures based on the one or more utilization parameters and select one resource selection procedure of the multiple resource selection procedures based on the measured reliability. For example, the first UE may select a resources selection procedure having the highest signal strength or performance gain among multiple resource selection procedure for a given RL-X.

In some aspects of the disclosure, the one or more utilization parameters may include a channel utilization parameter indicative of a measurement of a network load for the transmission associated with the packet for transmission. In some examples, the channel utilization parameter may include a Channel Busy Ratio (CBR) value calculated using a received power in a set of measured resources corresponding to the sidelink carrier. For example, when the first UE determines that network load in the proximity of the second UE is relatively light (e.g., a CBR less than 0.5, 0.8, or any other suitable CBR threshold), the first UE may select a resource selection procedure (e.g., a cross-link interference (CLI) based, or AND-combining resource selection procedure) based on the measured reliability. When the network load in the proximity of the second UE is relatively heavy, the first UE may select a different resource selection procedure (e.g., an RX-only resource selection procedure).

In further examples, the first UE may determine the resource selection procedure as a sensing procedure (e.g., a TX-only, AND-combining, SRI-based, or CLI-based resource selection procedure) or a non-sensing procedure (e.g., an RX-only resource selection procedure) for the first UE based on the CBR value exceeding the threshold. Thus, the first UE may switch between a sensing resource selection procedure (e.g., a TX-only, AND-combining, SRI-based, or CLI-based resource selection procedure) and no-sensing resource selection procedure (e.g., an RX-only resource selection procedure) based on availability of inter-UE coordination and/or based on the measured network load (e.g., CBR value). For example, if the first UE determines that network load in the proximity of the second UE is relatively light, the first UE may switch the current resource selection procedure to or maintain the sensing resource selection procedure (e.g., an SRI-based, CLI-based, or AND-combining resource selection procedure). Otherwise, the first UE may switch the current resource selection procedure to or maintain the no-sensing resource selection procedure (e.g., a RX-only resource selection procedure).

In other aspects, the first UE may determine a packet priority parameter indicative of a priority of the transmission associated with the packet. For example, for a higher priority packet, the first UE may select a resource selection procedure that provides higher reliability (e.g., strong signal strength, reduced latency, a reduced likelihood that the packet is dropped, etc.).

In further aspects, the first UE may determine a remaining packet delay budget (PDB) parameter indicative of a PDB of the transmission associated with the packet. For a packet associated with a shorter or lower PDB, the first UE may select a resource selection procedure that provides higher reliability.

In still further aspects, the first UE may determine a parameter indicative of a cast type associated with the packet. For example, a packet that is to be unicast may not be as sensitive to reduced reliability as a packet that is to be groupcast or broadcast. Thus, for a packet associated with multicast or groupcast communication, the first UE may select a resource selection procedure that provides higher reliability than another resource selection procedure for unicast communication.

In still further aspects, the first UE may determine a parameter indicative of a distance between the first UE and the second UE. In some examples, the distance may include an RF-distance between the first UE and the second UE for unicast communication. The RF-distance may be calculated, for example, by summing pathloss and the shadow fading values for the link between the first UE and the second UE. In other examples, the distance may include a range parameter derived from SCI received from UEs for group cast communication. For example, a larger range for a groupcast can be expected to impact reliability (e.g., signals transmitted over a longer range can be received with a lower power).

In still further aspects, the first UE may determine a packet reliability requirement parameter indicative of a predetermined level of a transmission characteristic of the transmission associated with the packet. For example, the packet reliability requirement parameter may indicate that a packet for the transmission meets transmission characteristics (e.g., transmission power, MCS, etc.). In other examples, the packet reliability requirement parameter may indicate a reliability threshold for a selected resource selection procedure (e.g., not less than 110 dB for RL 99).

In still further aspects, the first UE may determine a parameter indicative of a periodicity at which the first UE is configured to sense or monitor received signals. For example, when the first UE is configured to use a particular discontinuous reception (DRX) interval, the first UE may select a resource selection procedure that has more RX-UE involvement (e.g., an RX-only, CLI-based, or AND-combining resource selection procedure).

In still further aspects, the first UE may determine a parameter indicative of a power at which the first UE is configured to transmit using the resources. For example, transmitting with lower power can reduce reliability of a transmission.

Accordingly, based on the one or more utilization parameters described above, the first UE may measure the reliability (e.g., signal strength or performance gain) of multiple resource selection procedures under a given reliability level (RX-L). Then, the first UE may select a suitable resource selection procedure based on the measured reliability. Based on the selected resource selection procedure of multiple resource selection procedures, the first UE may select the set of sidelink resources. This procedure is further explained in connection with FIG. 20 below.

Figure 20:
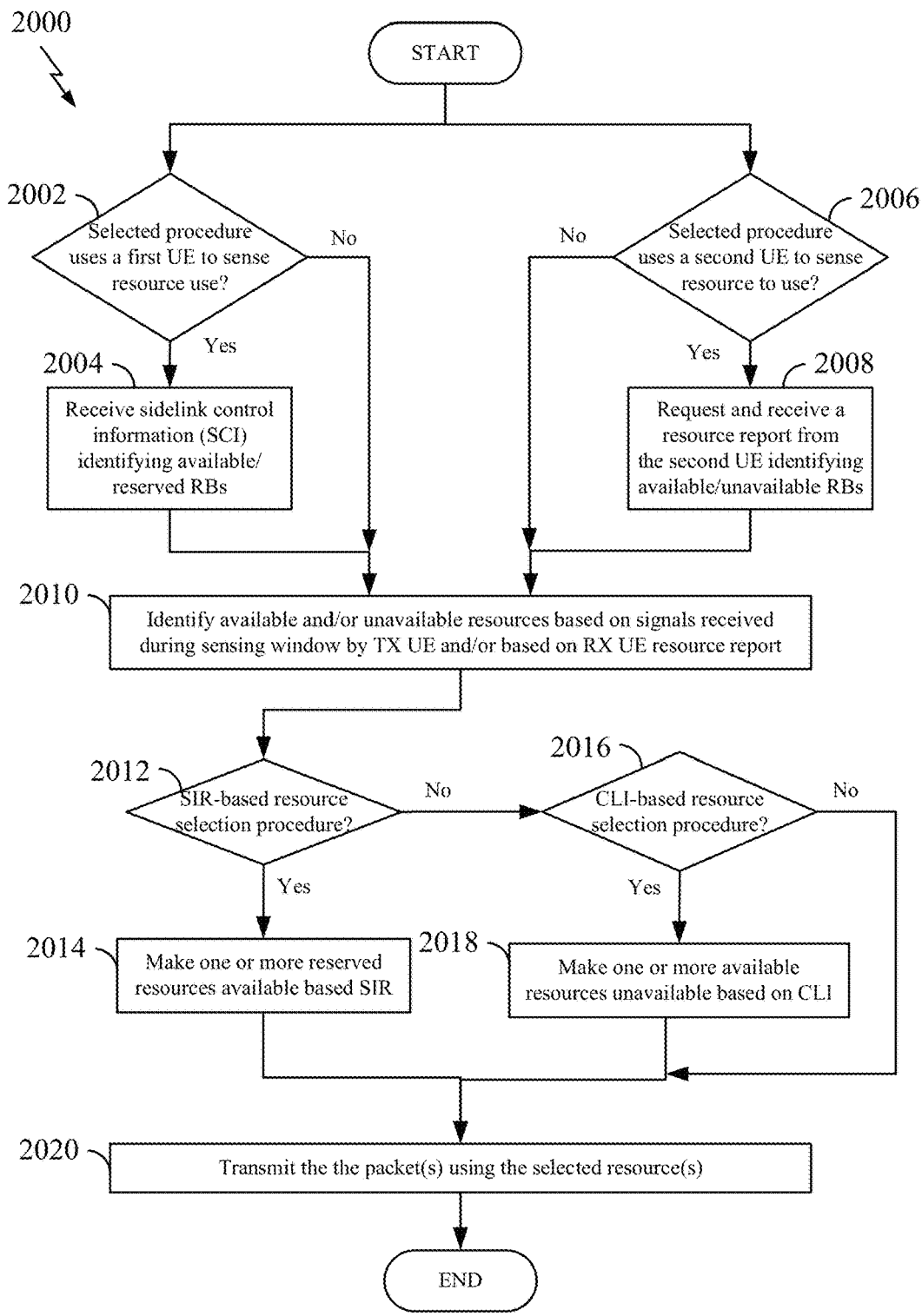
FIG. 20 is a flow chart illustrating an exemplary process for selecting available resources based on a resource selection procedure among multiple resource selection procedures in accordance with some aspects of the present disclosure.

FIG. 20 is a flow chart illustrating an exemplary process for selecting available resources based on a resource selection procedure among multiple resource selection procedures. As described below, some or all illustrated features may be omitted in a particular implementation within the scope of the present disclosure, and some illustrated features may not be required for implementation of all features. In some examples, the process 2000 may be carried out by a UE or scheduled entity as illustrated in any of FIGS. 1, 2, 4-10, 13B, 14, and/or 16. In some examples, the process 2000 may be carried out by any suitable apparatus or means for carrying out the functions or algorithm described below.

As explained above in connection with FIG. 19, the first UE (e.g., TX UE or UE B 504, 604, 704, 1004 of FIGS. 5, 6, 7, and/or 10) may select a resource selection procedure from multiple resource selection procedures based on one or more utilization parameters related to utilization of the sidelink carrier. In some examples, the multiple resource selection procedures may include, for example, TX-only, RX-only, AND-combining, SIR-based, CLI-based, and random resource selection procedures. Then, the first UE may select a set (e.g., available resource(s)) of sidelink resources of the sidelink resource pool to transmit a packet according to the selected resource selection procedure.

At block 2002, the first UE may determine if the selected resource selection procedure uses the first UE to sense resource availability. If the first UE senses the resource availability ("YES" at block 2002), the first UE may sense the resource availability and select the TX-only, AND-combining, SIR-based, or CLI-based resource selection procedure. However, if the first UE does not sense the resource availability ("NO" at block 2002), the first UE does not sense the resource availability and select the RX-only resource selection procedure.

If the first UE senses the resource availability ("YES" at block 2002), at block 2004, the first UE may sense or monitor resources in a resource sensing window and receive a sidelink control information (SCI) message from a third UE. The SCI message may include information indicating a set of reserved resources of the sidelink resource pool in a resource selection window. For example, the SCI message may indicate the set of reserved resources that is reserved in the resource selection window by the third UE. The first UE may receive the SCI message during the resource sensing window. In some examples, the SCI message may further include priority information of the packet to be transmitted.

At block 2010, the first UE may identify available or unavailable resources in the resource selection window based on the SCI message. For example, the SCI message may include a reference signal (e.g., a demodulation reference signal (DMRS)). The first UE may estimate a signal strength (e.g., reference signal received power (RSRP) or reference signal received quality (RSRQ)) based on the reference signal in the SCI. In some examples, the first UE may determine that a resource corresponding to the reference signal is available when the signal strength is not less than a predetermined threshold. When the signal strength is less than the predetermined threshold, the first UE may determine that the resource is unavailable. Thus, the first UE may determine a resource availability including one or more available sidelink resources based on the SCI message. In some examples, when the first UE does not receive a resource report from a second UE (e.g., RX UE or UE A 502, 602, 702, 1002 of FIGS. 5, 6, 7, and/or 10) that senses resource availability in the resource selection window, the first UE may be the only UE that senses the resource availability in the resource selection window. Then, the first UE may select the set of sidelink resources for transmitting the packet from the one or more available sidelink resources. This selected resource selection procedure may be referred to as a TX-only resource selection procedure.

With or without the first UE sensing resource availability, at block 2006, the first UE may determine if the selected resource selection procedure uses the second UE to sense resource availability (e.g., the first UE requests and receives a resource report about the resource sensing result) from the second UE. If the second UE senses the resource availability ("YES" at block 2006), the selected resource selection procedure may, for example, be the RX-only, AND-combining, SIR-based, or CLI-based resource selection procedure. However, if the second UE does not sense the resource availability ("NO" at block 2006), the selected resource selection procedure may be the TX-only resource selection procedure explained above.

If the first UE uses the second UE to sense the resource availability ("YES" at block 2006), at block 2008, the first UE may receive a resource report from the second UE. The resource report may, for example, indicate a first resource availability including one or more first available sidelink resources of the sidelink resource pool. In some examples, the first UE may explicitly transmit a request to the second UE for the resource report. In other examples, the first UE may receive the resource report without the explicit request. For example, the second UE may transmit the resource report periodically without any explicit request. Also, the second UE may be triggered for transmitting the resource report by observing multiple consecutive collisions in the first UE's transmissions.

At block 2010, the first UE may identify available or unavailable resources in the resource selection window based on the resource report from the second UE. That is, the second UE may determine available or unavailable resources in the resource selection window. The second UE may indicate a first resource availability including one or more first available sidelink resources (e.g., available resource(s)) of the sidelink resource pool in the resource report. In some examples, when the first UE does not sense resource availability in the resource selection window, the first UE may only use the second UE that sense the resource availability in the resource selection window by receiving the resource report from the second UE. This selected resource selection procedure may be referred to as an RX-only resource selection procedure. Thus, in the RX-only resource selection procedure, the first UE may select the set of sidelink resources for transmitting the packet from the first resource availability.

In some examples, the first UE may sense the resource availability at block 2004 and at the same time receive the resource report from the second UE at block 2008. For example, the first UE may receive a resource report from the second UE. The resource report may indicate a first resource availability including one or more available sidelink resources of the sidelink resource pool during the resource selection window. Also, the first UE may receive an SCI message from a third UE. The SCI message may include information indicating a set of reserved resources during the resource selection window. The first UE may determine a second resource availability during the resource selection window based on the SCI message. The second resource availability may include one or more second available sidelink resources of the sidelink resource pool.

At block 2010, the first UE may combine the first resource availability that the first UE sensed and the second resource availability of the resource report, which the second UE sensed. In some examples, the first UE may determine one or more third available sidelink resources available both in the first resource availability and the second resource availability. That is, the first UE may determine the one or more third available sidelink resources that are available both in the one or more first available sidelink resources and the one or more second available sidelink resources. For example, the resource report may include a first binary matrix including multiple elements corresponding to the sidelink resource pool in the resource selection window. In some examples, one or more first elements of the first binary matrix may correspond to the one or more first available sidelink resources indicating the first resource availability by the second UE. A second binary matrix including multiple elements may correspond to the sidelink resource pool in the resource selection window. In some examples, one or more second elements of the second binary matrix may correspond to the one or more second available sidelink resources indicating the second resource availability based on the SCI message from the third UE. The first UE may, for example, determine one or more third available sidelink resources by performing a bitwise logical AND operation between the one or more first elements of the first binary matrix and the one or more second elements of the second binary matrix. This selected resource selection procedure may be referred to as an AND-combining resource selection procedure. In the AND-combining resource selection procedure, the first UE may select the set of sidelink resources from the one or more third available sidelink resources. The TX-only, RX-only, and AND-combining resource selection procedures are further described above in connection with FIG. 11.

At block 2012, the first UE may determine if the selected resource selection procedure is an SIR-based resource selection procedure. If the procedure is an SIR-based resource selection procedure ("YES" at block 2012), the first UE may follow the SIR-based resource selection procedure at block 2014. If the procedure is not an SIR-based resource selection procedure ("NO" at block 2012), the first UE may determine if the procedure is a CLI-based selection procedure.

At block 2014, the first UE may perform the SIR-based resource selection procedure as described in connection with FIGS. 13A and 13B. In some examples, the first UE may make a reserved resource available based on an SIR of the respective reserved resource. For example, based on the SCI message from the third UE, the first UE may identify the set of reserved resources of the sidelink resource pool in the resource selection window. Also, based on the resource report from the second UE, the first UE may identify another set of reserved resources of the sidelink resource pool in the resource selection window. The another set of reserved resources may include one or more sidelink resources other than the one or more first available sidelink resources in the sidelink resource pool. The first UE may determine a subset of reserved resources reserved both in the set of reserved resources and the another set of reserved resources. In some examples, the subset of reserved resources may be determined by combining the set of reserved resources of the SCI message and the another set of reserved resources based on the resource report. For example, the combining is a bitwise logical AND operation of the set of reserved resources of the SCI message and the another set of reserved resources based on the resource report. In some examples, the subset of reserved sidelink resources may include reserved resource(s) reserved by the third UE indicated both in the SCI message in view of the first UE and based on the resource report in view of the second UE.

The first UE may, then, update the set of sidelink resources (i.e., available sidelink resources) to include one or more reserved resources of the subset when an SIR (e.g., SIR=the signal strength of the potentially interfering link between the second and third UEs—the signal strength of the target link between the first and second UEs) of the one or more reserved resources between a first signal strength and a second signal strength is not less than a threshold (e.g., SIR threshold). Here, the first signal strength may be associated with a first link between the first UE and the second UE while the second signal strength may be associated with a second link between the third UE and the second UE. The first signal strength may include a first RSRP, a first reference signal received quality (RSRQ), or any other suitable measurement of the first signal strength. The second signal strength may also include a second RSRP, a second RSRQ, or any other suitable measurement of the second signal strength. For example, the first link between the first UE and the second UE has a signal strength of 110 dB on a reserved resource by the third UE in view of the first UE while the second link between the third UE and the second UE has a signal strength of 115 dB on a reserved resource by the third UE in view of the second UE. When an SIR threshold is set as 10 dB, the SIR on the reserved resource between the first UE and the third UE may be 15 dB (115 dB-110 dB) that is greater than or equal to the SIR threshold (10 dB). Then, the first UE may update the set (available resource(s)) of the sidelink resources of the sidelink resource pool to include the reserved resource. It should be appreciated that the exemplified SIR threshold and the signal strength above may be any other suitable values.

At block 2016, the first UE may determine if the selected resource selection procedure is a CLI-based resource selection procedure. If the procedure is a CLI-based resource selection procedure ("YES" at block 2016), the first UE may follow the CLI-based resource selection procedure at block 2018. If the procedure is not a CLI-based resource selection procedure ("NO" at block 2016), the first UE may use available resources (e.g., set of sidelink resources) for transmission of the packet based on the TX-only, RX-only, or AND-combining resource selection procedure. In other examples, the CLI-based resource selection procedure may be based on the SIR-based resource selection after block 2014.

At block 2018, the first UE may perform the CLI-based resource selection procedure as described in connection with FIG. 15. In some examples, the first UE may perform an additional check on the reserved or available resources to limit its own CLI on a link of another UE or any other link. For example, the CLI-based resource selection procedure may be based on the AND-combining resource selection procedure of block 2010. For example, the first UE may check on the one or more third available sidelink resources (e.g., available resource(s) both in the first resource availability and the second resource availability) of the sidelink resource pool. The one or more third available sidelink resources may be, for example, a combination of the one or more first available sidelink resources based on the resource report and the one or more second available sidelink resources based on the SCI message. In some examples, the first UE may determine a CLI of each sidelink resources of the one or more third available sidelink resources during the resource selection window. The CLI of the respective sidelink resource may be between a third signal strength and a fourth signal strength. The third signal strength may include a third RSRP or a third RSRQ. The fourth signal strength may include a fourth RSRP or a fourth RSRQ. The third signal strength may be associated with a third link between the first UE and a fourth UE while the fourth signal strength may be associated with a fourth link between a fifth UE and the fourth UE. When the CLI of the respective sidelink resource is greater than or equal to a CLI threshold, the first UE may make the respective sidelink resource unavailable. Thus, the first UE may further update the set of sidelink resources (available resources) to exclude the respective sidelink resource having the CLI greater than or equal to the CLI threshold.

In other examples, the first UE may make one or more available reserved resources by the SIR-based resource selection procedure unavailable based on the CLI. For example, based on the SIR-based resource selection procedure, the first UE may make one or more reserved resources of the subset of reserved resources available. However, the first UE may make the one or more reserved sidelink resources (e.g., available resources) of the subset unavailable based on a CLI on the one or more reserved resources. For example, the first UE may determine a CLI of each sidelink resources of the one or more reserved sidelink resources (e.g., available resources by the SIR-based resource selection procedure) during the resource selection window. The CLI of the respective reserved sidelink resource may be between a third signal strength and a fourth signal strength. The third signal strength may include a third RSRP or a third RSRQ. The fourth signal strength may include a fourth RSRP or a fourth RSRQ. The third signal strength may be associated with a third link between the first UE and a fourth UE while the fourth signal strength may be associated with a fourth link between a fifth UE and the fourth UE. When the CLI of the respective reserved sidelink resource is greater than or equal to a CLI threshold, the first UE may make the respective sidelink resource unavailable. Thus, the first UE may further update the subset of the set of sidelink resource (available resources) to exclude the respective sidelink resource having the CLI greater than or equal to the CLI threshold. That is, the first UE may exclude one or more interfered sidelink resources of the one or more reserved resources from the set of the sidelink resources in response to the CLI of the one or more interfered sidelink resources being greater than or equal to a CLI threshold.

In further examples, in the CLI-based resource selection procedure, the second UE may further use an adaptive RSRP threshold to determine which resources are available and/or which are unavailable and transmit the resource report based on the adaptive RSRP threshold as described above.

In still further examples, the first UE may use a random resource selection procedure although this procedure is not shown in FIG. 20. In the random resource selection procedure, the first UE does not sense or monitor resource availability and does not request or receive a resource report from the second UE that sense or monitor resource availability. The first UE may randomly select the set of sidelink resources from the sidelink resource pool for transmission of the packet.

At block 2020, the first UE may transmit a packet, to the second UE, on the selected set of sidelink resources of the sidelink resource pool. For example, the first UE may, for example, select the set of sidelink resources based on the above-described resource selection procedure (e.g., the TX-only, RX-only, AND-combining, SIR-based, CLI-based, or random resource selection procedure). Then, the first UE may transmit, to the second UE, the packet on the selected set of sidelink resources of the sidelink resource pool.

Further Aspects Having a Variety of Features:

Example 1: A method, apparatus, and non-transitory computer-readable medium for wireless communication operable at a first user equipment (UE), comprising: generating a packet for transmission over a sidelink resource pool; and transmitting the packet to a second UE on a set of sidelink resources of the sidelink resource pool, the set being selected based on a resource selection procedure of a plurality of resource selection procedures, the resource selection procedure being selected based at least in part on one or more utilization parameters corresponding to one or more resources of the sidelink resource pool.

Example 2: The method, apparatus, and non-transitory computer-readable medium of Example 1, wherein the selected resource selection procedure comprises: receiving a resource report from the second UE, the resource report indicative of a first resource availability comprising one or more first available sidelink resources of the sidelink resource pool; and selecting the set of sidelink resources from the first resource availability.

Example 3: The method, apparatus, and non-transitory computer-readable medium of any of Examples 1 to 2, wherein the selected resource selection procedure further comprises: transmitting a request to the second UE for the resource report.

Example 4: The method, apparatus, and non-transitory computer-readable medium of any of Examples 1 to 3, wherein the selected resource selection procedure further comprises: receiving an SCI message from a third UE, the SCI message comprising information indicating a set of reserved resources; and determining a second resource availability based on the SCI message, the second resource availability comprising one or more second available sidelink resources of the sidelink resource pool, wherein the selecting the set of sidelink resources comprises: selecting the set of sidelink resources from one or more third available sidelink resources available in the first resource availability and the second resource availability.

Example 5: The method, apparatus, and non-transitory computer-readable medium of any of Examples 1 to 4, wherein the resource report comprises a first binary matrix including one or more first elements corresponding to the one or more first available sidelink resources of the sidelink resource pool, wherein a second binary matrix including one or more second elements corresponding to the one or more second available sidelink resources of the sidelink resource pool, and wherein the selected resource selection procedure further comprises: determining the one or more third available sidelink resources by performing a bitwise logical AND operation between the one or more first elements of the first binary matrix and the one or more second elements of the second binary matrix.

Example 6: The method, apparatus, and non-transitory computer-readable medium of any of Examples 1 to 5, wherein the selected resource selection procedure further comprises: determining a subset of reserved resources reserved in the set of reserved resources and another set of reserved resources, the another set of reserved resources comprising one or more sidelink resources other than the one or more first available sidelink resources in the sidelink resource pool; and updating the set of sidelink resources to include one or more reserved resources of the subset when a signal-to-interference ratio (SIR) of the one or more reserved resources between a first signal strength and a second signal strength is equal to or higher than a threshold, wherein the first signal strength is associated with a first link between the first UE and the second UE, and wherein the second signal strength is associated with a second link between the third UE and the second UE.

Example 7: The method, apparatus, and non-transitory computer-readable medium of any of Examples 1 to 6, wherein the selected resource selection procedure further comprises: determining a cross-link interference (CLI) of each sidelink resource of the one or more reserved resources of the subset, the CLI of the respective sidelink resource between a third signal strength and a fourth signal strength; and updating the set of the sidelink resources to exclude one or more interfered sidelink resources of the one or more reserved resources in response to the CLI of the one or more interfered sidelink resources being equal to or higher than a CLI threshold, wherein the third signal strength is associated with a third link between the first UE and a fourth UE, and wherein the fourth signal strength is associated with a fourth link between a fifth UE and the fourth UE.

Example 8: The method, apparatus, and non-transitory computer-readable medium of any of Examples 1 to 7, wherein the selected resource selection procedure further comprises: determining a CLI of each sidelink resource of the one or more third available sidelink resources, the CLI of the respective sidelink resource between a third signal strength and a fourth signal strength; and updating the set of the sidelink resources to exclude one or more interfered sidelink resources of the one or more third available sidelink resources in response to the CLI of the one or more interfered sidelink resources being equal to or higher than a CLI threshold, wherein the third signal strength is associated with a third link between the first UE and a fourth UE, and wherein the fourth signal strength is associated with a fourth link between a fifth UE and the fourth UE.

Example 9: The method, apparatus, and non-transitory computer-readable medium of any of Examples 1 to 8, wherein the selected resource selection procedure comprises: receiving an SCI message from a third UE, the SCI message comprising information indicating a set of reserved resources in a resource selection window; and determining a resource availability comprising one or more available sidelink resources based on the SCI message selecting the set of sidelink resources from the one or more second available sidelink resources.

Example 10: The method, apparatus, and non-transitory computer-readable medium of any of Examples 1 to 9, wherein the selected resource selection procedure comprises: randomly selecting the set from the sidelink resource pool.

Example 11: The method, apparatus, and non-transitory computer-readable medium of any of Examples 1 to 10, wherein the one or more utilization parameters comprise one or more of: a channel utilization parameter indicative of a measurement of a network load for the transmission associated with the packet; a packet priority parameter indicative of a priority of the transmission associated with the packet; a remaining packet delay budget (PDB) parameter indicative of a PDB of the transmission associated with the packet; a parameter indicative of a cast type associated with the packet; a parameter indicative of a distance between the first UE and the second UE; a packet reliability requirement parameter indicative of a predetermined level of a transmission characteristic of the transmission associated with the packet; a parameter indicative of a periodicity at which the first UE is configured to sense received signals; or a parameter indicative of a power at which the first UE is configured to transmit using the sidelink resources.

Example 12: The method, apparatus, and non-transitory computer-readable medium of any of Examples 1 to 11, wherein the channel utilization parameter comprises a Channel Busy Ratio (CBR) value calculated using a received power in a set of measured resources corresponding to the sidelink carrier, and wherein the resource selection procedure is selected based on the CBR value exceeding a threshold.

Example 13: The method, apparatus, and non-transitory computer-readable medium of any of Examples 1 to 12, further comprising: determining the resource selection procedure as a sensing procedure or a non-sensing procedure for the first UE based on the CBR value exceeding the threshold.

Example 13A: The apparatus of any of Examples 1 to 13, further comprising: an antenna, wherein the packet is transmitted via the antenna to the second UE.

Example 14: A first user equipment (UE) for wireless communication, comprising: means for generating a packet for transmission over a sidelink resource pool; and means for transmitting the packet to a second UE on a set of sidelink resources of the sidelink resource pool, the set being selected based on a resource selection procedure of a plurality of resource selection procedures, the resource selection procedure being selected based at least in part on one or more utilization parameters corresponding to one or more resources of the sidelink resource pool.

Example 15: The first UE of Example 14, wherein the selected resource selection procedure comprises: means for receiving a resource report from the second UE, the resource report indicative of a first resource availability comprising one or more first available sidelink resources of the sidelink resource pool; and means for selecting the set of sidelink resources from the first resource availability.

Example 16: The first UE of any of Examples 14 to 15, wherein the selected resource selection procedure further comprises: means for transmitting a request to the second UE for the resource report.

Example 17: The first UE of any of Examples 14 to 16, wherein the selected resource selection procedure further comprises: means for receiving an SCI message from a third UE, the SCI message comprising information indicating a set of reserved resources; and means for determining a second resource availability based on the SCI message, the second resource availability comprising one or more second available sidelink resources of the sidelink resource pool, wherein the selecting the set of sidelink resources comprises: selecting the set of sidelink resources from one or more third available sidelink resources available in the first resource availability and the second resource availability.

Example 18: The first UE of any of Examples 14 to 17, wherein the resource report comprises a first binary matrix including one or more first elements corresponding to the one or more first available sidelink resources of the sidelink resource pool, wherein a second binary matrix including one or more second elements corresponding to the one or more second available sidelink resources of the sidelink resource pool, and wherein the selected resource selection procedure further comprises: means for determining the one or more third available sidelink resources by performing a bitwise logical AND operation between the one or more first elements of the first binary matrix and the one or more second elements of the second binary matrix.

Example 19: The first UE of any of Examples 14 to 18, wherein the selected resource selection procedure further comprises: means for determining a subset of reserved resources reserved in the set of reserved resources and another set of reserved resources, the another set of reserved resources comprising one or more sidelink resources other than the one or more first available sidelink resources in the sidelink resource pool; and means for updating the set of sidelink resources to include one or more reserved resources of the subset when a signal-to-interference ratio (SIR) of the one or more reserved resources between a first signal strength and a second signal strength is equal to or higher than a threshold, wherein the first signal strength is associated with a first link between the first UE and the second UE, and wherein the second signal strength is associated with a second link between the third UE and the second UE.

Example 20: The first UE of any of Examples 14 to 19, wherein the selected resource selection procedure further comprises: means for determining a cross-link interference (CLI) of each sidelink resource of the one or more reserved resources of the subset, the CLI of the respective sidelink resource between a third signal strength and a fourth signal strength; and means for updating the set of the sidelink resources to exclude one or more interfered sidelink resources of the one or more reserved resources in response to the CLI of the one or more interfered sidelink resources being equal to or higher than a CLI threshold, wherein the third signal strength is associated with a third link between the first UE and a fourth UE, and wherein the fourth signal strength is associated with a fourth link between a fifth UE and the fourth UE.

Example 21: The first UE of any of Examples 14 to 20, wherein the selected resource selection procedure further comprises: means for determining a CLI of each sidelink resource of the one or more third available sidelink resources, the CLI of the respective sidelink resource between a third signal strength and a fourth signal strength; and means for updating the set of the sidelink resources to exclude one or more interfered sidelink resources of the one or more third available sidelink resources in response to the CLI of the one or more interfered sidelink resources being equal to or higher than a CLI threshold, wherein the third signal strength is associated with a third link between the first UE and a fourth UE, and wherein the fourth signal strength is associated with a fourth link between a fifth UE and the fourth UE.

Example 22: The first UE of any of Examples 14 to 21, wherein the selected resource selection procedure comprises: means for receiving an SCI message from a third UE, the SCI message comprising information indicating a set of reserved resources in a resource selection window; and means for determining a resource availability comprising one or more available sidelink resources based on the SCI message selecting the set of sidelink resources from the one or more second available sidelink resources.

Example 23: The first UE of any of Examples 14 to 22, wherein the selected resource selection procedure comprises: randomly selecting the set from the sidelink resource pool.

Example 24: The first UE of any of Examples 14 to 23, wherein the one or more utilization parameters comprise one or more of: a channel utilization parameter indicative of a measurement of a network load for the transmission associated with the packet; a packet priority parameter indicative of a priority of the transmission associated with the packet; a remaining packet delay budget (PDB) parameter indicative of a PDB of the transmission associated with the packet; a parameter indicative of a cast type associated with the packet; a parameter indicative of a distance between the first UE and the second UE; a packet reliability requirement parameter indicative of a predetermined level of a transmission characteristic of the transmission associated with the packet; a parameter indicative of a periodicity at which the first UE is configured to sense received signals; or a parameter indicative of a power at which the first UE is configured to transmit using the sidelink resources.

Example 25: The first UE of any of Examples 14 to 24, wherein the channel utilization parameter comprises a Channel Busy Ratio (CBR) value calculated using a received power in a set of measured resources corresponding to the sidelink resource pool, and wherein the resource selection procedure is selected based on the CBR value exceeding a threshold.

Example 26: The first UE of any of Examples 14 to 25, further comprising: means for determining the resource selection procedure as a sensing procedure or a non-sensing procedure for the first UE based on the CBR value exceeding the threshold.

Example 27: A method of wireless communication, comprising: determining, by a first user equipment (UE), one or more parameters related to reliability of sidelink transmission to a second UE; selecting, based on the one or more parameters, a resource selection technique from a plurality of resource selection techniques; receiving a packet to be transmitted using a sidelink (SL) slot; in response to receiving the packet to be transmitted using a sidelink (SL) slot, selecting resources from a plurality of resources within a resource selection window based on the selected resource selection technique; and transmitting the packet using the selected resources.

Example 28: The method of wireless of communication of Example 27, further comprising: measuring power received in a plurality of resource elements, wherein the one or more parameters comprises a channel utilization parameter calculated based on the power received in the plurality of resource elements.

Example 29: The method of wireless of communication of Example 28, wherein the channel utilization parameter is a Channel Busy Ratio (CBR) value calculated using the power received in the plurality of resource elements, and wherein selecting the resource selection technique from a plurality of resource selection techniques comprises: selecting a first resource selection technique of the plurality of resource selection techniques based on the CBR value exceeding a threshold.

Example 30: The method of wireless of communication of any one of Examples 27 to 29, wherein the one or more parameters comprise one or more of: a packet priority parameter associated with a packet; a remaining packet delay budget parameter associated with the packet; a parameter indicative of a cast type associated with the packet; a parameter indicative of a location of each of one or more devices to which the packet is to be transmitted; a packet reliability requirement parameter; a parameter indicative of a periodicity at which the first UE is configured to sense received signals; or a parameter indicative of a power at which the first UE is configured to transmit using sidelink slots.

Example 31: The method of wireless of communication of Example 30, wherein the parameter indicative of the cast type is useable to determine whether the packet is to be transmitted in a unicast transmission.

Example 32: The method of wireless of communication of any one of Examples 30 or 31, wherein the parameter indicative of the location of each of the one or more devices to which the packet is to be transmitted comprises a parameter indicative of a distance between the first UE and the second UE.

Example 33: The method of wireless of communication of any one of Examples 30 or 31, wherein the parameter indicative of the location of each of the one or more devices to which the packet is to be transmitted comprises a range parameter derived from sidelink control information (SCI) received from the second UE to which the packet is to be transmitted.

Example 34: The method of wireless of communication of any one of Examples 30 to 33, wherein the parameter indicative of the periodicity at which the first UE is configured to sense received signals comprises: a parameter indicative of a current radio resource control (RRC) state of the first UE; a parameter indicative of a discontinuous power state of an antenna of the first UE; or a parameter indicative of the first UE being configured in a partial sensing state.

Example 35: The method of wireless of communication of any one of Examples 27 to 34, wherein the plurality of resource selection techniques includes a first resource selection technique comprising: receiving, during a sensing window, a plurality of sidelink control information (SCI) messages from one or more devices located proximate to the first UE, wherein each of the plurality of SCI messages indicates which future resources the device that transmitted that SCI is reserving; generating a first report indicative of which of a plurality of resources in the resource selection window are available based on the plurality of SCI messages received during the sensing window; identifying a first subset of resources of the plurality of RBs in the resource selection window indicated as available in the first report; identifying a second subset of resources of the plurality of resources in the resource selection window indicated as unavailable in the first report; determining that the first subset of resources are available; determining that the second subset of resources are unavailable; and selecting available resources from the first subset of resources.

Example 36: The method of wireless of communication of any one of Examples 27 to 35, wherein the plurality of resource selection techniques includes another resource selection technique comprising: requesting, by the first UE, a report from the second UE indicative of resources available in the resource selection window; receiving, during a sensing window, the plurality of SCI messages from one or more devices located proximate to the first UE, wherein each of the plurality of SCI messages indicates which future resources the device that transmitted that SCI is reserving; generating a second report indicative of which of the plurality of resources in the resource selection window are available based on the plurality of SCI messages received during the sensing window; receiving, from the second UE, a third report indicative of which of the plurality of resources in the resource selection window are available; identifying a third subset of resources of the plurality of resources in the resource selection window indicated as available in both the second report and the third report; identifying a fourth subset of resources of the plurality of resources in the resource selection window indicated as unavailable in at least one of the first report and the second report; determining that the third subset of resources are available; determining that the fourth subset of resources are unavailable; and selecting available resources from the third subset of resources.

Example 37: The method of wireless of communication of any one of Examples 27 to 36, wherein the plurality of resource selection techniques includes yet another resource selection technique comprising: requesting, by the first UE, a report from the second UE indicative of resources available in the resource selection window; receiving, during the sensing window, the plurality of SCI messages from one or more devices located proximate to the first UE, wherein each of the plurality of SCI messages indicates which future resources the device that transmitted that SCI is reserving; determining, for at least a first device associated with a first SCI message of the plurality of SCI messages, a signal-to-interference ratio (SIR) of a first reference signal received power (RSRP) associated with a first link between the first UE and the second UE, and a second RSRP associated with a second link between a third UE and the second UE; determining that the SIR is above an SIR threshold; determining that resources reserved by the first SCI message are available based on the SIR being above the SIR threshold; generating a fourth report indicative of which of the plurality of resources in the resource selection window are available based on RSRP associated with the plurality of SCI messages received during the sensing window; receiving, from the second UE, a fifth report indicative of which of the plurality of resources in the resource selection window are available; identifying a fifth subset of resources of the plurality of resources in the resource selection window indicated as available in both the second report and the third report; identifying a sixth subset of resources of the plurality of resources in the resource selection window indicated as unavailable in at least one of the first report and the second report; determining that the fifth subset of resources are available; determining that the sixth subset of resources are unavailable; and selecting available resource from the fifth subset of resources.

Example 38: The method of wireless of communication of any one of Examples 27 to 37, wherein the plurality of resource selection techniques includes still another resource selection technique comprising: requesting, by the first UE, a report from the second UE indicative of resources available in the resource selection window; receiving, during a sensing window, the plurality of SCI messages from one or more devices located proximate to the first UE, wherein each of the plurality of SCI messages indicates which future resources the device that transmitted that SCI is reserving; determining, for at least a second device, a cross-link interference (CLI) between a third RSRP associated with a third link between the first UE and a third UE, and a fourth RSRP associated with a fourth link between a fourth UE and the third UE; determining that the CLI is above a CLI threshold; and determining that resources reserved by the third UE are unavailable based on the CLI above the CLI threshold; generating a sixth report indicative of which of the plurality of resource resources in the resource selection window are available based on RSRP associated with the plurality of SCI messages received during the sensing window; receiving, from the second UE, a seventh report indicative of which of the plurality of resources in the resource selection window are available; identifying a seventh subset of resources of the plurality of resources in the resource selection window indicated as available in both the second report and the third report; identifying an eighth subset of resources of the plurality of resources in the resource selection window indicated as unavailable in at least one of the first report and the second report; determining that the seventh subset of resources are available; determining that the eighth subset of resources are unavailable; and selecting available resources from the seventh subset of resources.

Example 39: The method of wireless of communication of any one of Examples 27 to 37, wherein the plurality of resource selection techniques includes another resource selection technique comprising: requesting, by the first UE, a report from the second UE indicative of resources available in the resource selection window; receiving, from the second UE, an eighth report indicative of which of the plurality of resources in the resource selection window are available; identifying a ninth subset of resources of the plurality of resources in the resource selection window indicated as available in the eighth report; identifying a tenth subset of resources of the plurality of resources in the resource selection window indicated as unavailable in the eighth report; determining that the ninth subset of resources are available; determining that the tenth subset of resources are unavailable; and selecting available resources from the ninth subset of resources.

Example 40: The method of wireless of communication of any one of Examples 27 to 39, wherein requesting, by the first UE, the report from the second UE comprises: requesting that the report from the second UE be based on a comparison of an SIR between the first link and links from at least one device of the one or more devices.

Example 41: A method of wireless communication, comprising: requesting, by a first user equipment (UE), a report from a second UE indicative of resources available in a resource selection window; receiving, during a sensing window, a plurality of sidelink control information (SCI) messages from one or more devices located proximate to the first UE, wherein each of the plurality of SCI messages indicates which future resources the device that transmitted that SCI is reserving; generating a first report indicative of which of a plurality of resources in the resource selection window are available based on the plurality of SCI messages received during the sensing window; receiving, from the second UE, a second report indicative of which of the plurality of resources in the resource selection window are available; and selecting resources in the resource selection window indicated as available in both the first report and the second report.

Example 42: The method of wireless of communication of Example 41, wherein generating the first report indicative of which of the plurality resources in the resource selection window are available comprises: determining, for each of the plurality of SCI messages, a reference signal received power (RSRP); identifying a subset of the plurality of SCI messages associated with an RSRP below a threshold power; determining that the resources reserved by the subset of the plurality of SCI messages are available; and determining that resources that are not reserved by any SCI message are available.

Example 43: The method of wireless of communication of Example 42, further comprising: identifying a second subset of the plurality of SCI messages associated with an RSRP that exceed a threshold power; determining that the resources reserved by the second subset of the plurality of SCI messages are unavailable.

Example 44: The method of wireless of communication of Example 43, wherein requesting, by the first UE, the report from the second UE comprises: requesting that the report from the second UE be based on a comparison of an SIR between the first link and links from at least one device of the one or more devices.

Example 45: The method of wireless of communication of any one of Examples 43 or 44, wherein generating the first report indicative of which of the plurality resources in the resource selection window are available comprises: determining, for at least a first device associated with a first SCI message of the plurality of SCI messages, a signal-to-interference ratio (SIR) of a first reference signal received power (RSRP) associated with a first link between the first UE and the second UE, and a second RSRP associated with a second link between a third UE and the second UE; determining that the SIR is below an SIR threshold; and determining that resources reserved by the first SCI message are available based on the SIR being below the SIR threshold.

Example 46: The method of wireless of communication of Example 45, further comprising: receiving, from the second UE, a first value indicative of the first RSRP and a second value indicative of the second RSRP.

Example 47: The method of wireless of communication of any one of Examples 45 or 46, wherein requesting, by the first UE, the report from the second UE comprises: requesting that the report from the second UE be based on a comparison of an SIR between the first link and links from at least one device of the one or more devices.

Example 48: The method of wireless of communication of any one of Examples 44 to 47, wherein generating the first report indicative of which of the plurality resources in the resource selection window are available comprises: receiving, from the second UE, a first value indicative of an SIR of a RSRP associated with a first link between the first UE and the second UE, and a second RSRP associated with a second link between a third UE and the second UE; determining that the SIR is below an SIR threshold; and determining that resources reserved by the an SCI message received from the third UE are available based on the SIR being below the SIR threshold.

Example 49: The method of wireless of communication of Example 41, wherein requesting, by the first UE, the report from the second UE comprises: requesting that the report from the second UE be based on a comparison of an SIR between the first link and links from at least one device of the one or more devices.

Example 50: The method of wireless of communication of any one of Examples 44 to 49, wherein generating the first report indicative of which of the plurality resources in the resource selection window are available comprises: determining, for at least a second device, a cross-link interference (CLI) between a third RSRP associated with a third link between the first UE and a third UE, and a fourth RSRP associated with a fourth link between a fourth UE and the third UE; determining that the CLI is above a CLI threshold; and determining that resources reserved by the third UE are unavailable based on the CLI above the CLI threshold.

Example 51: The method of wireless of communication of Example 50, further comprising: receiving, from the third UE, a third value indicative of the third RSRP and a fourth value indicative of the fourth RSRP.

Example 52: The method of wireless of communication of Examples 41 to 51, wherein requesting, by the first UE, the report from the second UE comprises: requesting that the report from the second UE be based on a comparison of an SIR between the first link and links from at least one device of the one or more devices.

Example 53: The method of wireless of communication of Examples 41 to 52, wherein the second report is received via a sidelink reporting link.

Example 54: The method of wireless of communication of Examples 41 to 53, further comprising: transmitting a packet to the second UE using selected resource.

Example 55: An apparatus for wireless communication, comprising: a processor; and a memory communicatively coupled to the at least one processor, wherein the processor and memory are configured to: perform a method of any of Examples 1 to 54.

Example 56: A non-transitory computer-readable medium storing computer-executable code, comprising code for causing a computer to cause a processor to: perform a method of any of Examples 1 to 54.

Example 57: An apparatus for wireless communication, comprising: comprising: at least one means for carrying out a method of any of Examples 1 to 54.

Several examples of a wireless communication network have been presented with reference to an exemplary implementation. As those skilled in the art will readily appreciate, various examples described throughout this disclosure may be extended to other telecommunication systems, network architectures and communication standards.

By way of example, various examples may be implemented within other systems defined by 3GPP, such as Long-Term Evolution (LTE), the Evolved Packet System (EPS), the Universal Mobile Telecommunication System (UMTS), and/or the Global System for Mobile (GSM). Various examples may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or example described herein as "exemplary" is not necessarily to be construed as preferred or advantageous over other examples of the disclosure. Likewise, the term "examples" does not require that all examples of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-16 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-16 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various examples described herein. Various modifications to these examples will be readily apparent to those skilled in the art, and the generic principles defined herein may be applied to other examples. Thus, the claims are not intended to be limited to the examples shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various examples described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication at a first user equipment (UE), comprising:
   generating a packet for transmission over a sidelink resource pool;
   receiving, from a second UE, a report indicative of a first set of available sidelink resources of the sidelink resource pool;
   monitoring a first sidelink control information (SCI) message in a sensing window;
   estimating a first signal strength associated with the first SCI message;
   determining, at the first UE, a second set of available sidelink resources of the sidelink resource pool based at least in part on the first signal strength;
   determining a set of sidelink resources based on a resource selection procedure, the resource selection procedure comprising performing an AND-combining operation between the first set of available sidelink resources of the sidelink resource pool and the second set of available sidelink resources of the sidelink resource pool; and
   transmitting the packet on the set of sidelink resources of the sidelink resource pool.

2. The method of claim 1, further comprising:
   transmitting a request to the second UE for the report.

3. The method of claim 1, further comprising:
   receiving a second SCI message from a third UE, the second SCI message comprising information indicating a set of reserved resources; and
   determining a second resource availability based on the second SCI message, the second resource availability comprising a third set of available sidelink resources of the sidelink resource pool,
   wherein the determining the set of sidelink resources comprises determining the set of sidelink resources further based on the third set of available sidelink resources of the sidelink resource pool.

4. The method of claim 1, wherein the report comprises a first binary matrix including one or more first elements corresponding to the first set of available sidelink resources of the sidelink resource pool,
   wherein a second binary matrix includes one or more second elements corresponding to the second set of available sidelink resources of the sidelink resource pool, and
   wherein performing the AND-combining operation comprises performing a bitwise logical AND operation between the one or more first elements of the first binary matrix and the one or more second elements of the second binary matrix.

5. The method of claim 3, wherein the resource selection procedure further comprises:
  determining a subset of reserved resources reserved in the set of reserved resources and another set of reserved resources, the another set of reserved resources comprising one or more sidelink resources other than the first set of available sidelink resources in the sidelink resource pool; and
  updating the set of sidelink resources to include one or more reserved resources of the subset of reserved resources when a signal-to-interference ratio (SIR) of the one or more reserved resources between a second signal strength and a third signal strength is greater than or equal to a threshold,
  wherein the second signal strength is associated with a first link between the first UE and the second UE, and
  wherein the third signal strength is associated with a second link between the third UE and the second UE.

6. The method of claim 5, wherein the resource selection procedure further comprises:
  determining a cross-link interference (CLI) of each sidelink resource of the one or more reserved resources of the subset of reserved resources, including the CLI of a respective sidelink resource of the one or more reserved resources of the subset of reserved resources between a fourth signal strength and a fifth signal strength; and
  updating the set of the sidelink resources to exclude one or more interfered sidelink resources of the one or more reserved resources in response to a respective CLI of the one or more interfered sidelink resources being greater than or equal to a CLI threshold,
  wherein the fourth signal strength is associated with a third link between the first UE and a fourth UE, and
  wherein the fifth signal strength is associated with a fourth link between the fourth UE and a fifth UE.

7. The method of claim 3, wherein the resource selection procedure further comprises:
  determining a cross-link interference (CLI) of each sidelink resource of the third set of available sidelink resources, including the CLI of a respective sidelink resource of the third set of available sidelink resources between a fourth signal strength and a fifth signal strength; and
  updating the set of the sidelink resources to exclude one or more interfered sidelink resources of the third set of available sidelink resources in response to a respective CLI of the one or more interfered sidelink resources being greater than or equal to a CLI threshold,
  wherein the fourth signal strength is associated with a third link between the first UE and a fourth UE, and
  wherein the fifth signal strength is associated with a fourth link between the fourth UE and a fifth UE.

8. The method of claim 1, wherein the resource selection procedure comprises:
  receiving a second SCI message from a third UE, the second SCI message comprising information indicating a set of reserved resources in a resource selection window;
  determining a resource availability comprising a third set of available sidelink resources based on the second SCI message; and
  determining the set of sidelink resources based on the third set of available sidelink resources.

9. The method of claim 1, further comprising:
  determining the resource selection procedure based at least in part on one or more utilization parameters corresponding to one or more resources of the sidelink resource pool, wherein the one or more utilization parameters comprise one or more of:
    a channel utilization parameter indicative of a measurement of a network load for the transmission associated with the packet;
    a packet priority parameter indicative of a priority of the transmission associated with the packet;
    a remaining packet delay budget (PDB) parameter indicative of a PDB of the transmission associated with the packet;
    a parameter indicative of a cast type associated with the packet;
    a parameter indicative of a distance between the first UE and the second UE;
    a packet reliability requirement parameter indicative of a level of a transmission characteristic of the transmission associated with the packet;
    a parameter indicative of a periodicity at which the first UE is configured to sense received signals; or
    a parameter indicative of a power at which the first UE is configured to transmit using the set of sidelink resources.

10. The method of claim 9, wherein the channel utilization parameter comprises a Channel Busy Ratio (CBR) value calculated using a received power in a set of measured resources corresponding to the sidelink resource pool, and
  wherein the resource selection procedure is selected based on the CBR value exceeding a threshold.

11. The method of claim 10, further comprising:
  determining the resource selection procedure as one of a sensing procedure or a non-sensing procedure for the first UE based on the CBR value exceeding the threshold.

12. The method of claim 1, wherein transmitting the packet on the set of sidelink resources of the sidelink resource pool comprises transmitting the packet to the second UE on the set of sidelink resources of the sidelink resource pool.

13. The method of claim 1, wherein the first SCI message is an SCI format 1 message.

14. The method of claim 1, wherein the first signal strength is a reference signal received power (RSRP).

15. An apparatus for wireless communication at a first user equipment (UE), the apparatus comprising:
  one or more processors; and
  one or more memories coupled to the one or more processors,
  wherein the one or more processors are configured to cause the first UE to:
    generate a packet for transmission over a sidelink resource pool;
    receive, from a second UE, a report indicative of a first set of available sidelink resources of the sidelink resource pool;
    monitor a first sidelink control information (SCI) message in a sensing window;
    estimate a first signal strength associated with the first SCI message;
    determine, at the first UE, a second set of available sidelink resources of the sidelink resource pool based at least in part on the first signal strength;
    determine a set of sidelink resources based on a resource selection procedure,
  wherein to determine the set of sidelink resources based on the resource selection procedure, the one or more processors are configured to cause the first UE to perform an AND-combining operation between the first set of available sidelink resources of the sidelink resource pool and the second set of available sidelink resources of the sidelink resource pool; and transmit the packet on the set of sidelink resources of the sidelink resource pool.

16. The apparatus of claim 15, wherein the one or more processors are further configured to cause the first UE to:

receive a second SCI message from a third UE, wherein the second SCI message comprises information that indicates a set of reserved resources; and determine a second resource availability based on the second SCI message, wherein the second resource availability comprises a third set of available sidelink resources of the sidelink resource pool, wherein to determine the set of sidelink resources, the one or more processors are further configured to cause the first UE to determine the set of sidelink resources further based on the third set of available sidelink resources of the sidelink resource pool.

17. The apparatus of claim 16, wherein the one or more processors are further configured to cause the first UE to:

determine a subset of reserved resources reserved in the set of reserved resources and another set of reserved resources, wherein the another set of reserved resources comprises one or more sidelink resources other than the first set of available sidelink resources in the sidelink resource pool; and update the set of sidelink resources to include one or more reserved resources of the subset of reserved resources when a signal-to-interference ratio (SIR) of the one or more reserved resources between a second signal strength and a third signal strength is greater than or equal to a threshold, wherein the second signal strength is associated with a first link between the first UE and the second UE, and wherein the third signal strength is associated with a second link between the third UE and the second UE.

18. The apparatus of claim 16, wherein the one or more processors are further configured to cause the first UE to:

determine a cross-link interference (CLI) of each sidelink resource of the third set of available sidelink resources, wherein the CLI or each sidelink resource of the third set of available sidelink resources includes the CLI of a respective sidelink resource of the third set of available sidelink resources between a fourth signal strength and a fifth signal strength; and update the set of the sidelink resources to exclude one or more interfered sidelink resources of the third set of available sidelink resources in response to a respective CLI of the one or more interfered sidelink resources that is greater than or equal to a CLI threshold, wherein the fourth signal strength is associated with a third link between the first UE and a fourth UE, and wherein the fifth signal strength is associated with a fourth link between the fourth UE and a fifth UE.

19. The apparatus of claim 15, wherein the one or more processors are further configured to cause the first UE to:

determine the resource selection procedure based at least in part on one or more utilization parameters that correspond to one or more resources of the sidelink resource pool, wherein the one or more utilization parameters comprise one or more of:

a channel utilization parameter indicative of a measurement of a network load for the transmission associated with the packet;

a packet priority parameter indicative of a priority of the transmission associated with the packet;

a remaining packet delay budget (PDB) parameter indicative of a PDB of the transmission associated with the packet;

a parameter indicative of a cast type associated with the packet;

a parameter indicative of a distance between the first UE and the second UE;

a packet reliability requirement parameter indicative of a level of a transmission characteristic of the transmission associated with the packet;

a parameter indicative of a periodicity at which the first UE is configured to sense received signals; or a parameter indicative of a power at which the first UE is configured to transmit on the set of the sidelink resources.

20. The apparatus of claim 15, wherein the one or more processors are further configured to cause the first UE to:

transmit a request to the second UE for the report.

21. The apparatus of claim 15, wherein the report comprises a first binary matrix that includes one or more first elements corresponding to the first set of available sidelink resources of the sidelink resource pool, wherein a second binary matrix includes one or more second elements that correspond to the second set of available sidelink resources of the sidelink resource pool, and wherein to perform the AND-combining operation, the one or more processors are further configured to cause the first UE to perform a bitwise logical AND operation between the one or more first elements of the first binary matrix and the one or more second elements of the second binary matrix.

22. The apparatus of claim 15, wherein to perform the resource selection procedure, the one or more processors are configured to cause the first UE to:

receive a second SCI message from a third UE, wherein the second SCI message comprises information that indicates a set of reserved resources in a resource selection window;

determine a resource availability that comprises a third set of available sidelink resources based on the second SCI message; and determine the set of sidelink resources based on the third set of available sidelink resources.

23. The apparatus of claim 19, wherein the channel utilization parameter comprises a Channel Busy Ratio (CBR) value calculated based on a received power in a set of measured resources that corresponds to the sidelink resource pool, and wherein the resource selection procedure is selected based on the CBR value compared to a threshold.

24. The apparatus of claim 23, wherein the one or more processors are further configured to cause the first UE to:

determine the resource selection procedure as one of a sensing procedure or a non-sensing procedure for the first UE based on the CBR value compared to the threshold.

25. The apparatus of claim 17, wherein the one or more processors are further configured to cause the first UE to:

determine a cross-link interference (CLI) of each sidelink resource of the third set of available sidelink resources, and determine the CLI of a respective sidelink resource of the third set of available sidelink resources between a fourth signal strength and a fifth signal strength; and update the set of the sidelink resources to exclude one or more interfered sidelink resources of the third set of available sidelink resources in response to a respective CLI of the one or more interfered sidelink resources that is greater than or equal to a CLI threshold, wherein the fourth signal strength is associated with a third link between the first UE and a fourth UE, and wherein the fifth signal strength is associated with a fourth link between the fourth UE and a fifth UE.

26. The apparatus of claim 15, wherein to transmit the packet on the set of sidelink resources of the sidelink resource pool, the one or more processors are further configured to cause the first UE to transmit the packet to the second UE on the set of sidelink resources of the sidelink resource pool.

27. The apparatus of claim 15, wherein the first SCI message is an SCI format 1 message.

28. The apparatus of claim 15, wherein the first signal strength is a reference signal received power (RSRP).

29. An apparatus for wireless communication at a first user equipment (UE), the apparatus comprising:
means for generating a packet for transmission over a sidelink resource pool;
means for receiving, from a second UE, a report indicative of a first set of available sidelink resources of the sidelink resource pool;
means for monitoring a first sidelink control information (SCI) message in a sensing window;
means for estimating a first signal strength associated with the first SCI message;
means for determining, at the first UE, a second set of available sidelink resources of the sidelink resource pool based at least in part on the first signal strength;
means for determining a set of sidelink resources based on a resource selection procedure, the resource selection procedure comprising means for performing an AND-combining operation between the first set of available sidelink resources of the sidelink resource pool and the second set of available sidelink resources of the sidelink resource pool; and
means for transmitting the packet on the set of sidelink resources of the sidelink resource pool.

30. The apparatus of claim 29, further comprising:
means for transmitting a request to the second UE for the report.

31. The apparatus of claim 29, wherein the report comprises a first binary matrix including one or more first elements corresponding to the first set of available sidelink resources of the sidelink resource pool,
wherein a second binary matrix includes one or more second elements corresponding to the second set of available sidelink resources of the sidelink resource pool, and
wherein the means for performing the AND-combining operation comprises means for performing a bitwise logical AND operation between the one or more first elements of the first binary matrix and the one or more second elements of the second binary matrix.

32. The apparatus of claim 29, further comprising:
means for receiving a second SCI message from a third UE, the second SCI message comprising information indicating a set of reserved resources; and
means for determining a second resource availability based on the second SCI message, the second resource availability comprising a third set of available sidelink resources of the sidelink resource pool,
wherein the means for determining the set of sidelink resources comprises means for determining the set of sidelink resources further based on the third set of available sidelink resources of the sidelink resource pool.

33. The apparatus of claim 29, wherein the means for transmitting the packet on the set of sidelink resources of the sidelink resource pool comprises means for transmitting the packet to the second UE on the set of sidelink resources of the sidelink resource pool.

34. The apparatus of claim 29, wherein the first SCI message is an SCI format 1 message.

35. The apparatus of claim 29, wherein the first signal strength is a reference signal received power (RSRP).

36. A non-transitory computer-readable medium storing computer-executable code in a first user equipment (UE), the computer-executable code comprising code for causing one or more processors to cause the first UE to:
generate a packet for transmission over a sidelink resource pool;
receive, from a second UE, a report indicative of a first set of available sidelink resources of the sidelink resource pool;
monitor a first sidelink control information (SCI) message in a sensing window;
estimate a first signal strength associated with the first SCI message;
determine, at the first UE, a second set of available sidelink resources of the sidelink resource pool based at least in part on the first signal strength;
determine a set of sidelink resources based on a resource selection procedure, the resource selection procedure comprising performing an AND-combining operation between the first set of available sidelink resources of the sidelink resource pool and the second set of available sidelink resources of the sidelink resource pool; and
transmit the packet on the set of sidelink resources of the sidelink resource pool.

37. The non-transitory computer-readable medium of claim 36, wherein the computer-executable code further comprises code for causing the one or more processors to cause the first UE to:
transmit a request to the second UE for the report.

38. The non-transitory computer-readable medium of claim 36, wherein the report comprises a first binary matrix including one or more first elements corresponding to the first set of available sidelink resources of the sidelink resource pool,
wherein a second binary matrix includes one or more second elements corresponding to the second set of available sidelink resources of the sidelink resource pool, and
wherein to perform the AND-combining operation, the computer-executable code further comprises code for causing the one or more processors to cause the first UE to perform a bitwise logical AND operation between the one or more first elements of the first binary matrix and the one or more second elements of the second binary matrix.

39. The non-transitory computer-readable medium of claim 36, wherein the computer-executable code further comprises code for causing the one or more processors to cause the first UE to:
receive a second SCI message from a third UE, the second SCI message comprising information indicating a set of reserved resources; and determine a second resource availability based on the second SCI message, the second resource availability comprising a third set of available sidelink resources of the sidelink resource pool,
wherein to determine the set of sidelink resources, the computer-executable code further comprises code for causing the one or more processors to cause the first UE to determine the set of sidelink resources further based on the third set of available sidelink resources of the sidelink resource pool.

40. The non-transitory computer-readable medium of claim 36, wherein to transmit the packet on the set of sidelink resources of the sidelink resource pool, the computer-executable code further comprises code for causing the one or more processors to cause the first UE to transmit the packet to the second UE on the set of sidelink resources of the sidelink resource pool.

41. The non-transitory computer-readable medium of claim 36, wherein the first SCI message is an SCI format 1 message.

42. The non-transitory computer-readable medium of claim 36, wherein the first signal strength is a reference signal received power (RSRP).

43. An apparatus for wireless communication at a first user equipment (UE), the apparatus comprising:
one or more processors; and
one or more memories coupled to the one or more processors, wherein the one or more processors are configured to cause the first UE to:
generate a packet for transmission over a sidelink channel;
receive, from a second UE, a report indicative of first sidelink resources that are available;
monitor a first sidelink control information (SCI) message in a sensing window;
determine a first signal strength associated with the first SCI message;
determine, at the first UE, second sidelink resources that are available based at least in part on the first signal strength;
determine available sidelink resources based on an AND-combining operation between the first sidelink resources and the second sidelink resources; and
transmit the packet on the available sidelink resources.

44. The apparatus of claim 43, wherein the first SCI message is an SCI format 1 message.

45. The apparatus of claim 43, wherein the first signal strength is a reference signal received power (RSRP).

46. The apparatus of claim 43, wherein to determine the available sidelink resources, the one or more processors are further configured to cause the first UE to determine the available sidelink resources based on a resource selection procedure that includes the AND-combining operation.

47. The apparatus of claim 43, wherein to determine the first signal strength associated with the first SCI message, the one or more processors are further configured to:
estimate the first signal strength associated with the first SCI message.

48. The apparatus of claim 43, wherein to transmit the packet on the available sidelink resources, the one or more processors are further configured to cause the first UE to transmit the packet to the second UE on the available sidelink resources.

49. A method of wireless communication at a first user equipment (UE), comprising:
generating a packet for transmission over a sidelink channel;
receiving, from a second UE, a report indicative of first sidelink resources that are available;
monitoring a first sidelink control information (SCI) message in a sensing window;
determining a first signal strength associated with the first SCI message;
determining, at the first UE, second sidelink resources that are available based at least in part on the first signal strength;
determining available sidelink resources based on an AND-combining operation between the first sidelink resources and the second sidelink resources; and
transmitting the packet on the available sidelink resources.

50. The method of claim 49, wherein the first SCI message is an SCI format 1 message.

51. The method of claim 49, wherein the first signal strength is a reference signal received power (RSRP).

52. The method of claim 49, wherein determining the available sidelink resources comprises:
determining the available sidelink resources based on a resource selection procedure that includes the AND-combining operation.

53. The method of claim 49, wherein determining the first signal strength associated with the first SCI message comprises:
estimating the first signal strength associated with the first SCI message.

54. The method of claim 49, wherein transmitting the packet on the available sidelink resources comprises transmitting the packet to the second UE on the available sidelink resources.

55. An apparatus for wireless communication at a first user equipment (UE), the apparatus comprising:
means for generating a packet for transmission over a sidelink channel;
means for receiving, from a second UE, a report indicative of first sidelink resources that are available;
means for monitoring a first sidelink control information (SCI) message in a sensing window;
means for determining a first signal strength associated with the first SCI message;
means for determining, at the first UE, second sidelink resources that are available based at least in part on the first signal strength;
means for determining available sidelink resources based on an AND-combining operation between the first sidelink resources and the second sidelink resources; and
means for transmitting the packet on the available sidelink resources.

56. The apparatus of claim 55, wherein the first SCI message is an SCI format 1 message.

57. The apparatus of claim 55, wherein the first signal strength is a reference signal received power (RSRP).

58. The apparatus of claim 55, wherein the means for determining the available sidelink resources comprises:
means for determining the available sidelink resources based on a resource selection procedure that includes the AND-combining operation.

59. The apparatus of claim 55, wherein the means for determining the first signal strength associated with the first SCI message comprises:
means for estimating the first signal strength associated with the first SCI message.

60. The apparatus of claim 55, wherein the means for transmitting the packet on the available sidelink resources comprises means for transmitting the packet to the second UE on the available sidelink resources.

61. A non-transitory computer-readable medium storing computer-executable code in a first user equipment (UE), the computer-executable code comprising code for causing one or more processors to cause the first UE to:
   generate a packet for transmission over a sidelink channel;
   receive, from a second UE, a report indicative of first sidelink resources that are available;
   monitor a first sidelink control information (SCI) message in a sensing window, determine a first signal strength associated with the first SCI message;
   determine, at the first UE, second sidelink resources that are available based at least in part on the first signal strength;
   determine available sidelink resources based on an AND-combining operation between the first sidelink resources and the second sidelink resources; and
   transmit the packet on the available sidelink resources.

62. The non-transitory computer-readable medium of claim 61, wherein the first SCI message is an SCI format 1 message.

63. The non-transitory computer-readable medium of claim 61, wherein the first signal strength is a reference signal received power (RSRP).

64. The non-transitory computer-readable medium of claim 61, wherein to determine the available sidelink resources, the computer-executable code further comprises code for causing the one or more processors to cause the first UE to:
   determine the available sidelink resources based on a resource selection procedure that includes the AND-combining operation.

65. The non-transitory computer-readable medium of claim 61, wherein to determine the first signal strength associated with the first SCI message, the computer-executable code further comprises code for causing the one or more processors to cause the first UE to: estimate the first signal strength associated with the first SCI message.

66. The non-transitory computer-readable medium of claim 61, wherein to transmit the packet on the available sidelink resources, the computer-executable code further comprises code for causing the one or more processors to cause the first UE to transmit the packet to the second UE on the available sidelink resources.

* * * * *